(12) United States Patent
Watanabe et al.

(10) Patent No.: US 8,152,637 B2
(45) Date of Patent: Apr. 10, 2012

(54) IMAGE DISPLAY SYSTEM, INFORMATION PROCESSING SYSTEM, IMAGE PROCESSING SYSTEM, AND VIDEO GAME SYSTEM

(75) Inventors: Yusuke Watanabe, Tokyo (JP); Satoru Miyaki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 767 days.

(21) Appl. No.: 11/250,170

(22) Filed: Oct. 13, 2005

(65) Prior Publication Data

US 2006/0073892 A1 Apr. 6, 2006

Related U.S. Application Data

(63) Continuation of application No. PCT/JP2005/002450, filed on Feb. 17, 2005.

(30) Foreign Application Priority Data

Feb. 18, 2004 (JP) ................. 2004-040865

(51) Int. Cl.
*A63F 9/24* (2006.01)
*A63F 13/00* (2006.01)
(52) U.S. Cl. ............... 463/33; 463/11; 463/31; 463/32; 463/43
(58) Field of Classification Search ............... 463/30–34
See application file for complete search history.

(56) References Cited

U.S. PATENT DOCUMENTS

| | | | | |
|---|---|---|---|---|
| 5,577,981 A * | 11/1996 | Jarvik | ................. | 482/4 |
| 6,175,343 B1 * | 1/2001 | Mitchell et al. | ................. | 345/8 |
| 6,411,266 B1 * | 6/2002 | Maguire, Jr. | ................. | 345/8 |
| 6,522,312 B2 * | 2/2003 | Ohshima et al. | ................. | 345/8 |
| 6,633,304 B2 * | 10/2003 | Anabuki et al. | ................. | 345/633 |
| 6,650,776 B2 | 11/2003 | Ihara et al. | | |
| 6,782,238 B2 * | 8/2004 | Burg et al. | ................. | 434/1 |
| 6,853,935 B2 * | 2/2005 | Satoh et al. | ................. | 702/94 |
| 6,951,515 B2 * | 10/2005 | Ohshima et al. | ................. | 463/31 |

(Continued)

FOREIGN PATENT DOCUMENTS

JP 7-254064 10/1995

(Continued)

OTHER PUBLICATIONS

Notification of Resons for Refusal dated Feb. 14, 2006, with translation, for corresponding Japanese Application No. 2000-040865.

(Continued)

*Primary Examiner* — Steven J Hylinski
(74) *Attorney, Agent, or Firm* — Katten Muchin Rosenman LLP

(57) ABSTRACT

According to functions (the first to the third target position setup functions 242, 244, and 246) which set up as a target position, a position of reference image, a position decided by orientations of multiple cards, and a position of a character image being a counterpart selected in combined actions display program, and functions to display a scene where the character image moves from above the identification information to the target position (action data string searching function 248, movement posture setup function 250, 3D image setup function 252, image drawing function 254, image display setup function 256, table rewriting function 258, distance calculating function 260, repetitive function 262), it is possible to expand a range of card game used to be played only in a real space up to a virtual space, and to offer a new game which merges the card game and video game.

3 Claims, 41 Drawing Sheets

U.S. PATENT DOCUMENTS

| | | | |
|---|---|---|---|
| 6,972,734 B1 * | 12/2005 | Ohshima et al. | 345/8 |
| 7,084,887 B1 * | 8/2006 | Sato et al. | 345/633 |
| 7,295,220 B2 * | 11/2007 | Zhou et al. | 345/632 |
| 7,298,384 B2 * | 11/2007 | Anabuki et al. | 345/633 |
| 7,427,996 B2 * | 9/2008 | Yonezawa et al. | 345/629 |
| 7,474,318 B2 * | 1/2009 | Zhou et al. | 345/632 |
| 2002/0057280 A1 * | 5/2002 | Anabuki et al. | 345/633 |
| 2002/0075286 A1 * | 6/2002 | Yonezawa et al. | 345/679 |
| 2002/0095265 A1 * | 7/2002 | Satoh et al. | 702/94 |
| 2003/0062675 A1 * | 4/2003 | Noro et al. | 273/237 |
| 2003/0171142 A1 * | 9/2003 | Kaji et al. | 463/11 |
| 2006/0079324 A1 | 4/2006 | Watanabe et al. | |

FOREIGN PATENT DOCUMENTS

| | | |
|---|---|---|
| JP | 3025805 | 4/1996 |
| JP | 10-015152 | 1/1998 |
| JP | 2000-047967 | 2/2000 |
| JP | 2000-82108 | 3/2000 |
| JP | 2000-322602 | 11/2000 |
| JP | 2001-300130 | 10/2001 |
| JP | 2001-307124 | 11/2001 |
| JP | 2002-301264 | 10/2002 |
| JP | 2003-334384 | 11/2003 |

OTHER PUBLICATIONS

Notice of Reasons for Refusal mailed May 2, 2006, with translation, for corresponding Japanese Application No. 2004-041210.

Notification of Reason(s) for Refusal dated May 13, 2008, for corresponding Japanese Application JP 2006-113459.

Notification of Reason(s) for Refusal dated May 13, 2008, for corresponding Japanese Application JP 2006-183879.

International Search Report dated May 17, 2005 from corresponding International Application PCT/JP2005/002450.

Supplementary European Search Report dated Feb. 23, 2010, for the corresponding European Application No. EP 05 71 0300.

H. Kato, et al., "Virtual Object Manipulation on a Table-top AR Environment", Augmented Reality, 2000. (ISAR 2000). Proceedings, IEEE and ACM International Symposium on Munich, pp. 111-119, Germany, Oct. 5-6, 2000, Piscataway, NJ, US, Oct. 5, 2000.

Simon Prince, et al., "3D Live: Real Time Captured Content for Mixed Reality", Mixed and Augmented Reality, 2002. ISMAR 2002, Proceedings, International Symposium on, Sep. 30-Oct. 1, 2002, pp. 1-7, 317, Piscataway, NJ, US, IEEE.

Jun Rekimoto, et al., "CyberCode: Designing Augmented Reality Environments with Visual Tags", Jan. 1, 2000, Sony Computer Science Laboratories, Inc., Tokyo, Japan.

* cited by examiner

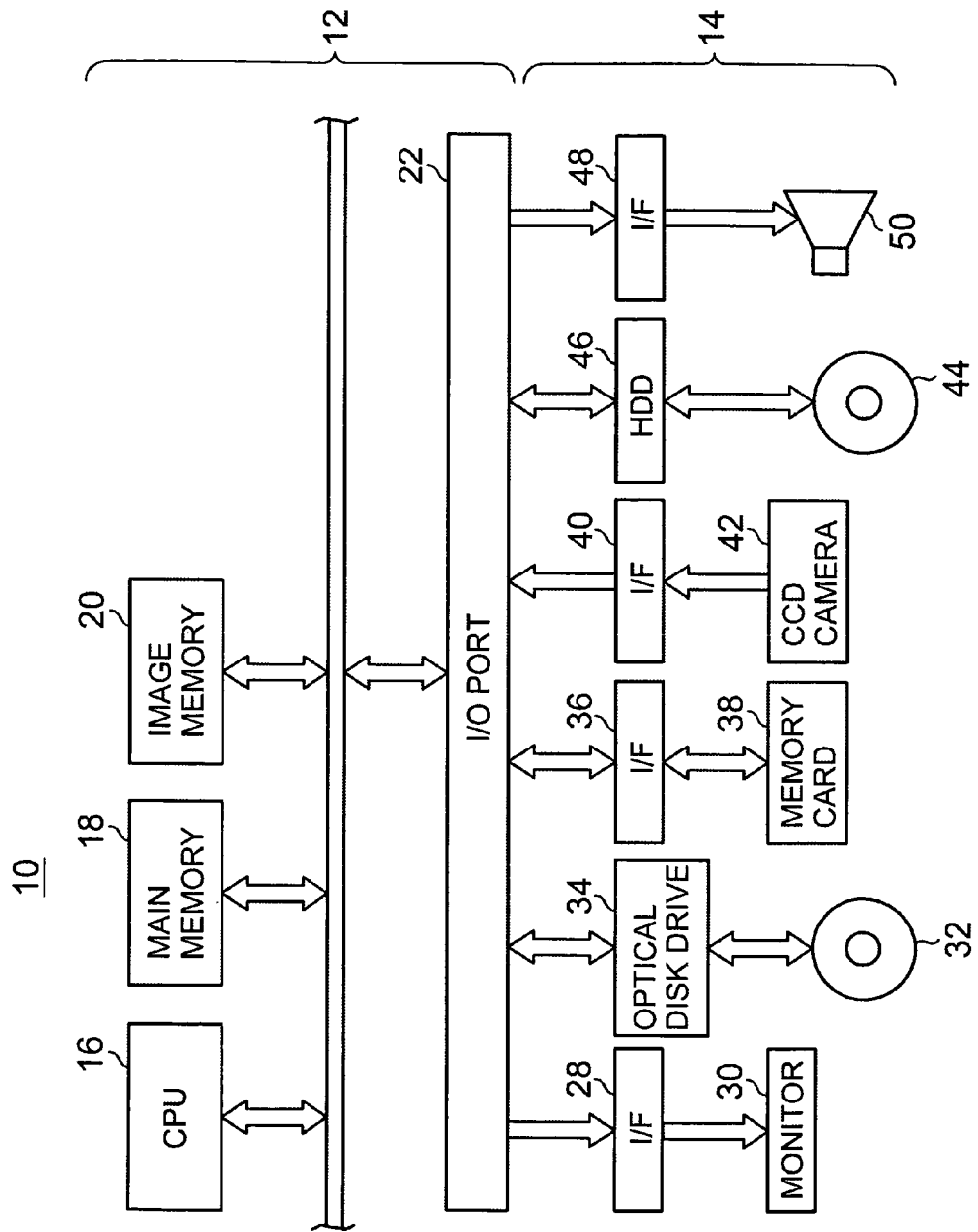

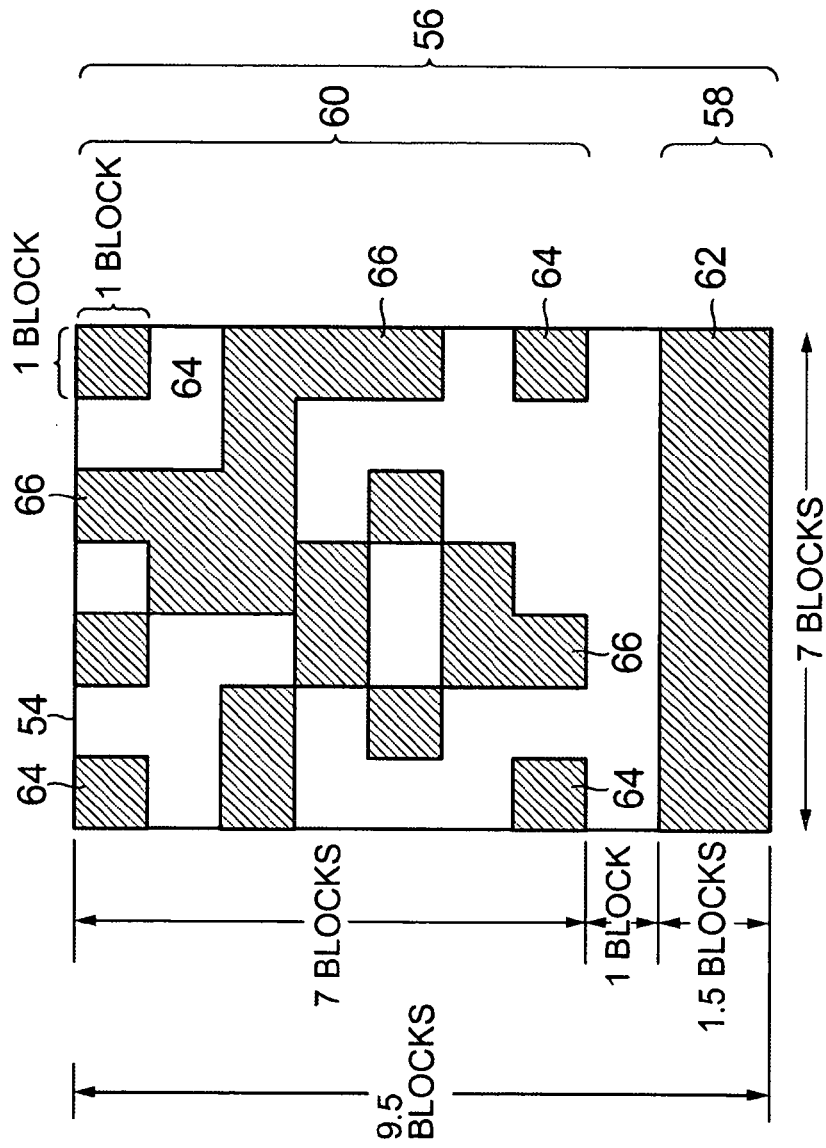
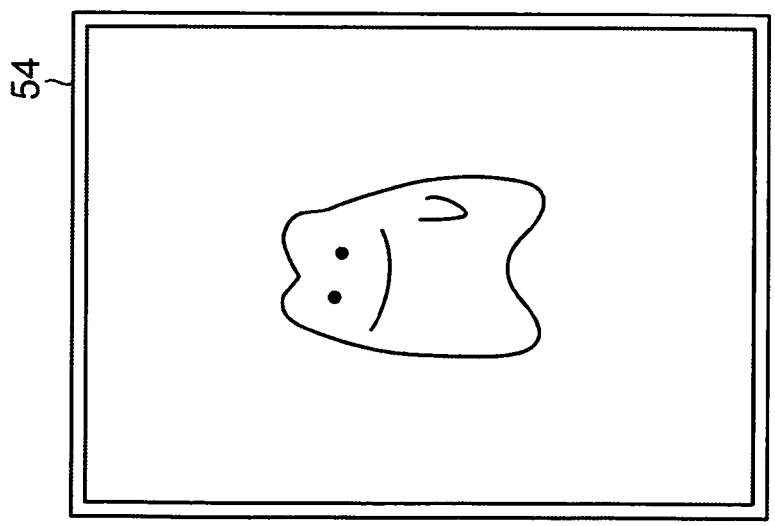

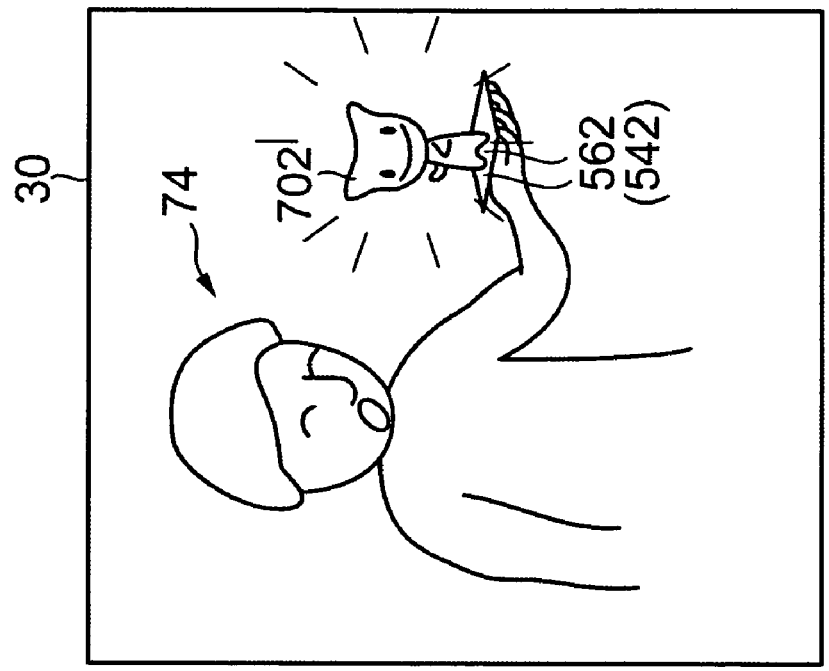
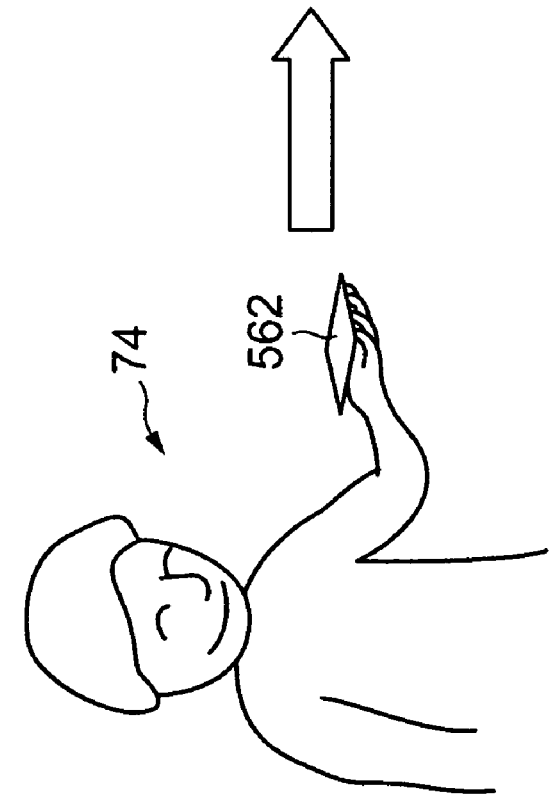

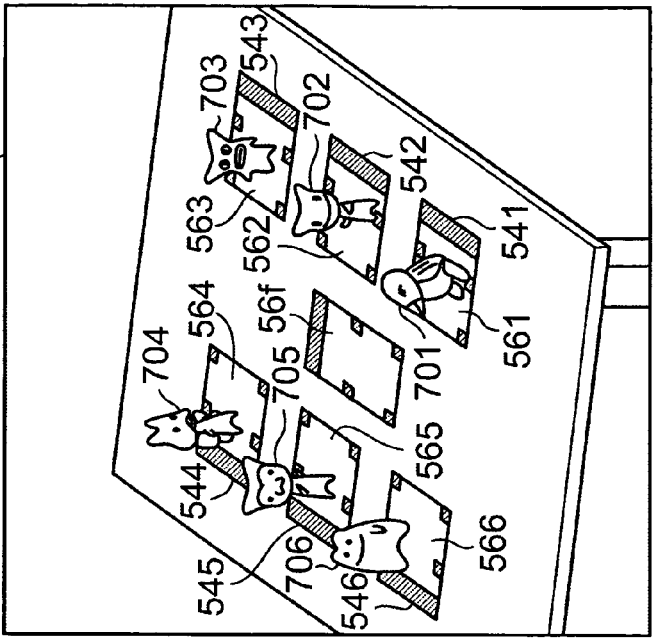
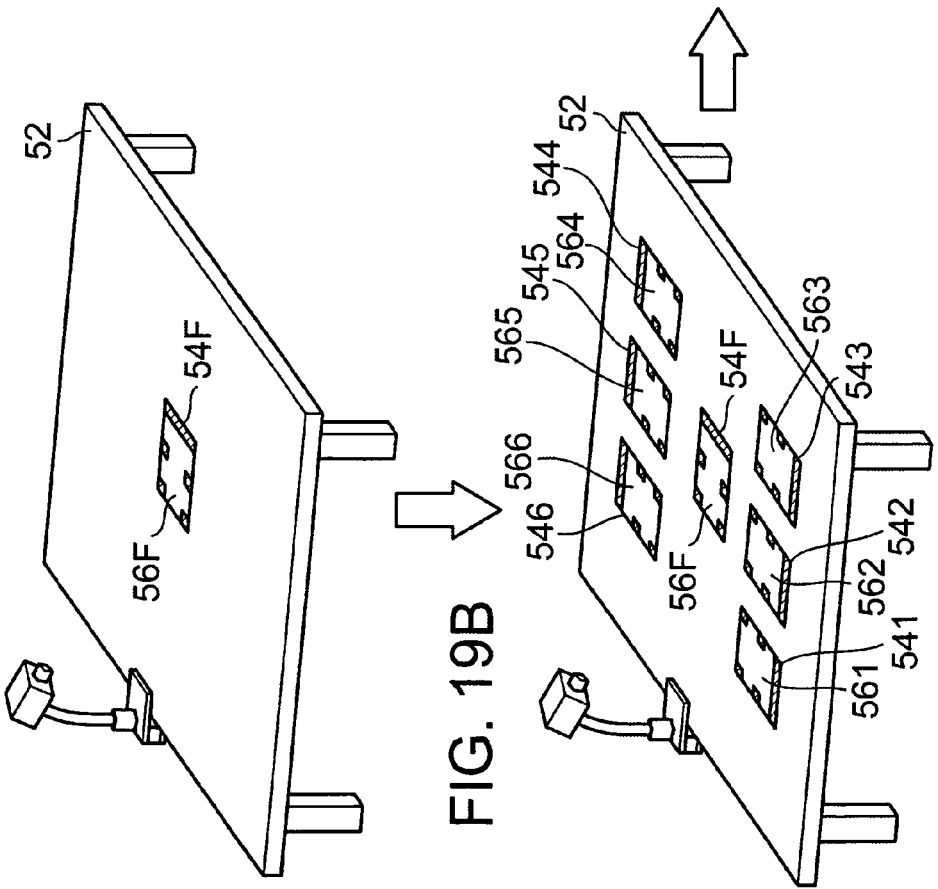

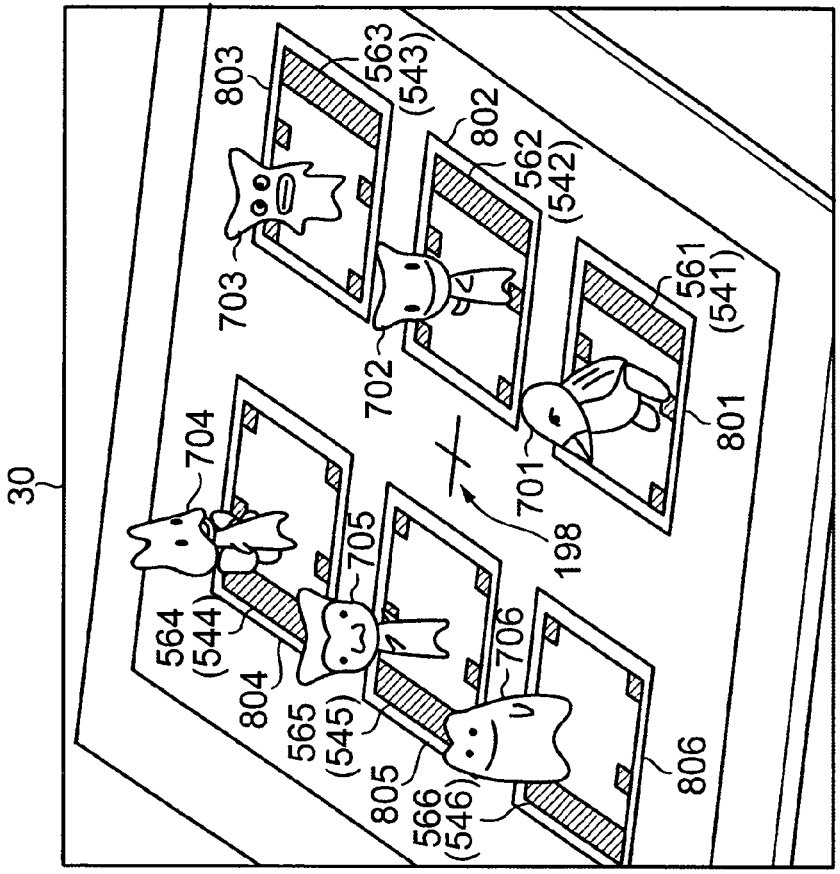
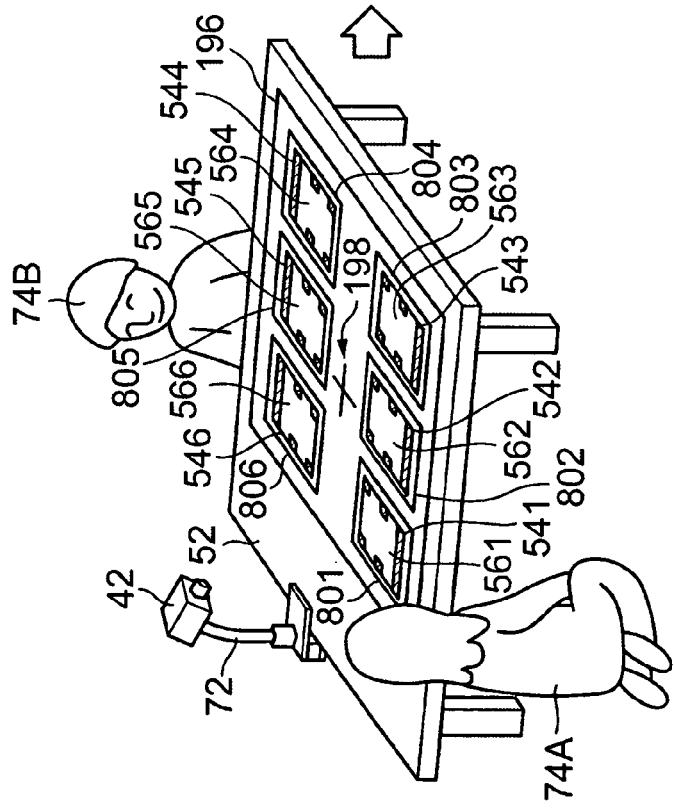

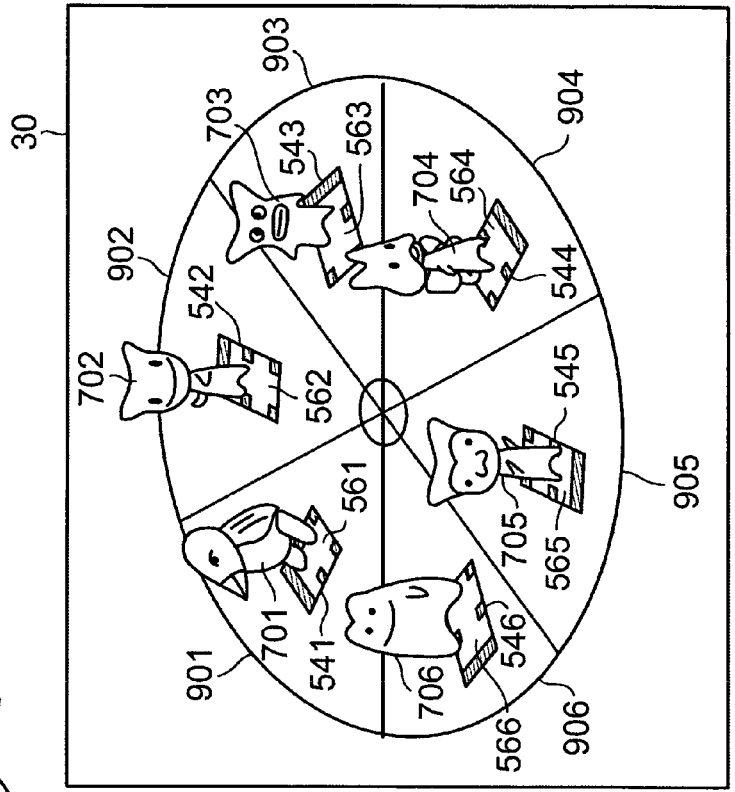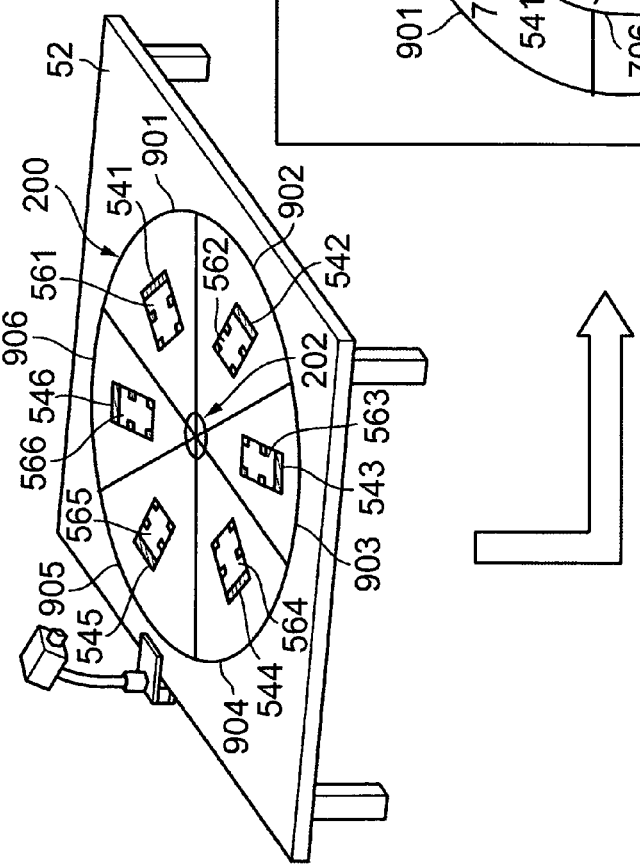

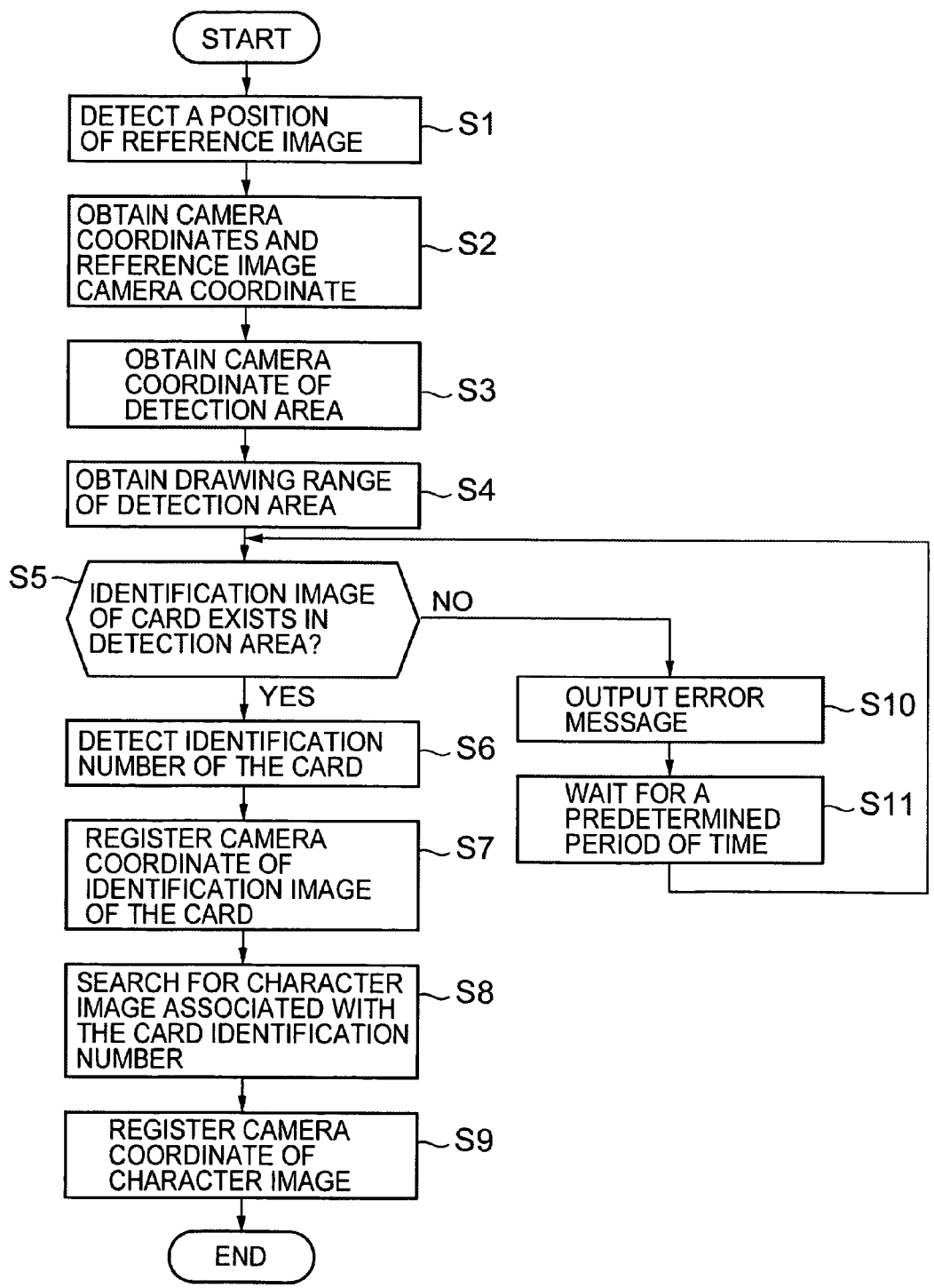

(FAILURE)

(FAILURE→SUCCESSFUL)

IMAGE DISPLAY SYSTEM, INFORMATION PROCESSING SYSTEM, IMAGE PROCESSING SYSTEM, AND VIDEO GAME SYSTEM

CROSS-REFERENCE TO RELATED APPLICATION

This application is a continuation of International Application PCT/JP2005/002450, filed on Feb. 17, 2005, now International Publication Number WO 2005/077478, and claims priority from Japanese Patent Application 2004-040865 filed Feb. 18, 2004, the contents of which are herein wholly incorporated by reference.

TECHNICAL FIELD

The present invention relates to an image display system which picks up an image of a card placed on a desk, table, and the like, and displays a three-dimensional image of an object together with the image thus picked up, the object being associated with an identification number specified by an identification image that is attached to the card, an information processing system which carries out various processing according to orientation of the card being placed, an image processing system regarding recognition of the card variously placed, and a video game system which utilizes principles of the aforementioned image display system, information processing system, and image processing system.

BACKGROUND ART

These days, Japanese Patent Laid-open Publication No. 2000-82108 (hereinafter referred to as "Patent Document 1") discloses a method which picks up an image of a card by use of a CCD camera, for example, the card having an identification image (two-dimensional code and the like) attached on front or back side thereof, finds image data of the identification image attached on the card from the image data of the pickup image, and detects identification information of the card from the image data of the identification image thus found.

Evolving from the method as described above, Japanese Patent Laid-open Publication No. 2000-322602 (hereinafter referred to as "Patent Document 2") discloses an example that displays on a monitor a pickup image including an image of the card obtained by the CCD camera, and displays a three-dimensional image of an object associated with the identification information being detected, in such a manner as being superimposed on the image of the card displayed on the monitor. According to this method, it is possible to represent a visual effect by merging real space and virtual space.

DISCLOSURE OF THE INVENTION

Problem to be Solved by the Invention

Further evolving from the method as disclosed by the aforementioned Patent Document 2, the present invention aims to provide an image display system, information processing system, and image processing system, which are easily applicable to various video games, so as to expand and diversify categories of the video games.

Further evolving from the method as disclosed by the aforementioned Patent Document 2, the present invention also aims to provide a video game system, which allows a range of card game used to be played only in a real space to expand up to a virtual space, and offers a new game which merges the card game and video game.

Means to Solve the Problem

In the image display system according to the present invention, an object associated with the identification information of the card is displayed in such a manner as being superimposed on the image of the card being displayed. This image of the object moves up to a predetermined position in the pickup image. If this is applied to a video game, for instance, a character is displayed who has appeared from the card and moves to a predetermined position to initiate battle and the like. Therefore, it is suitable for a versus-fighting game and the like. Here, the "character" indicates a type of object which is in motion, and it may be an object such as human being or animal. Alternatively, it may be an object imitating a hero who appears in a TV program, an animated cartoon movie and the like.

It is further possible to create a display such that the object which has moved to the predetermined position returns to the position on the image of the card. If this is applied to the video game, it is suitable for displaying a situation that the character who won the battle comes back to the original position on the card, for example.

Alternatively, it is also possible to create a display such that the object which has moved to the predetermined position disappears at this position. It is suitable for displaying a situation that the character that lost the battle disappears at the position, for example.

The image display system relating to the present invention detects orientations of multiple cards being placed, from a pickup image obtained by an image pickup means, determines a predetermined position on the image thus picked up according to the orientations of the multiple cards being placed, and displays that multiple objects being displayed move to the predetermined position. If this is applied to a video game, it creates a display that the multiple objects being displayed move to a specified position based on the orientations of the multiple cards being placed and initiate a battle, for example. Therefore, it is also suitable for a versus-fighting game and the like.

Then, it may also be possible to find out identification information drawn on the multiple cards thus detected, and display on the images of the multiple cards, the objects associated with the identification information of the respective cards in such a manner as being superimposed thereon, assuming these objects as the aforementioned multiple objects. Accordingly, it is possible to display that the objects appearing respectively from the multiple cards gather into one position specified by the orientations of the multiple cards being placed. In particular, when the multiple cards are arranged in a circle, it is possible to display that the multiple objects get together at the center position of the circle. Therefore, it is suitable for a versus-fighting game played by three persons or more.

The image display system relating to the present invention displays a particular image instead of the object, if the identification information of the card becomes undetectable, after the object associated with the identification information of the card is displayed on the image of the card. This may happen in the case where a user displaces the card on which the object is displayed, the image pickup means is unintentionally moved, or the like. Since in the situations above, it becomes difficult to display the object on the image of the card, the particular image is displayed instead until the identification information of the card is properly detected, thereby indicating for the user that recognition of the card is now unavailable.

It is a matter of course that after the particular image is displayed, if the identification information of the card is detected, the object associated with the identification information of the card may be displayed in such a manner as being superimposed on the image of the card. A mode of display in this case may be, for example, after the particular image being floating is displayed and then the identification information of the card is properly detected, the object associated with the identification information of the card may be displayed in such a manner as landing on the image of the card. With the display as described above, an atmosphere is created such that the object of the card returns from an unknown world to the virtual space of this video game, thereby giving an amusement to the video game. It is to be noted here that after a lapse of certain period of time, it is possible to display that this particular image being floating is erased.

According to the image display system relating to the present invention, a background image is displayed according to the identification information drawn on the card thus detected. If it is applied to a video game, for example, a card used for showing a field, being different from the card used for fighting is prepared and an image of this field card is picked up, thereby displaying on a screen of a display device, a background image such as volcano, deep ocean, outer space, and forest, being associated with the field card. Accordingly, realism is created for the user.

In such a case as described above, the background image may include an image indicating a location to place the next card (such as a fighting card). Accordingly, the user is allowed to be aware on which location the next card is to be placed, while watching the screen of the display device, thereby achieving a smooth progress of the video game.

The information processing system relating to the present invention, detects an orientation of a placed card, from the image of the card in the pickup image. Then, a processing procedure based on the orientation of the placed card thus detected is selected out of multiple processing procedures being predetermined. A processing following the selected processing procedure is executed. For example, a posture of the character may be changed according to the orientation of the card.

Furthermore, the information processing system relating to the present invention detects an orientation of a card being placed, from the image of the card in the pickup image. Then, a processing target based on the placed card orientation thus detected is selected out of multiple processing targets being predetermined. A predetermined processing is executed for the processing target thus selected. For example, a character to be attacked may be determined according to the card orientation.

Furthermore, the information processing system relating to the present invention detects an orientation of a first card being placed, from the image of the first card in the pickup image, and detects an orientation of a second card being placed, from the image of the second card. Then, a processing target based on the placed first card orientation thus detected, is selected out of predetermined multiple processing targets, and a processing procedure based on the placed second card orientation thus detected, is selected out of predetermined processing procedures. Then, the processing procedure thus selected is executed against the processing target thus selected. For example, a character is determined according to the orientation of the first card, and an action (attacking, enchanting, and the like) taken against the character is determined according to the orientation of the second card.

Furthermore, the information processing system relating to the present invention detects orientations of multiple cards being placed, from the pickup image, and specifies one processing procedure based on a combination of thus detected orientations of the multiple cards being placed. For example, according to the first card, a character which performs the action is decided, according to the second card, a character as a counterpart is decided, and according to the third card, an action to be taken against the counterpart is decided.

Furthermore, the information processing system relating to the present invention detects images of multiple cards in the pickup image, and based on the image of the first card thus detected, the orientation of the next card being placed is detected. Further, out of the multiple processing procedures being predetermined, a processing procedure is selected based on thus detected orientation of the next card being placed, and a processing according to the selected processing procedure is executed. This indicates that the orientation of the second card being placed is detected with respect to the first card, and a processing according to the second card orientation is carried out. For example, with respect to the field card which decides the background image, the orientation of the fighting card being placed is determined.

Furthermore, the information processing system relating to the present invention detects an image which will serve as a predetermined reference from the pickup image, detects an image of a card from the pickup image, and determines orientation of thus detected card being placed, based on the detected reference image. Then, out of the predetermined multiple processing procedures, a processing procedure is selected based on the orientation of the subsequent card thus detected, and a processing following the processing procedure thus selected is executed. For example, based on an image drawn at the center of the region on which the multiple cards are placed, or images drawn on the four corners or the like, the placed card orientation is detected, and a processing according to the placed card orientation is carried out.

The image processing system relating to the present invention detects an image of one card from the pickup image, and specifies from the one card thus detected, a region where another card is to be placed in the pickup image, and detects an image of another card from thus specified region out of the pickup image. In this case, it may also be possible to detect (recognize) identification information drawn on one surface of the card from the image of the card thus detected. Accordingly, it is possible to reduce processing load relating to image detection of multiple cards and recognition of the cards, thereby enhancing the processing speed.

The video game system relating to the present invention displays on the image of the card being displayed, an object associated with the identification information of the card, in such a manner as being superimposed on the image of the card. Then, the system detects an orientation of the card being placed from the pickup image, and changes the posture of the object according to the placed card orientation thus detected. For example, it is possible to selectively carry out the action according to the placed card orientation, out of predetermined multiple actions, for example, attacking, enchanting, being defensive, protecting, or the like.

Furthermore, the video game system relating to the present invention detects orientations of multiple cards being placed, from the pickup image, and specifies one processing procedure based on a combination of the orientations of thus detected multiple cards being placed. For example, when three cards are placed, according to the orientation of the first card, a target to be activated, according to the orientation of the second card, a counterpart is specified, and according to the orientation of the third card, an action to be processed is specified. If it is applied to a video game, the scenario of the video game proceeds following the combination of thus detected orientations of the multiple cards being placed. In this case preferably, it is possible to employ a method such as specifying one object or all the objects out of the multiple objects according to the combination of the orientations of the multiple cards being placed, and an action is identified for thus specified one object or all the objects.

As described so far, according to the image display system, information processing system, and image processing system relating to the present invention, these systems are easily applicable to various video games and thus it is possible to expand and diversify categories of the video games.

Further according to the video game system relating the present invention, it is possible to allow a range of card game used to be played only in a real space to expand up to a virtual space, and to offer a new game which merges the card game and video game.

BRIEF DESCRIPTION OF DRAWINGS

FIG. 1 is a block diagram showing a configuration of a video game system relating to an embodiment of the present invention.

FIG. 2A is a plan view showing the front face of a card and FIG. 2B is a rear view showing the back side of the card.

FIG. 4A and FIG. 4B are illustrations showing another example of usage pattern of the video game system relating to the embodiment of the present invention.

FIG. 13A is an illustration showing a status where a field card is placed on a desk, table, or the like.

FIG. 18A is an illustration showing a status where a field card and versus-fighting cards are placed on a desk, table, or the like.

FIG. 19A is an illustration showing a status where a field card is placed on a desk, table, or the like.

FIG. 19B is an illustration showing a status where a field card and versus-fighting cards are placed, and FIG. 19C is an illustration showing an example which displays on a monitor screen, character images being specified by the identification images of the -fighting cards.

FIG. 20A shows an illustration that a mat for versus-fighting game between two persons is placed on a desk, table, or the like, and versus-fighting cards are placed in the squares provided on the mat. FIG. 20B is an illustration showing an example which displays on a monitor screen, character images being specified by the identification information of the versus-fighting cards.

FIG. 21A is an illustration showing an example that a mat for versus-fighting game among six persons is placed on a desk, table, or the like, and versus-fighting cards are placed in the squares provided on the mat. FIG. 21B is an illustration showing an example which displays on a monitor screen, character images being specified by the identification information of the versus-fighting cards.

FIG. 23 is a flowchart showing a processing of the card position forecasting program.

BEST MODE FOR CARRYING OUT THE INVENTION

Figure 3A:
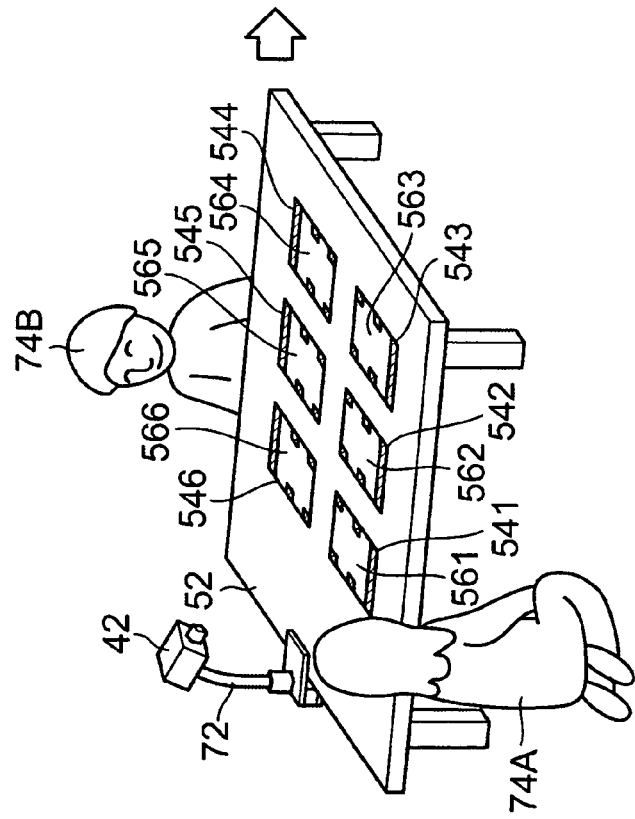
FIG. 3A and FIG. 3B are illustrations showing one example of usage pattern of the video game system relating to the embodiment of the present invention.

In the following, preferred embodiments will be described in detail in which an image display system, information processing system, and image processing system relating to the present invention have been applied to a video game system, with reference to the accompanying drawings, FIG. 1 to FIG. 44.

As shown in FIG. 1, the video game system 10 relating to the present embodiment includes a video game machine 12 and various external units 14.

The video game machine 12 includes CPU 16 which executes various programs, main memory 18 which stores various programs and data, image memory 20 in which image data is recorded (drawn), and I/O port 22 which exchanges data with the various external units 14.

Various external units 14 connected to the I/O port 22 includes, a monitor 30 which is connected via a display-use interface (I/F) 28, an optical disk drive 34 which carries out reproducing/recording from/on an optical disk (DVD-ROM, DVD-RW, DVD-RAM, CD-ROM, and the like) 32, memory card 38 being connected via a memory card-use interface (I/F) 36, CCD camera 42 being connected via pickup-use interface (I/F) 40, hard disk drive (HDD) 46 which carries out reproducing/recording from/on the hard disk 44, and a speaker 50 being connected via the audio-use interface 48. It is a matter of course that connection may be established with the Internet (not illustrated) from the I/O port 22 via a router not illustrated.

Data input and output to/from the external units 14 and data processing and the like within the video game machine 12 are carried out by way of the CPU 16 and main memory 18. In particular, pickup data and image data are recorded (drawn) in the image memory 20.

Next, characteristic functions held by the video game system 10 relating to the present embodiment will be explained with reference to FIG. 2 to FIG. 44, that is, functions being implemented by programs provided to the video game machine 12, via a recording medium such as optical disk 32, memory card 38, hard disk 44, being available for random access, and further via a network such as the Internet, and Intranet.

Firstly, a card 54 used in this video game system 10 will be explained. This card 54 has a size and a thickness being the same as a card used in a general card game. As shown in FIG. 2A, on the front face, there is printed a picture representing a character being associated with the card 54. As shown in FIG. 2B, the identification image 56 is printed on the reverse side. It is a matter of course that a transparent card is also available. In this case, only the identification image 56 is printed.

Patterns of two-dimensional code (hereinafter abbreviated as "2D code") as shown in FIG. 2B configure the identification image 56. One unit of the identification image 56 is assumed as one block, and logo part 58 and code part 60 are arranged in such a manner as being separated by one block within a range of rectangle, 9.5 blocks length vertically, and seven blocks length horizontally. In the logo part 58, there is provided a black colored reference cell 62, being 2D code for notifying the reference position of the code part 60 and the orientation of the card 54, with a shape of large-sized rectangle having a length corresponding to 1.5 blocks vertically and a length corresponding to 7 blocks horizontally. There is also a case that a name of character, a mark (logo) for advertisement, or the like, is printed in the logo part 58, for example.

The code part 60 is in a square range having seven blocks both vertically and horizontally, and at each of the corner sections, corner cells 64 each being a black square, for example, for recognizing identification information, are placed. Furthermore, identification cells 66, each being black square for example, are provided in the area surrounded by four corner cells 64 in such a manner as being two-dimensionally patterned, so as to recognize the identification information.

Since a method for detecting a position of the identification image 56 from the pickup image data, a method for detecting the images at the corner cells 64, and a method for detecting the 2D pattern of the identification cells 66 are described in detail in the Patent Document 1 (Japanese Patent Laid-open Publication No. 2000-82108) as mentioned above, it is advised that the Patent Document 1 is referred to.

In the present embodiment, an association table is registered, which associates various 2D patterns of the identification cells 66 with the identification numbers respectively corresponding to the patterns, for example, in a form of database 68 (2D code database, see FIG. 6 and FIG. 7), in the hard disk 44, optical disk 32, and the like. Therefore, by collating a detected 2D pattern of the identification cells 66 with the association table within the database 68, the identification number of the card 54 is easily detected.

Figure 3B:
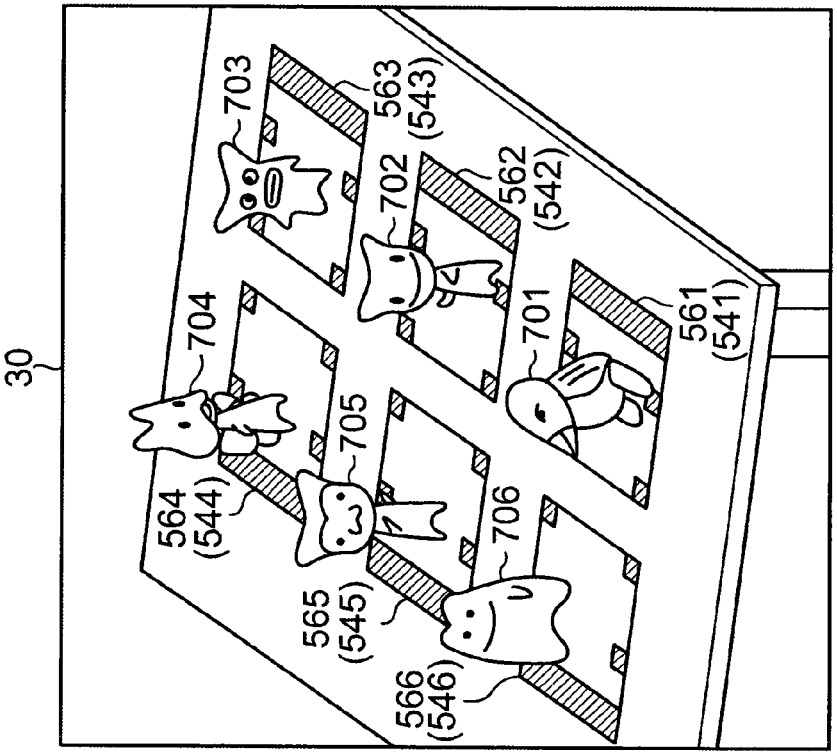

As shown in FIG. 3A and FIG. 3B, the functions implemented by the video game system is to pick up images by the CCD camera 42, for example, of six cards 541, 542, 543, 544, 545, and 546, which are placed on a desk, table or the like 52, to display thus picked up images in the monitor 30. Simultaneously, on the respectively images of the cards 541, 542, 543, 545, 546 displayed in the screen of the monitor 30, for example, on the identification images 561, 562, 563, 564, 565, and 566 respectively attached to the cards 541, 542, 543, 544, 545, and 546, images of objects (characters) 701, 702, 703, 704, 705, and 706 are displayed respectively associated with the identification images 561 to 566 of the cards 541 to 546 in such a manner as being superimposed thereon. According to the displaying manner as described above, it is possible to achieve a game which is a mixture of a game and a video game.

In addition, FIG. 3A shows an example that one user 74A places three cards 541 to 543 side by side on the desk, table, or the like 52, and the other user 74B places three cards 544 to 546 side by side on the desk, table and the like 52, similarly. Here, the "character" indicates an object such as a human being, an animal, and a hero or the like who appears in a TV show, animated movie, and the like.

As shown in FIG. 3A, the CCD camera 42 is installed on stand 72 which is fixed on the desk, table, or the like 52. Imaging surface of the CCD camera 42 may be adjusted, for example, by users 74A and 74B, so as to be oriented to the part on which the cards 541 to 546 are placed.

It is a matter of course that, as shown in FIG. 4A, an image of the user 74 who holds one card 542, for example, is picked up, so as to be seen in the monitor 30, thereby as shown in FIG. 4B, displaying the image of the user 74, the identification image 562 of the card 542, and the character image 702. Accordingly, it is possible to create a scene such that a character is put on the card 542 held by the user 74.

The functions of the present embodiment as described above are achieved, when the CPU 16 executes an application program to implement those functions, out of various programs installed in the hard disk 44 for example.

Figure 5:
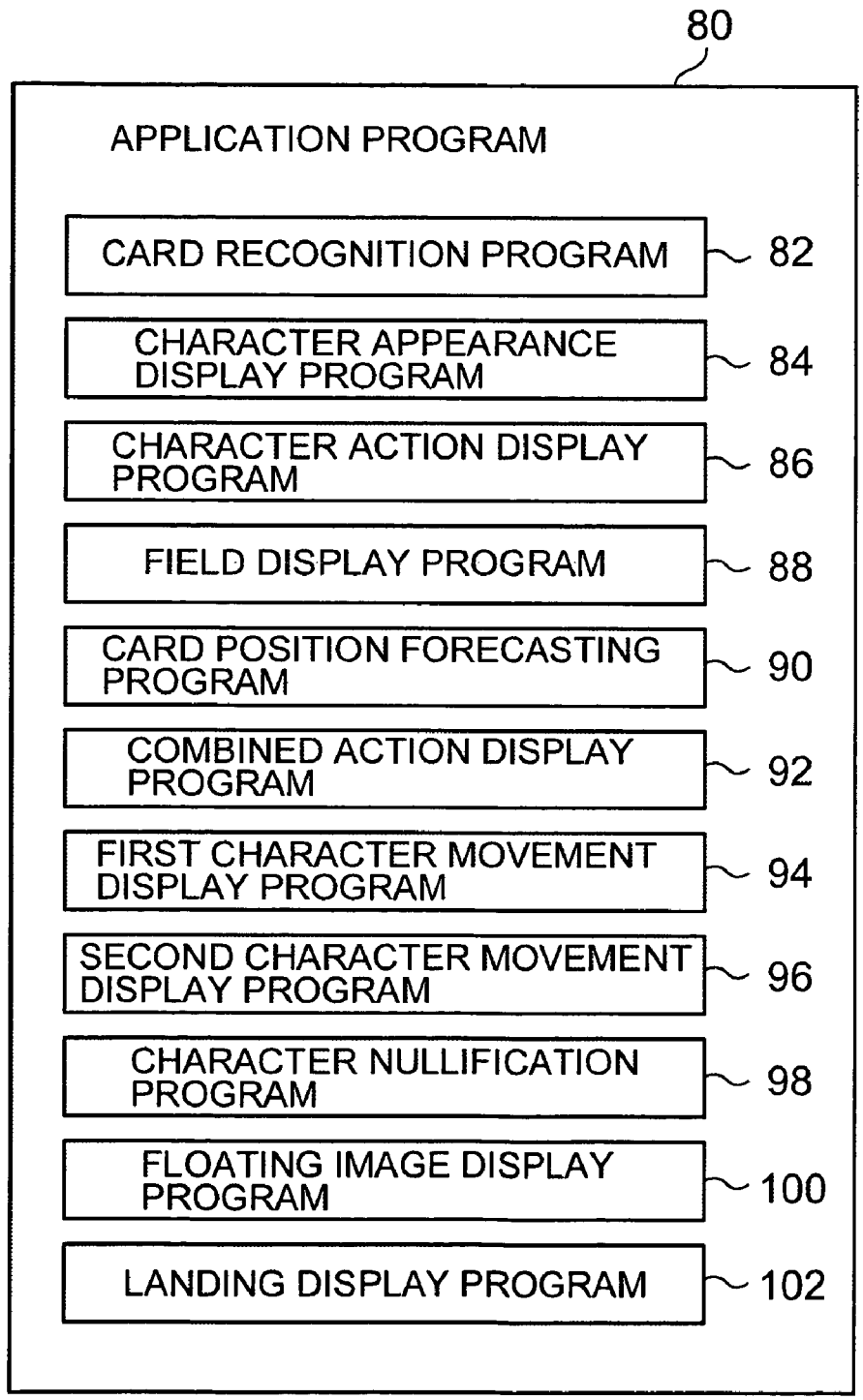
FIG. 5 is a configuration diagram showing application programs which are executed in the video game system relating to the embodiment of the present invention.

As shown in FIG. 5, the application program 80 includes, card recognition program 82, character appearance display program 84, character action display program 86, field display program 88, card position forecasting program 90, combined action display program 92, the first character movement display program 94, the second character movement display program 96, character nullification program 98, floating image display program 100, and landing display program 102.

Here, functions of the application program 80 will be explained with reference to FIG. 6 to FIG. 44.

Figure 6:
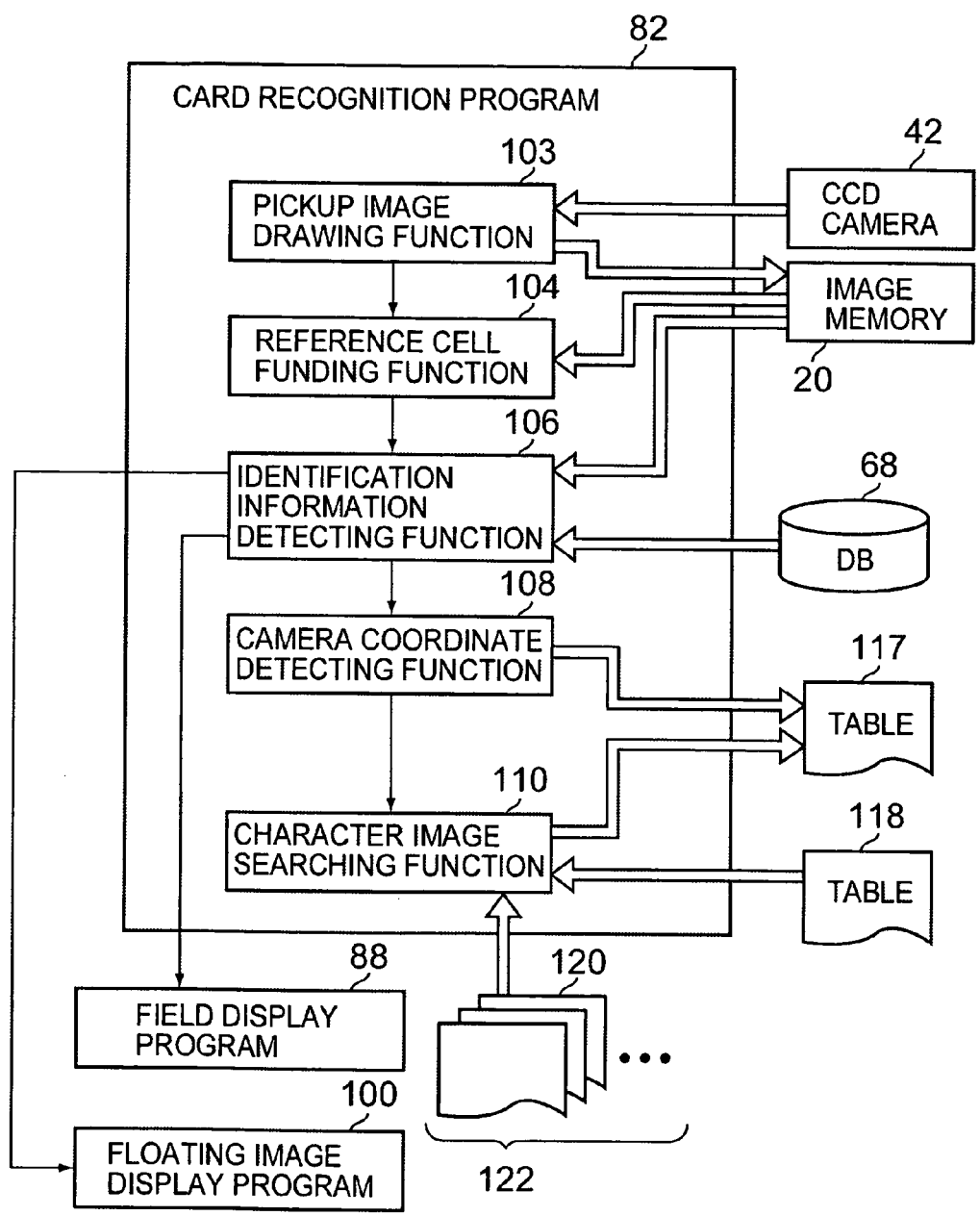
FIG. 6 is a block diagram showing functions of a card recognition program.

Firstly, the card recognition program 82 is to perform processing for recognizing the identification image 561 of the card (for example, card 541 in FIG. 3A) placed on the desk, table, or the like 52, so as to specify a character image (for example image 701 in FIG. 3B) to be displayed on the identification image 561. As shown in FIG. 6, the card recognition program 82 includes a pickup image drawing function 103, reference cell finding function 104, identification information detecting function 106, camera coordinate detecting function 108, and character image searching function 110. Here, the term "recognition" indicates to detect an identification number and the orientation of the card 541 from the identification image 561 of the card 541, having been detected from the pickup image data drawn in the image memory 20.

The pickup image drawing function 103 sets up in the image memory 20 an image of an object being picked up as a background image, and draws the image. As one processing for setting the image as the background image, setting Z value in Z-buffering is taken as an example.

As described above, the reference cell finding function 104 finds out image data of the reference cell 62 of the logo part 58 from the image data drawn in the image memory 20 (pickup image data), and detects a position of the image data of the reference cell 62. The position of the image data of the reference cell 62 is detected as a screen coordinate.

Figure 7:
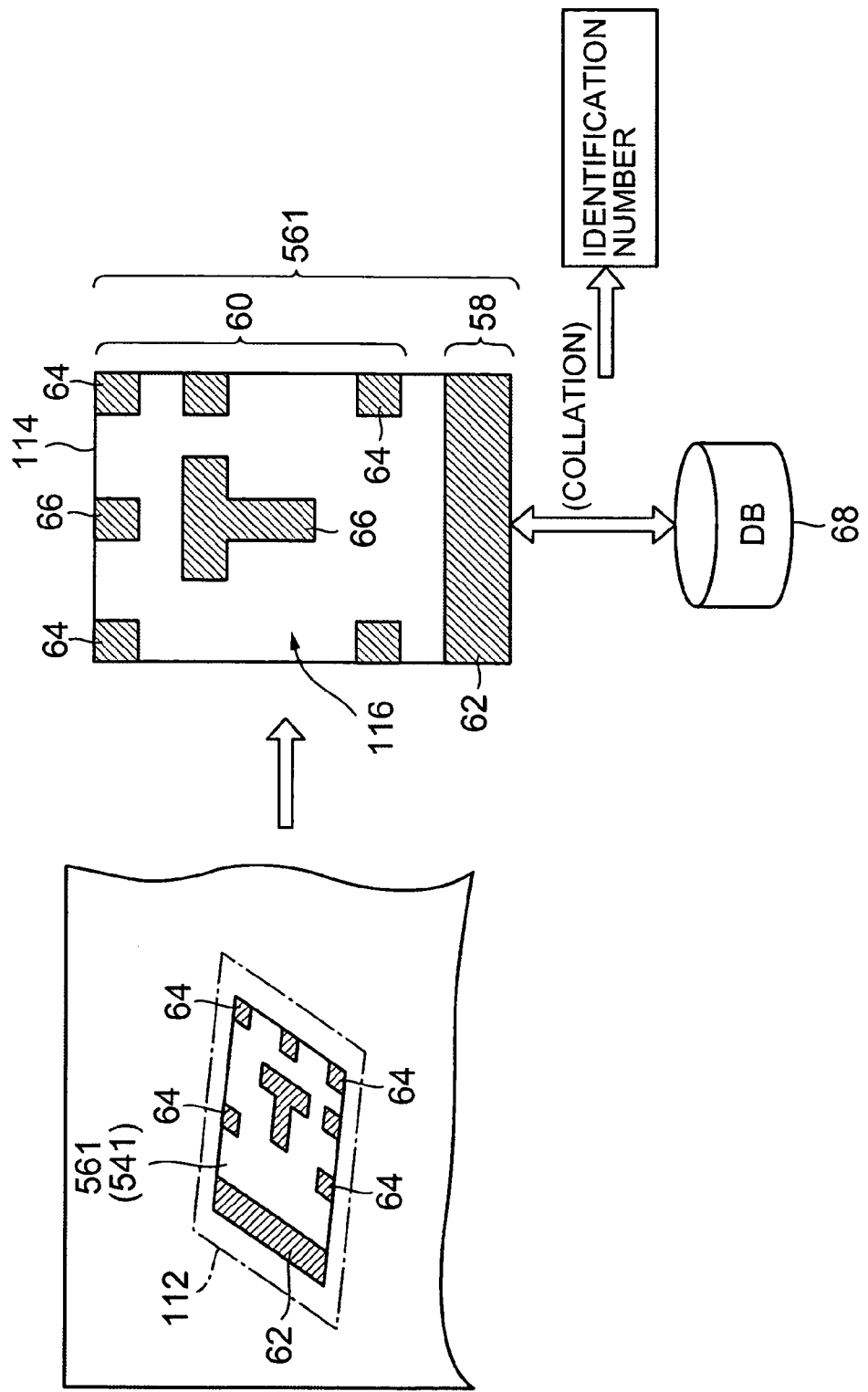
FIG. 7 is an illustration showing a process to detect an identification number from identification image of the card being picked up.

As shown in FIG. 7, the identification information detecting function 106 detects image data of the corner cells 64 based on the position of the image data of the reference cell 62 having been detected. Image data of the area 112 formed by the reference cell 62 and the corner cells 64 is subjected to affine transformation, assuming the image data as being equivalent to the image 114 which is an image viewing the identification image 561 of the card 541 from upper surface thereof, and 2D pattern of the code part 60, that is, code 116 made of 2D patterns of the corner cells 64 and the identification cells 66 is extracted. Then, identification number and the like are detected from thus extracted code 116.

As described above, detection of the identification number is carried out by collating the code 116 thus extracted with the 2D code database 68. According to this collation, if the identification number relates to a field which decides the image is a background image not a character image, the field display program 88 as described below is started. As a result of the collation, if the identification number does not exist, the floating image display program 100 as described below is started.

Figure 8:
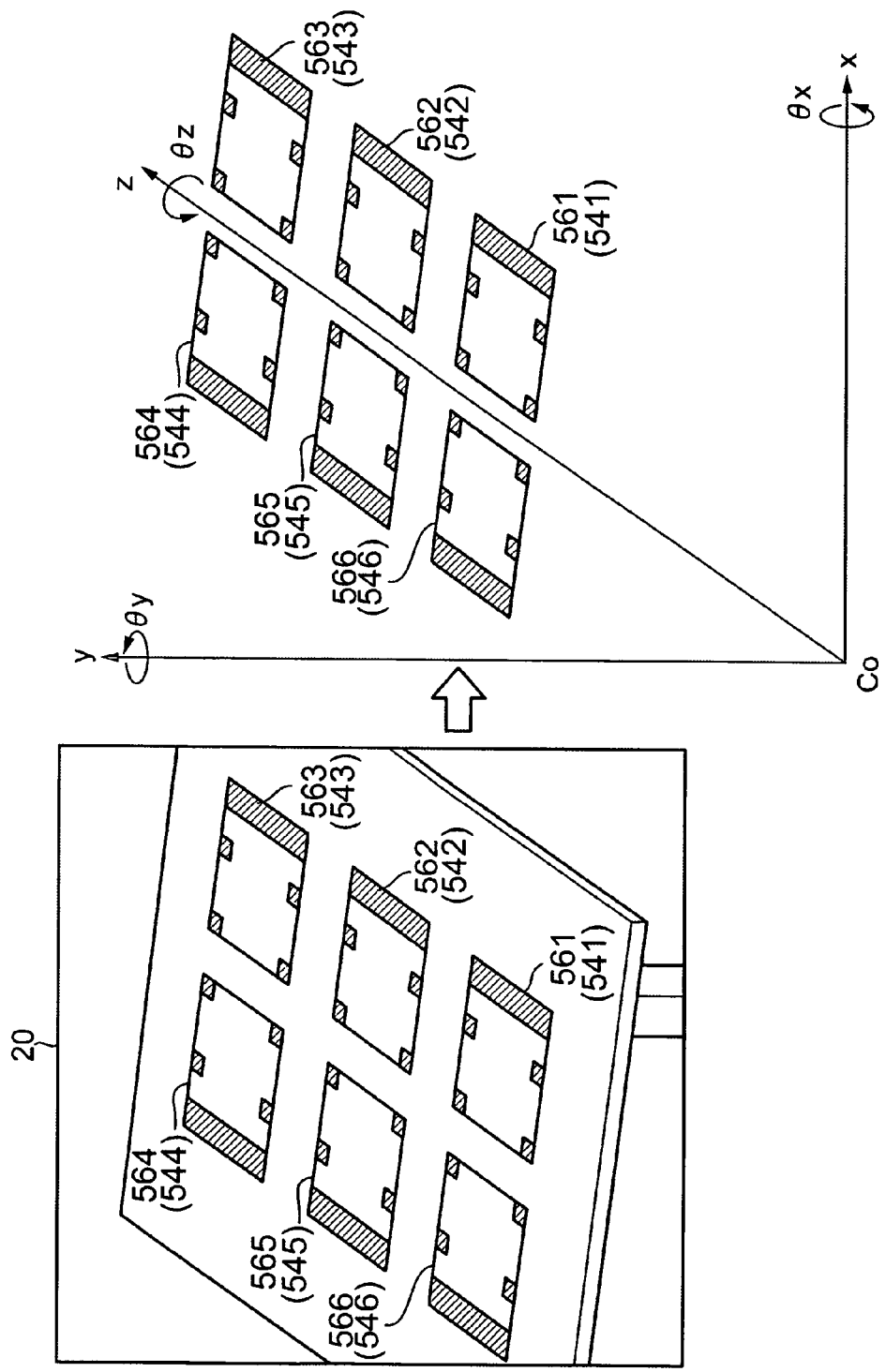
FIG. 8 is an illustration showing a process to obtain camera coordinates of pickup image based on the pickup image having been captured.

As shown in FIG. 8, the camera coordinate detection function 108 obtains a camera coordinate system (six axial directions: x, y, z, θx, θy and θz) having a camera viewing point C0 as an original point based on the detected screen coordinate and focusing distance of the CCD camera 42. Then, the camera coordinate of the identification image 561 at the card 541 is obtained. At this moment, the camera coordinate at the center of the logo part 58 in the card 541 and the camera coordinate at the center of the code part 60 are obtained.

Figure 9:
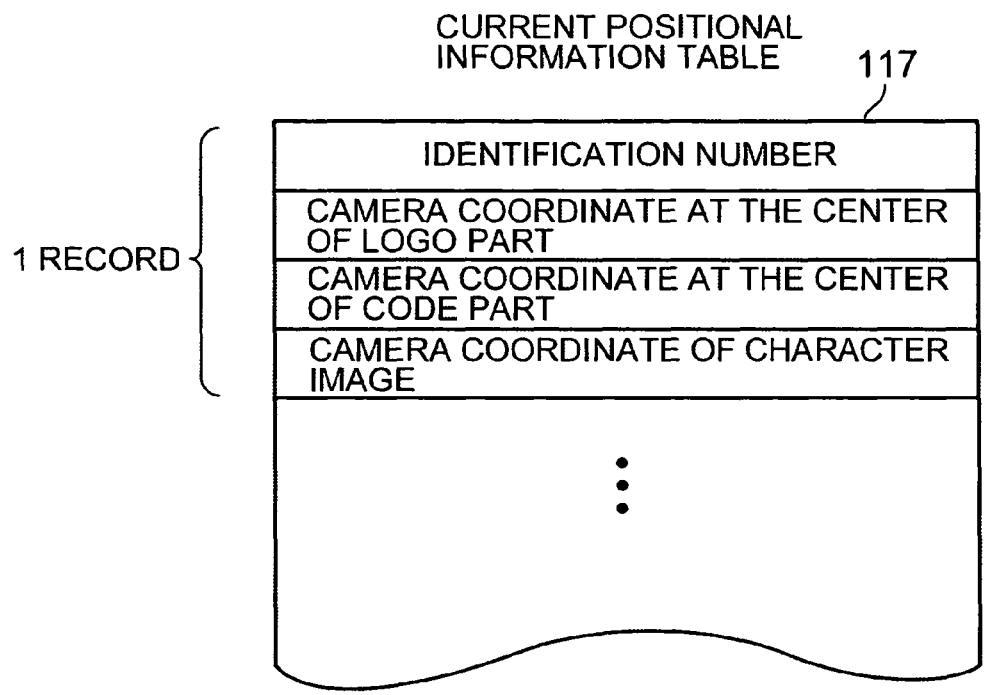
FIG. 9 is an illustration showing elements of a current positional information table.

The camera coordinate at the center of the logo part 58 and the camera coordinate at the center of the code part 60 thus obtained are registered in current positional information table 117 as shown in FIG. 9. This current positional information table 117 is an information table so as to store the camera coordinate at the center of the logo part 58 of the card, the camera coordinate at the center of the code part 60, and the camera coordinate of the character image, in such a manner as associated with the identification number of the card. Registration in this current positional information table 117 may be carried out by card position forecasting program 90, in addition to this card recognition program 82. This will be described below.

Since a method for obtaining the camera coordinate of the image from the screen coordinate of the image drawn in the image memory 20, and a method for obtaining a screen coordinate on the image memory 20 from the camera coordinate of a certain image are described in detail in the Patent Document 2 (Japanese Patent Laid-open Publication No. 2000-322602) as mentioned above, it is advised that the Patent Document 2 is referred to.

The character image searching function 110 searches the object information table 118 for a character image (for example, the character image 701 as shown in FIG. 3B), based on the identification number thus detected.

Figure 10:
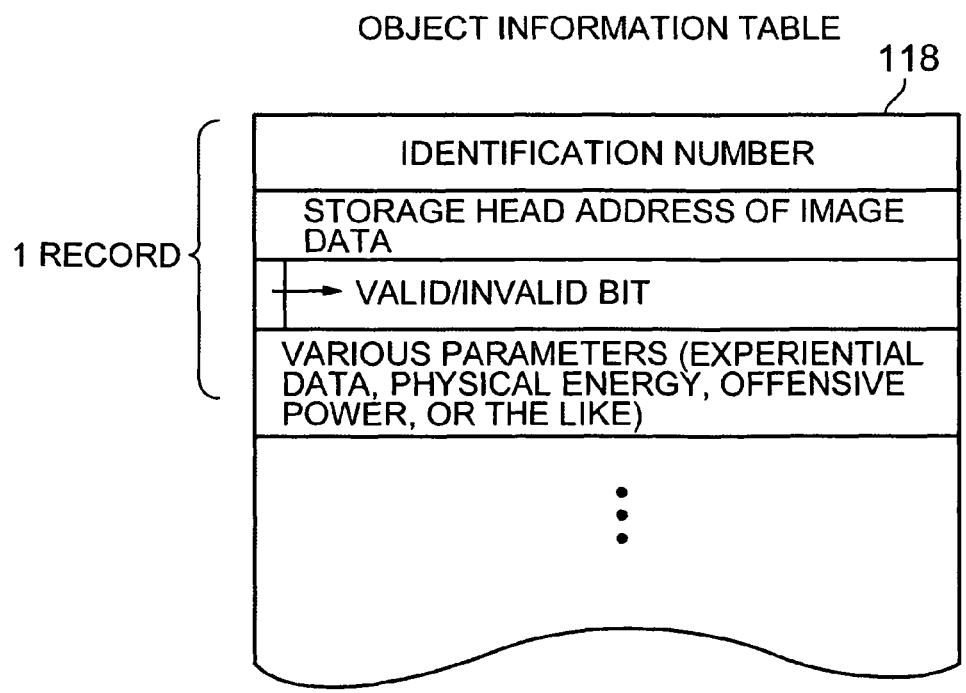
FIG. 10 is an illustration showing elements of an object information table.

For example as shown in FIG. 10, a large number of records are arranged to constitute elements of the object information table 118, and in one record, an identification number, a storage head address of the character image, various parameters (physical energy, offensive power, level, and the like), and a valid/invalid bit are registered.

The valid/invalid bit indicates a bit to determine whether or not the record is valid. When "invalid" is set, for example, it may include a case that an image of the character is not ready at the current stage, or for example, the character is beaten and killed in a battle which is set in the video game.

The character image searching function 110 searches the object information table 118 for a record associated with the identification number, and if thus searched record is "valid", the image data 120 is read out from the storage head address registered in the record. For instance, image data 120 associated with the character is read out from the storage head address, out of the data file 122 which is recorded in the hard disk 44, optical disk 32, and the like, and in which a large number of image data items are registered. If the record thus searched is "invalid", the image data 120 is not allowed to be read out.

Therefore, when one card 541 is placed on a desk, table, or the like 52, the card recognition program 82 is started, and a character image 701 is identified, which is associated with the identification number specified by the identification image 561 of the card 541 thus placed.

In addition, the character image searching function 110 registers, at a stage when the character image 701 is identified, a camera coordinate at the center of the cord part 60 of the card 541, as a camera coordinate of the character image of a record associated with the identification number of the card 541 out of the records in the current positional information table 117.

According to the card recognition program 82, it is possible to exert a visual effect merging the real space and the virtual space. Then, control is passed from this card recognition program 82 to various application programs (character appearance display program 84, character action display program 86, field display program 88, card position forecasting program 90, and the like).

Figure 11:
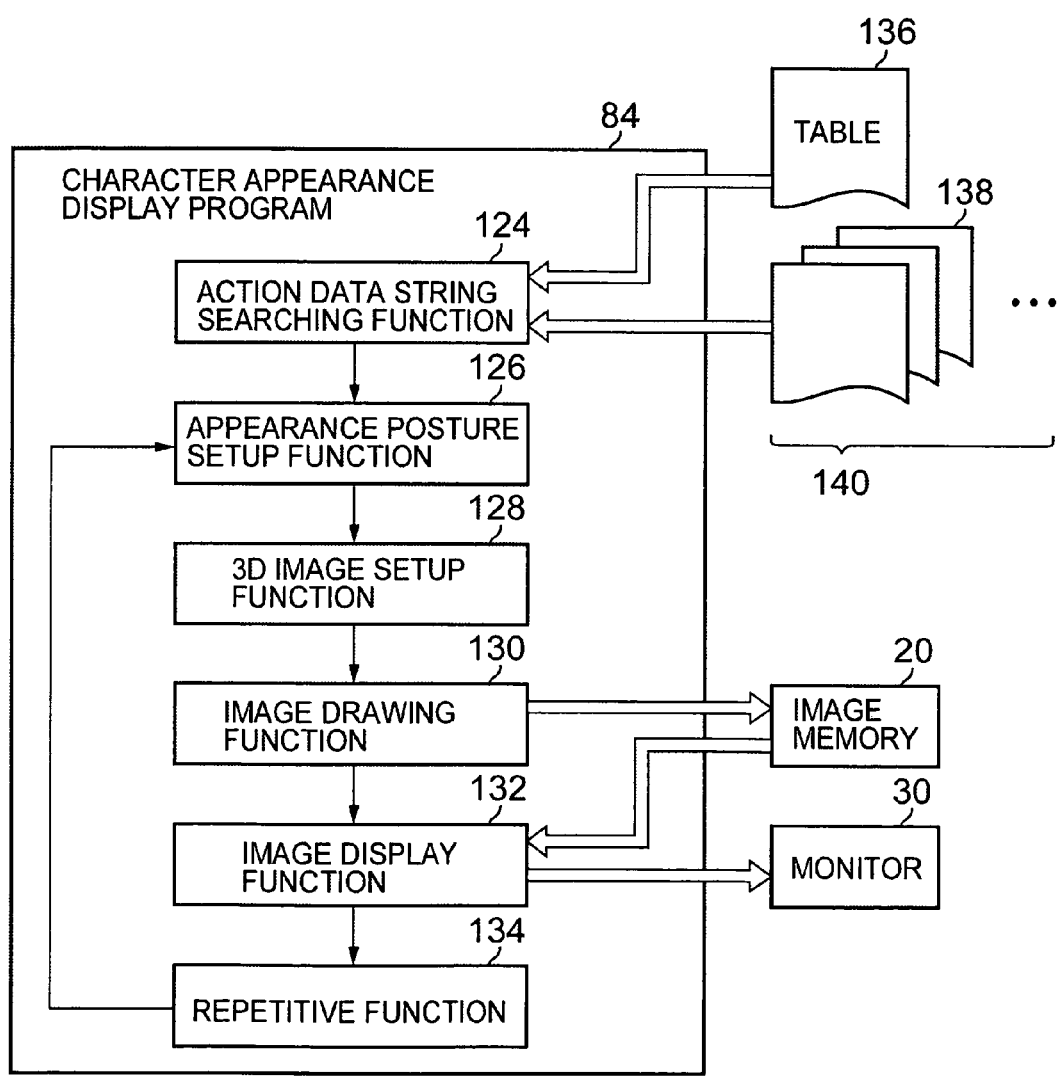
FIG. 11 is a block diagram showing functions of a character appearance display program.

Next, the character appearance display program 84 creates a display that a character image 701 associated with the identification number and the like which is specified by the identification image 561 of the detected card (for example, card 541), appears in such a manner as being superimposed on the identification image 561 of the card 541. As shown in FIG. 11, the character appearance display program 84 includes an action data string searching function 124, an appearance posture setup function 126, 3D image setup function 128, image drawing function 130, image displaying function 132, and repetitive function 134.

The action data string searching function 124 searches the appearance action information table 136 for an action data string for displaying a scene in which the character appears, based on the identification number and the like.

Specifically, at first, the action data string searching function 124 searches the appearance action information table 136 for a record associated with the identification number and the like, the table being recorded in the hard disk 44, optical disk 32, or the like, and registering a storage head address of action data string for each record. Then, the action data string searching function 124 reads out from the storage head address registered in the record thus searched, an action data string 138 representing an action where the character image 701 appears, out of the data file 140 which is recorded in the hard disk 44, optical disk 32, or the like, and a large number of action data strings 138 are registered.

The appearance posture setup function 126 sets one posture in a process where the character image 701 appears. For example, based on the action data of i-th frame (i=1, 2, 3 . . . ) of the action data string 138 thus readout, vertex data of the character image 701 is moved on the camera coordinate system, so that one posture is setup.

The 3D image setup function 128 sets up a three-dimensional image of one posture in a process where the character image 701 appears on the identification image 561 of the card 541, based on the camera coordinate of the identification image 561 of the card 541 thus detected.

The image drawing function 130 allows the three-dimensional image of one posture in a process where the character image 701 appears to be subjected to a perspective transformation into an image on the screen coordinate system, and draws thus transformed image in the image memory 20 (including a hidden surface processing). At this timing, Z value of the character image 701 in Z-buffering is reconfigured to be in the unit of frame, thereby presenting a scene where the character image 701 gradually appears from below the identification image 561 of the card 541.

The image display function 132 outputs the image drawn in the image memory 20 in a unit of frame to the monitor 30 via the I/O port 22, and displays the image on the screen of the monitor 30.

The repetitive function 134 sequentially repeats the processing of the appearance posture setup function 126, the processing of the 3D image setup function 128, the processing of the image drawing function 130, and the processing of the image display function 132. Accordingly, it is possible to display a scene where the character image 701 associated with the identification number and the like of the card 541 appears on the identification image 561 of the card 541.

Figure 12:
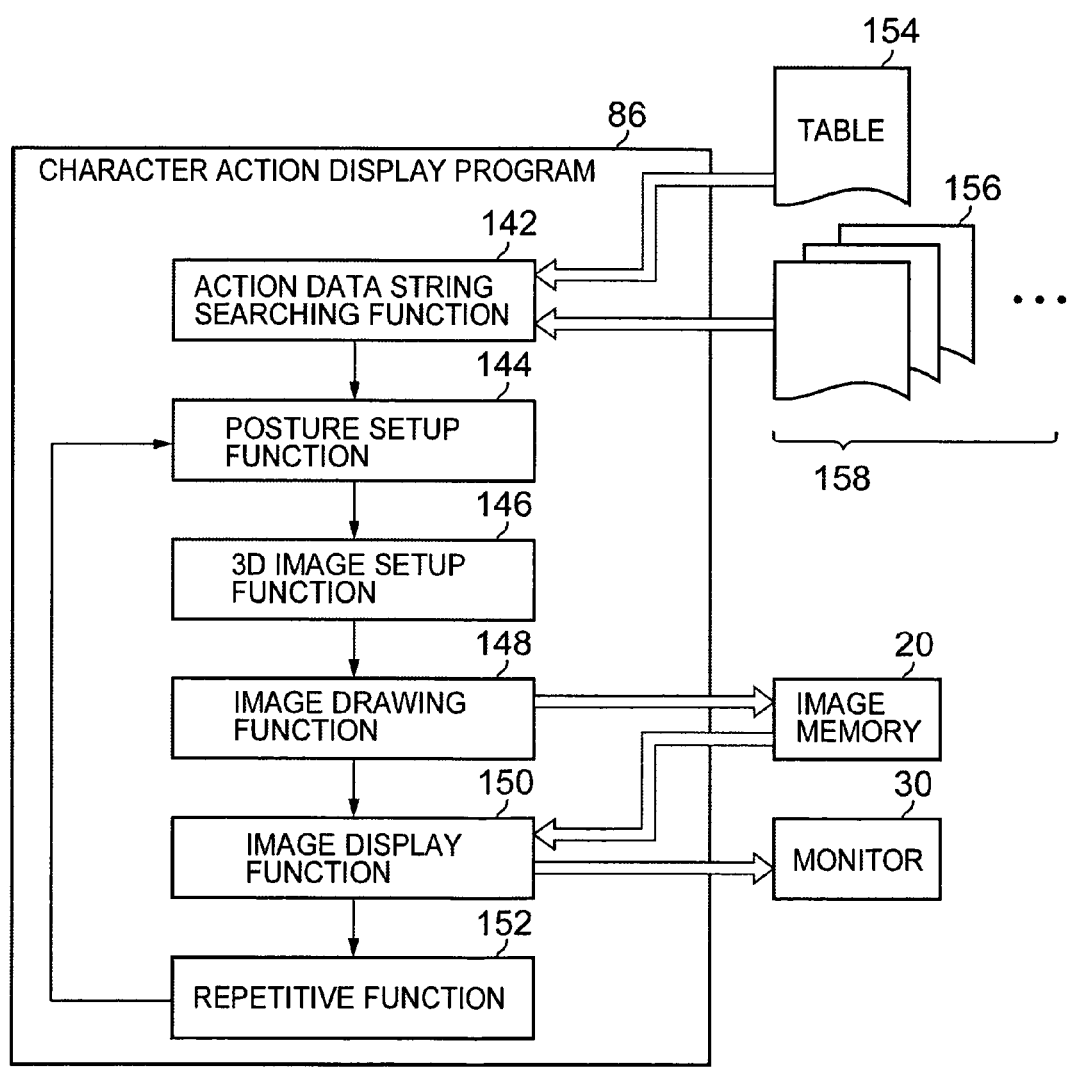
FIG. 12 is a block diagram showing functions of a character action display program.

Next, the character action display program 86 is to display a scene where the character performs following actions; waiting, attacking, enchanting, protecting another character, and the like. As shown in FIG. 12, being almost similar to the aforementioned character appearance display program 84, the character action display program 86 includes, action data string searching function 142, posture setup function 144, 3D image setup function 146, image drawing, function 148, image display function 150, and repetitive function 152.

The action data string searching function 142 searches various action information tables 154 associated with each scene, for an action data string to display the scene where the character performs following actions; waiting, attacking, enchanting, and protecting another character.

Specifically, at first, an action information table 154 associated with the action to be displayed is identified from the various action information tables 154, which are recorded for example in the hard disk 44, optical disk 32, and the like, and in which a storage head address of action data string is registered for each record. Furthermore, the action data string searching function 142 searches thus identified action information table 154 for a record associated with the identification number and the like.

Then, out of the data file 158 which is recorded in the hard disk 44, optical disk 32, or the like and in which a large number of action data strings 156 are registered, the action data string searching function 142 reads out from the head address registered in the record thus searched, the action data string 156 which is associated with the action to be displayed for this time (the character's action, such as waiting, attacking, enchanting, or protecting another character).

The posture setup function 144 sets, for example as to a character regarding the card 541, one posture in a process while the character image 701 is waiting, one posture in a process while the character image is attacking, one posture in a process while the character image is enchanting, and one posture in a process while the character image is protecting another character. For instance, based on the action data of the i-th frame (i=1, 2, 3 . . . ) of the action data string 156 thus read out, the vertex data of the character image 701 is moved on the camera coordinate system and one posture is set up.

The 3D image setup function 146 sets three-dimensional images of one posture on the identification image 561 of the card 541, in a process while the character image 701 is waiting, one posture in a process while the character image is attacking, one posture in a process while the character image is enchanting, and one posture in a process while the character image is protecting another character, based on the camera coordinate of the identification image 561 on the card 541 thus detected.

The image drawing function 148 allows the 3D images of one posture in a process while the character image 701 is waiting, one posture in a process while the character image is attacking, one posture in a process while the character image is enchanting, and one posture in a process while the character image is protecting another character, to be subjected to perspective transformation into images on the screen coordinate system, and draws thus transformed images into the image memory 20 (including hidden surface processing).

The image display function 150 outputs the image drawn in the image memory 20 in a unit of frame to the monitor 30 via the I/O port 22, and displays the image on the screen of the monitor 30.

The repetitive function 152 sequentially repeats the processing of the posture setup function 144, the processing of the 3D image setup function 146, the processing of the image drawing function 148, and the processing of the image display function 150. Accordingly, it is possible to display scenes where the character image 701 is waiting, attacking, enchanting, and protecting another character.

With the aforementioned card recognition program 82, the character appearance display program 84, and the character action display program 86, it is possible to allow a character in a card game to appear in a scenario of a video game, and perform various actions. In other words, a card game which has been enjoyed only in a real space can be spread to the virtual space, thereby offering a new type of game merging the card game and the video game.

Figure 13A:
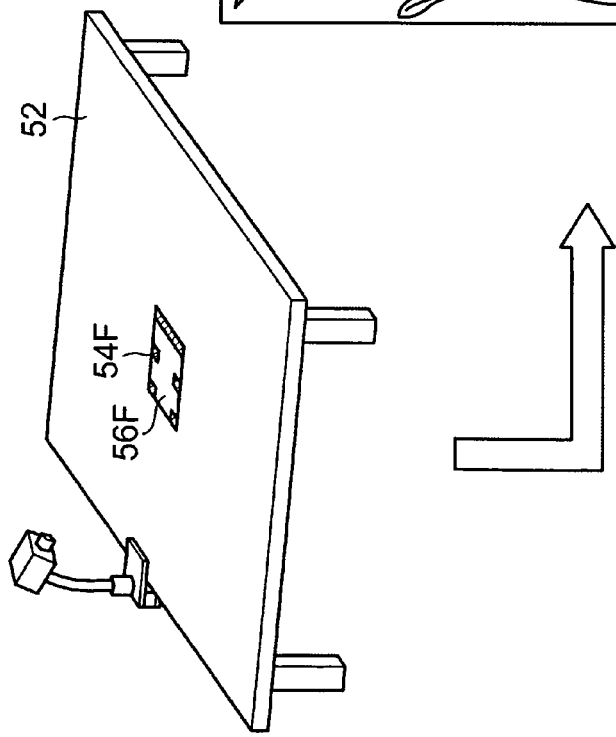
Figure 13B:
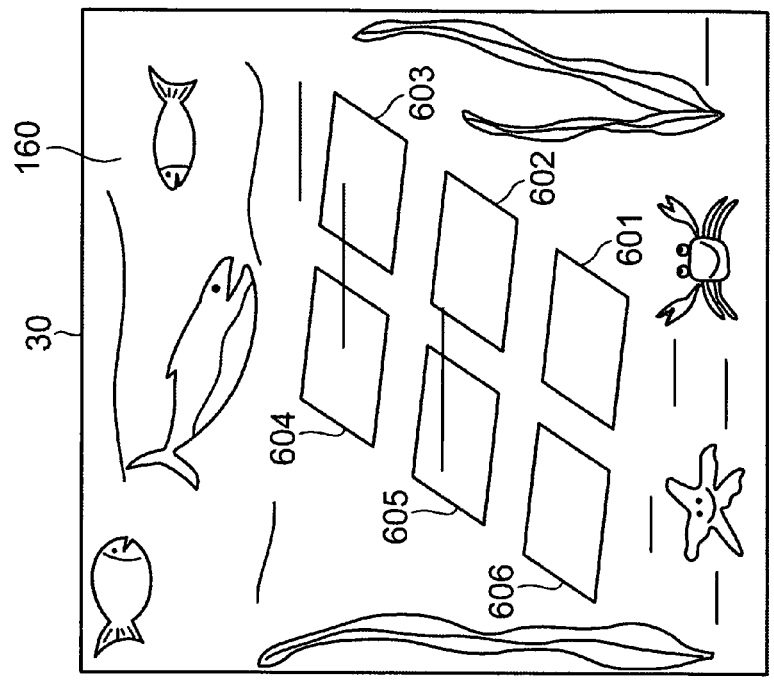
FIG. 13B is an illustration showing an example which displays on a monitor screen, a background image associated with the field card and squares on which versus-fighting cards are to be placed.

Next, field display program 88 will be explained. As shown in FIG. 13A, in the case where the first card placed on the desk, table or the like 52 relates to a field (hereinafter, referred to as "field card 54F"), this program 88 is started by the card recognition program 82. As shown in FIG. 13B, this program 88 displays on the screen of the monitor 30, background image 160 associated with the identification number specified by the identification image 56F on the field card 54F and multiple images 601 to 606, each in a form of square, indicating positions for placing versus-fighting game cards.

Figure 14:
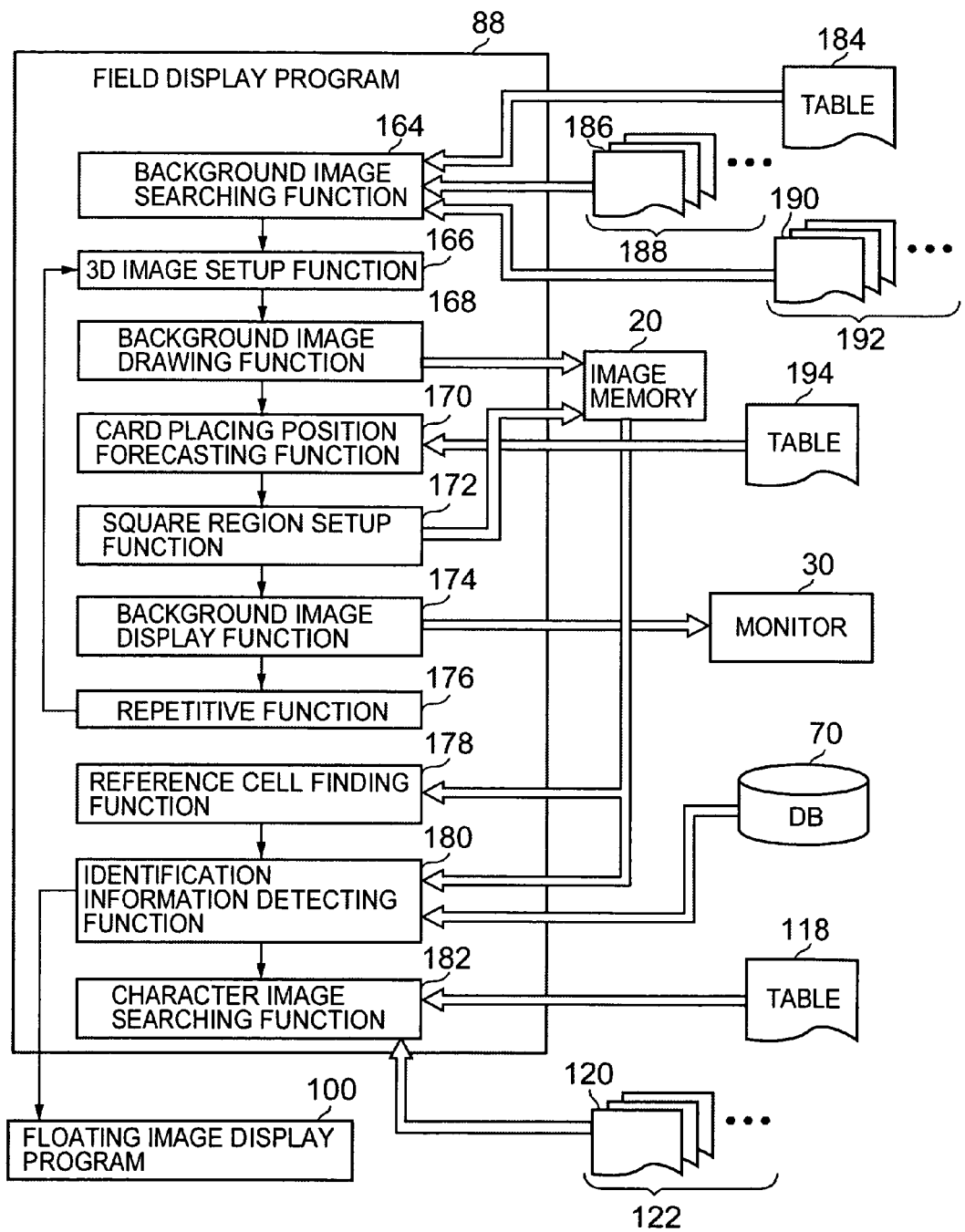
FIG. 14 is a block diagram showing functions of a field display program.

As shown in FIG. 14, this field display program 88 includes background image searching function 164, 3D image setup function 166, background image drawing function 168, card placing position forecasting function 170, square region setup function 172, background image display function 174, repetitive function 176, reference cell finding function 178, identification information detecting function 180, and character image searching function 182.

Figure 15:
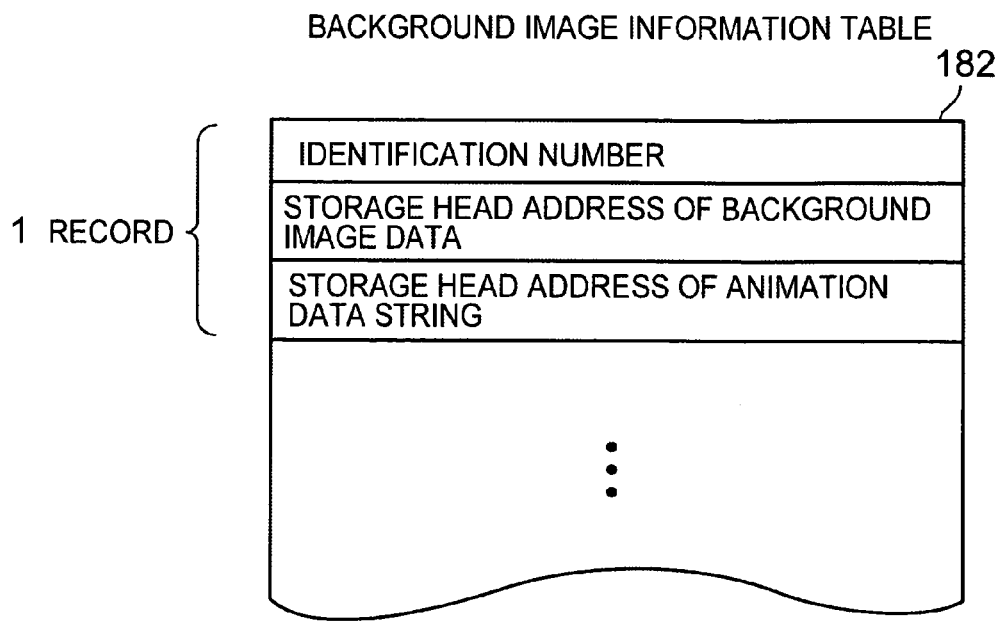
FIG. 15 is an illustration showing elements of a background image information table.

The background image searching function 162 searches the background image information table 184 for a background image 160 associated with the identification number of the field card 54F. As shown in FIG. 15 for example, the background image information table 184 includes as elements a large number of records being arranged, and one record registers the identification number, a storage head address of the background image data, and a storage head address of animation data string.

This background image searching function 164 searches the background image information table 184 recorded, for instance, in the hard disk 44, optical disk 32, and the like, for a record associated with the identification number.

Then, the background image searching function 164 reads out background image data 186 associated with the identification number of the field card 54F from the storage head address registered in the record thus searched, out of the data file 188 which is recorded in the hard disk 44, optical disk 32, and the like, and which registers a large number of background image data 186.

The background image searching function 164 further reads out an animation data string 190 associated with the identification number of the field card 54F from the storage head address registered in the record thus searched, out of the data file 192 which registers a large number of animation data strings 190.

The 3D image setup function 166 sets up a scene (process) of a background image in motion. For example, based on the i-th frame (i=1, 2, 3 . . . ) of the animation data string 190 thus read out, the vertex data of the background image data 186 is moved on the camera coordinate, and one scene is set up.

The background image drawing function 168 allows a 3D image representing one scene of the background image in motion to be subjected to perspective transformation into an image on the screen coordinate system, and draws thus transformed image in the image memory 20 (including hidden surface processing). At this timing, Z value of the background image 160 in Z-buffering is set to a value lower than the Z value of the pickup image (a value closer to the camera viewpoint than the pickup image), and the background image 160 is given priority over the pickup image, to be displayed.

Figure 16:
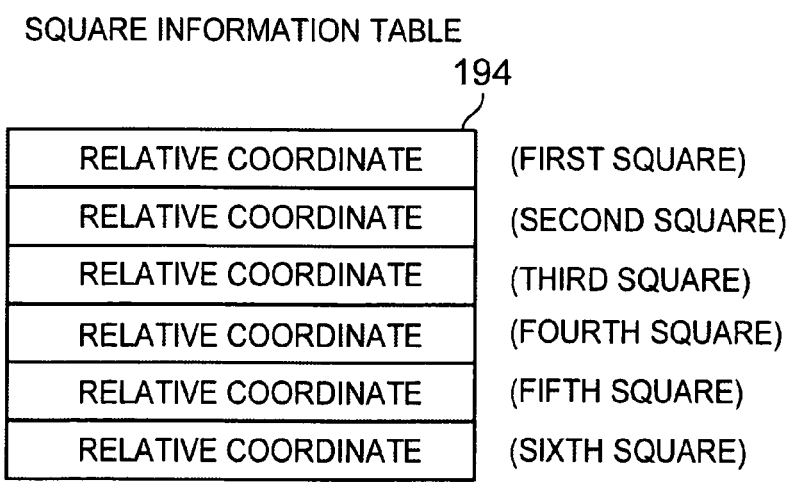
FIG. 16 is an illustration showing elements of a square information table.

The card placing position forecasting function 170 forecasts camera coordinates of the multiple squares (in FIG. 13B, six squares 601 to 606), based on the camera coordinate of the field card 54 thus detected. At this timing, the square information table 194 is used. As shown in FIG. 16, this square information table 194 registers relative coordinates respectively, assuming a position on which the field card 54F is placed as a reference position.

Figure 17:
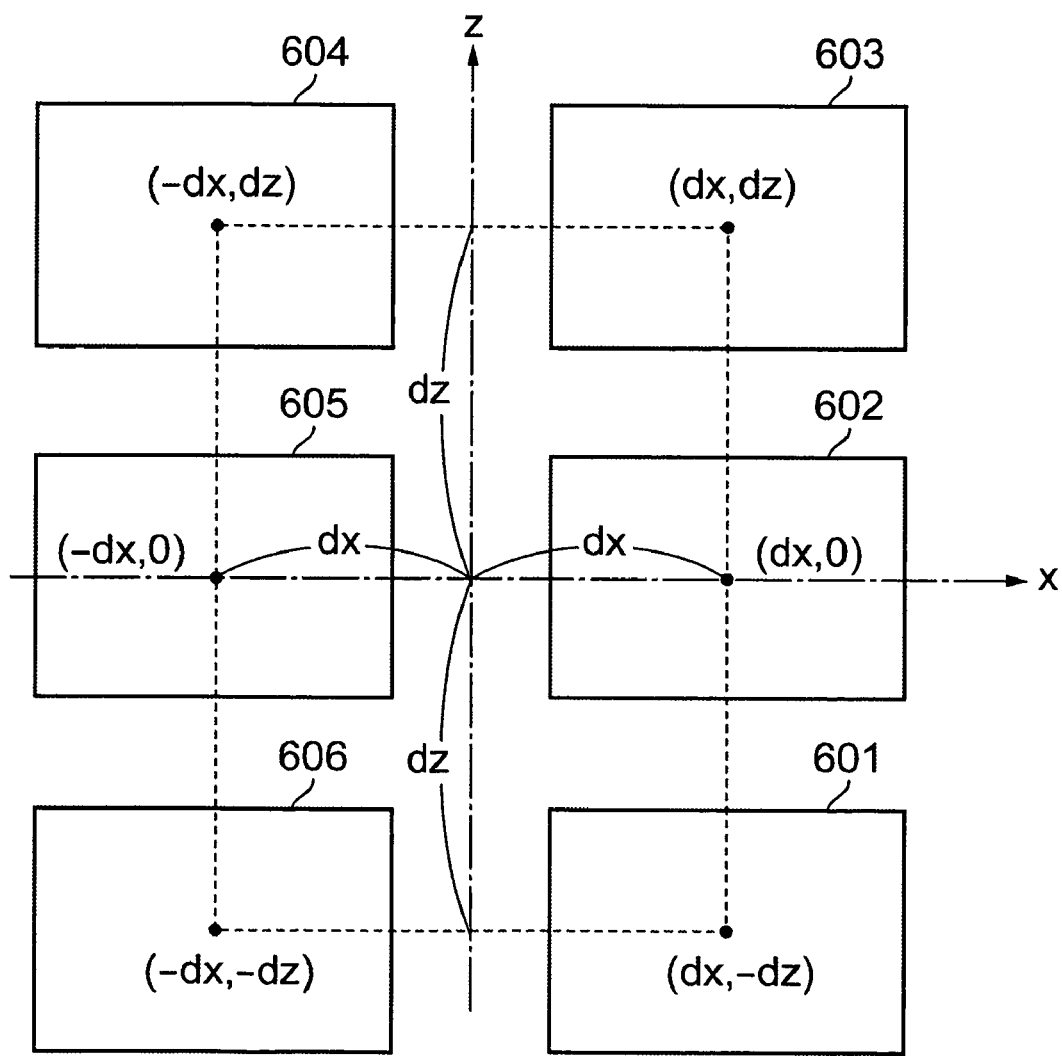
FIG. 17 is an illustration to explain relative coordinates of six squares.

Specifically, as shown in FIG. 17 for example, when the origin (0, 0) on the xz plane is assumed as a position on which the field card 54F is placed, (dx, −dz), (dx, 0), (dx, dz), (−dx, dz), (−dx, 0), and (−dx, −dz) are registered as relative coordinates of the first to the sixth squares. The lengths of dx and dz are determined based on an actual card size, and these lengths are set to values so that a card does not overlap the card placed adjacently.

Therefore, if the camera coordinate of the reference position (origin) is determined, each of the camera coordinates of the squares 601 to 606 is easily obtained according to the square information table. The camera coordinates of those six squares 601 to 606 represent camera coordinates of the positions where the multiple cards (hereinafter, referred to as versus-fighting cards 541 to 546) other than the field card 54F are placed.

The square region setup function 172 sets up six squares 601 to 606 respectively on the six camera coordinates thus obtained on which the versus-fighting cards 541 to 546 are to be placed.

Specifically, out of Z values of the pickup image, the Z value, corresponding to a region obtained by allowing squares 601 to 606 to be subjected to perspective transformation into the screen coordinate system, is set to a value lower than the Z value of the background image 160 (a value closer to the camera viewpoint than the background image 160), where the squares 601 to 606 are each in a form of rectangle being a size larger than the size of each of the versus-fighting cards 541 to 546, for instance. Accordingly, the pickup images are displayed on the parts corresponding to the six squares 601 to 606 in the background image 160.

The background image display function 174 outputs the image drawn in the image memory 20 in a unit of frame to the monitor 30 via the I/O port 22, and displays the background image 160 on the screen of the monitor 30, and the pickup images are displayed on the parts respectively corresponding to the six squares 601 to 606 in the background image 160.

The repetitive function 176 sequentially repeats the processing of the 3D image setup function 166, the processing of the background image drawing function 168, the processing of the card placing position forecasting function 170, the processing of the square region setup function 172, and the processing of the background image display function 174. Accordingly, as shown in FIG. 12B, the background image 160 in motion is displayed on the screen of the monitor 30, and in this background image 160, the pickup images are displayed, being projected on the parts corresponding to the six squares 601 to 606.

In other words, a user puts the versus-fighting cards 541 to 546 respectively on the six squares 601 to 606 on the desk, table or the like 52, thereby clearly projecting the identification images 561 to 566 of the versus-fighting cards 541 to 546 from the background image 160. Therefore, the user is allowed to put the versus-fighting cards 541 to 546 respectively on the six squares 601 to 606.

On the other hand, the reference cell finding function 178 obtains six drawing ranges on the image memory 20 based on the camera coordinates of the six squares 601 to 606, while the background image 160 in motion is displayed. Then, the reference cell finding function 178 finds out whether or not the identification images 561 to 566 of the versus-fighting cards 541 to 546 exist within each of the drawing ranges, and in particular, whether a reference cell 62 of the logo part 58 exists in the range.

Figure 18A:
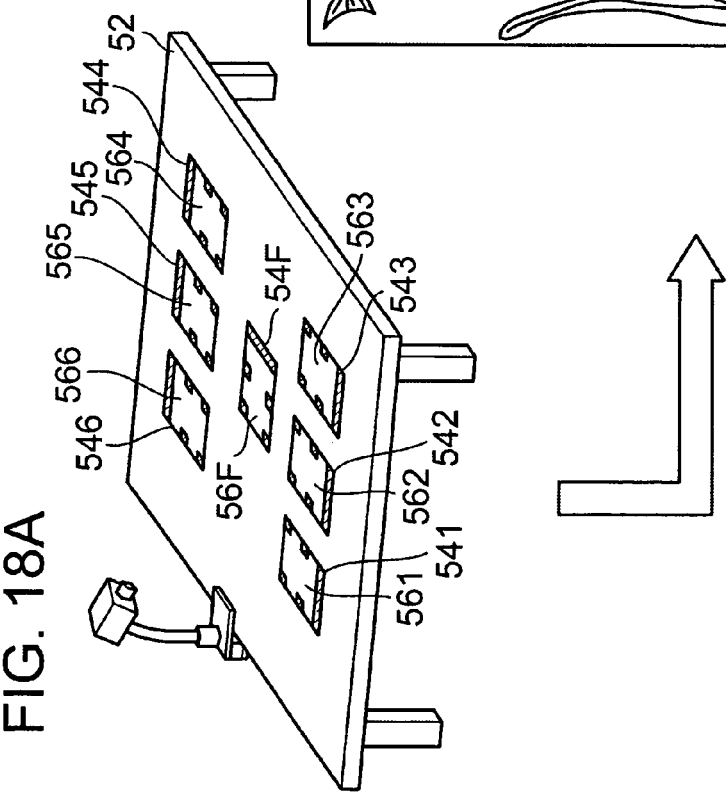

For instance, as shown in FIG. 18A, when six versus-fighting cards 541 to 546 are placed on the desk, table, or the like 52 to be corresponding to the six squares 601 to 606 displayed on the monitor 30 (see FIG. 13B), a position of each reference cell of the six versus-fighting cars 541 to 546 is detected.

The identification information detecting function 180 performs the same processing as that of the identification information detecting function 106 in the card recognition program as described above, and detects each of the identification numbers of the placed six cards 541 to 546, which are identified based on each of the identification information 561 to 566 of the six cards 541 to 546. As a result of the collation, if the identification number does not exist, floating image displaying program 100 described below is started.

The character image searching function 182 searches the object information table 118 for character image data 120 associated with the identification numbers of the versus-fighting cards 541 to 546 placed respectively corresponding to the six squares 601 to 606.

For example, the object information table 118 is searched for records respectively associated with the identification numbers, and if a record thus searched is "valid", the image data 120 is read out from each of the storage head addresses registered in the respective records. At this point of time, the character images 701 to 706 of the versus-fighting cards 541 to 546, placed corresponding to the six squares 601 to 606 respectively, are determined.

Figure 18B:
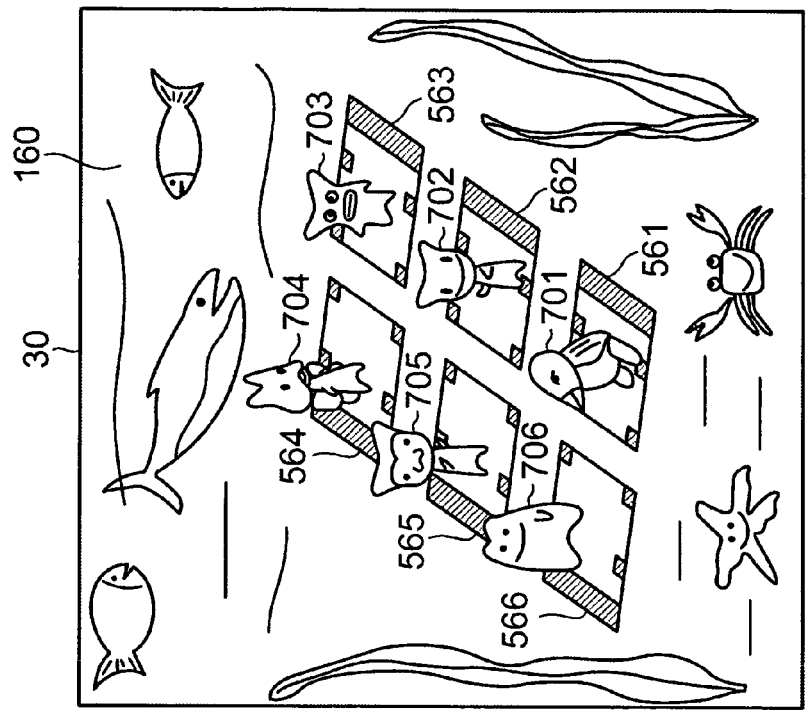
FIG. 18B is an illustration showing an example which displays on a monitor screen, a background image associated with the field card, squares in which versus-fighting cards are to be placed, and character images being specified by the identification images of the versus-fighting cards.

Following this, the character appearance display program 84 is started, for example. As shown in FIG. 18B, a scene is displayed where the character images 701 to 706 associated with the versus-fighting cards 541 to 546 respectively appear on the identification images 561 to 566 of the versus-fighting cards 541 to 546.

The field display program 88 does not search the overall image memory 20 to know at which part the user placed the versus-fighting card 541 to 546, but it indicates the positions to place the versus-fighting cards 541 to 546 by use of six squares 601 to 606. Therefore, detection is performed targeting around the positions of the six squares 601 to 606, so that the versus-fighting cards 541 to 546 can be recognized. Accordingly, it is not necessary to detect all over the image memory 20 every time when the fighting card is recognized, thereby reducing loads for recognition processing with regard to the six cards 541 to 546. With the configuration above, the speed of processing may be enhanced.

Next, the card position forecasting program 90 will be explained. This program 90 is suitable for six-person match or two-person match, for example. This program detects a position of an image as a reference (reference image), and based on the position of the reference image, positions at which the versus-fighting cards are placed are forecasted.

As shown in FIG. 19A for example, it is possible to utilize as the reference image, the identification image 56F of the field card 54F which is placed on the desk, table, or the like 52, prior to placing the versus-fighting cards 541 to 546. Alternatively, in the example of two-person match, as shown in FIG. 20A, a rectangular mat 196 is put on the desk, table, or the like 52, and the versus-fighting card 541 to 546 are placed respectively in the six squares drawn on the mat 196 for fighting (three squares are placed side by side for one person: the first to sixth squares 801 to 806). In this example, "+" image 198 drawn at the center of the mat 196 is used as the reference image. Further alternatively, as shown in FIG. 21A, in the example of six-person match, a circular mat 200 is put on the desk, table, or the like 52, and the versus-fighting cards 541 to 546 are placed respectively in the six squares drawn on the mat 200 for fighting (placed in a circle: the first to sixth squares 901 to 906). In this example, the image 202 drawn at the center position of the mat 200 is used as the reference image, for instance.

If an item is placed, for example, at the center or at the corner of the fighting area, without putting the aforementioned mat 196 or 200, the image or the like of the item is assumed as the reference image.

In the following descriptions, those images which are candidates to be used as a reference image are referred to as "reference images 201". It is preferable that an image used as the reference image 201 should have a property clearly indicating the orientation.

Figure 22:
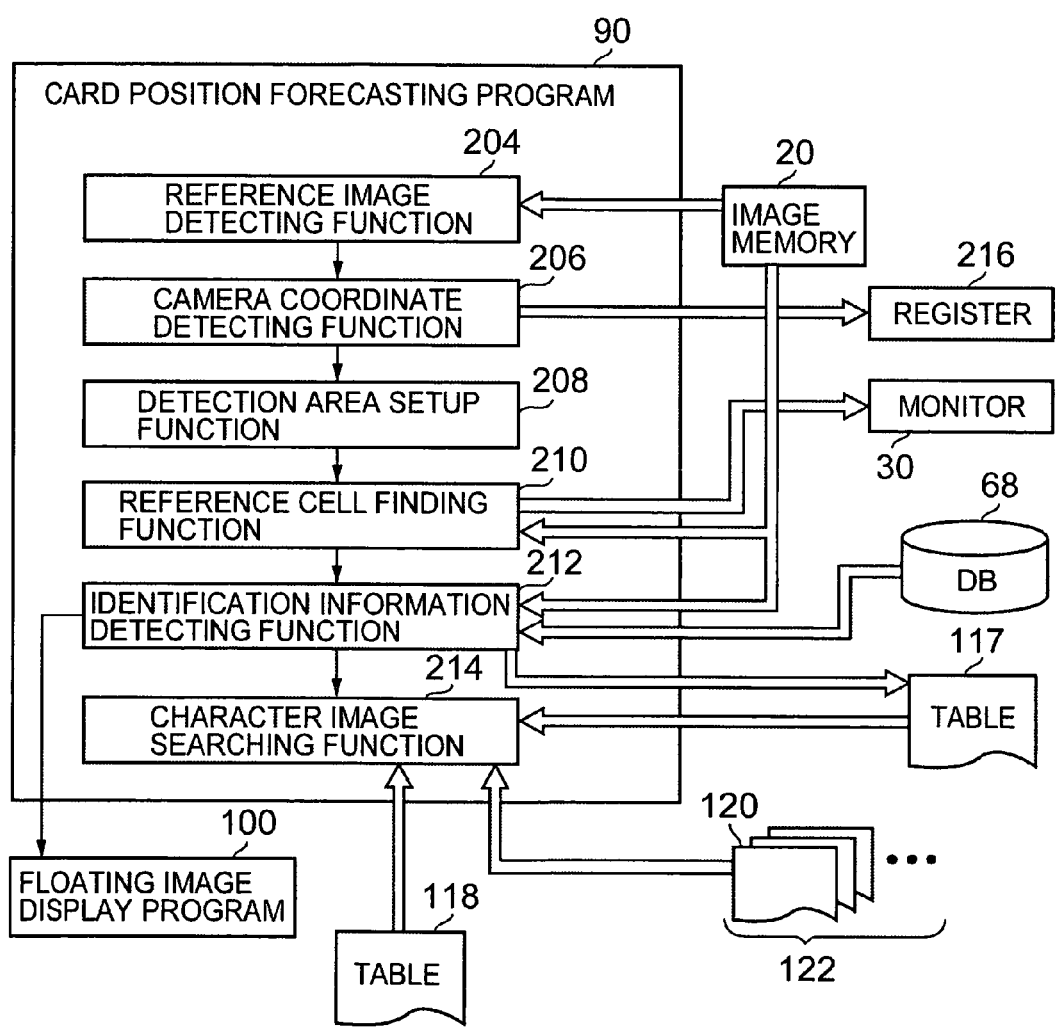
FIG. 22 is a block diagram showing functions of a card position forecasting program.

As shown in FIG. 22, the card position forecasting program 90 includes reference image detecting function 204, camera coordinate detecting function 206, detection area setup function 208, reference cell finding function 210, identification information detecting function 212, and character image searching function 214.

Here, processing operations of the card position forecasting program 90 will be explained with reference to FIG. 22 to FIG. 25B.

At first, in step S1 in FIG. 23, the reference image detecting function 204 detects a position of the reference image 201 from the pickup image data drawn in the image memory 20. In this position detection, multiple images obtained by picking up a predetermined reference image 201 from various angles are registered as lookup images. According to a method such as pattern matching and the like using the lookup images, the reference image 201 can be easily detected from the pickup image data. It is a matter of course that the reference image 201 may be detected through another pattern recognition method. Position of the reference image 201 is detected as a screen coordinate.

Thereafter, in step S2, the camera coordinate detecting function 206 obtains a camera coordinate system (in six axial directions: x, y, z, θx, θy and θz) assuming a camera viewpoint as an origin, based on the screen coordinate of the reference image 201 thus detected and the focal distance of the CCD camera 42, and further obtains the camera coordinate of the reference image 201 thus detected. Then, the camera coordinate at the center of the reference image 201 is obtained.

Thus obtained camera coordinate of this reference image 201 is registered in register 216. The camera coordinate of the reference image 201 registered in the register 216 is utilized also in the first character movement display program 94, as well as used in the card position forecasting program 90. This will be described in the following.

Thereafter, in step S3, the detection area setup function 208 obtains a camera coordinate of the area including the reference image 201 and being a finding target by the reference cell finding function 210, based on the camera coordinate of the reference image 201.

Figure 25A:
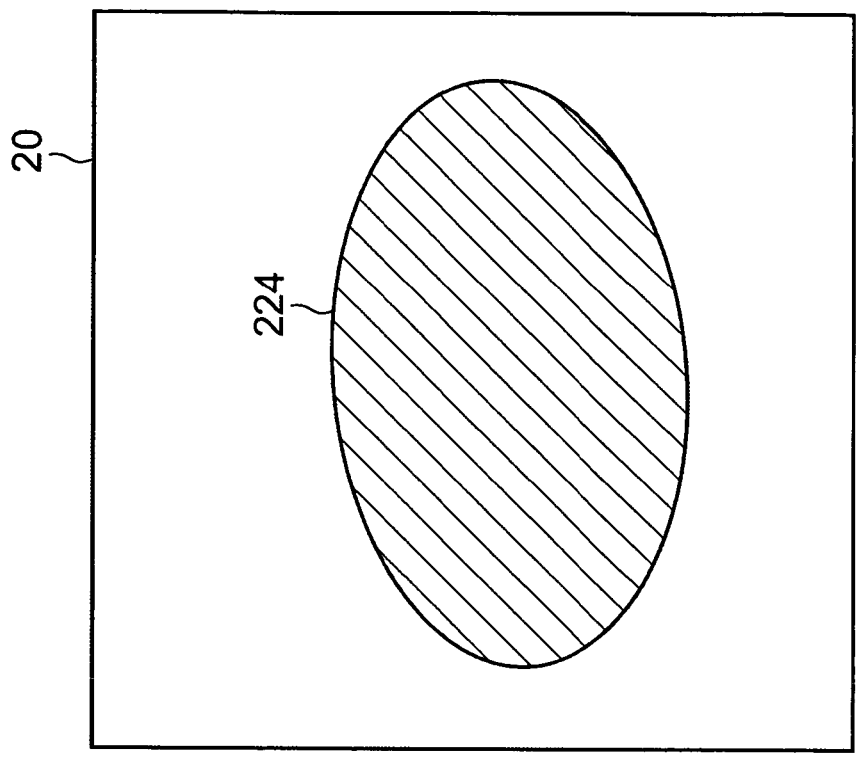
FIG. 25A and FIG. 25B are illustrations showing a process to obtain a detection area in the case where multiple cards are placed in a circle respectively for at least three persons in versus-fighting game.

As shown in FIG. 25A, the area to be found is a rectangular area 218 having the reference image 201 as a center, in the case where multiple cards are placed side by side for each person in two-person match. If the multiple cards are placed in a circle in a match for three-person or more, as shown in FIG. 25A, it is a circular area having the reference image 201 as a center. In the following, the rectangular area 218 and the circular area 220 are referred to as detection area 222.

Figure 24A:
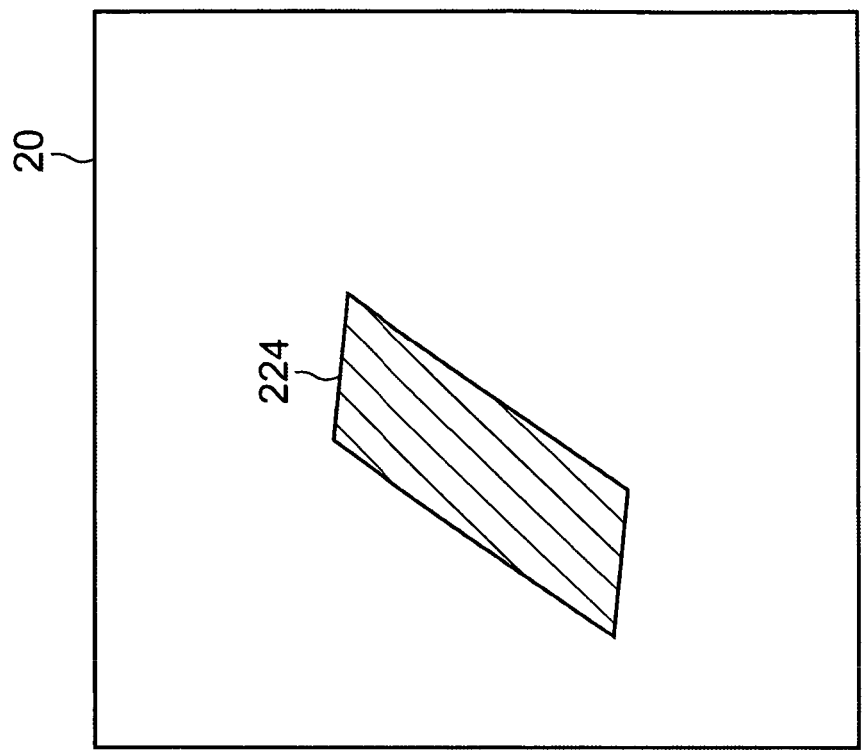
FIG. 24A and FIG. 24B are illustrations showing a process to obtain a detection area in the case where multiple cards are placed side by side, respectively for two persons in versus-fighting game.
Figure 24B:
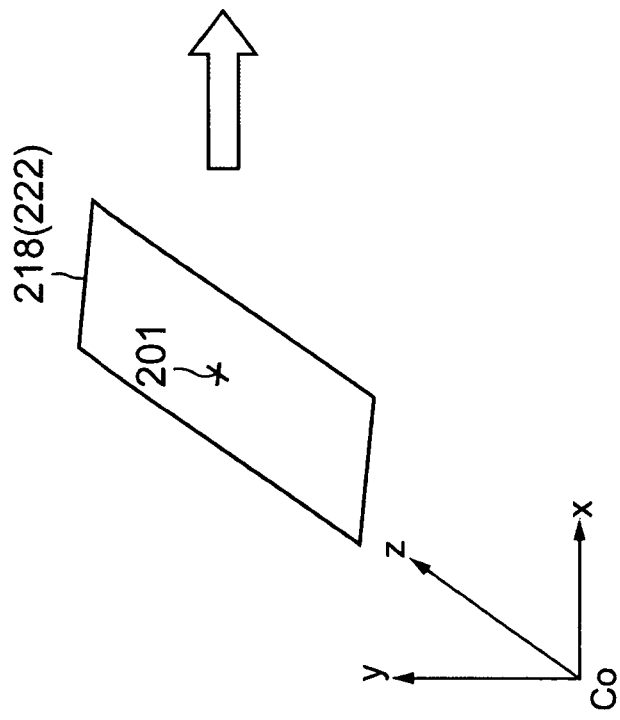
Figure 25B:
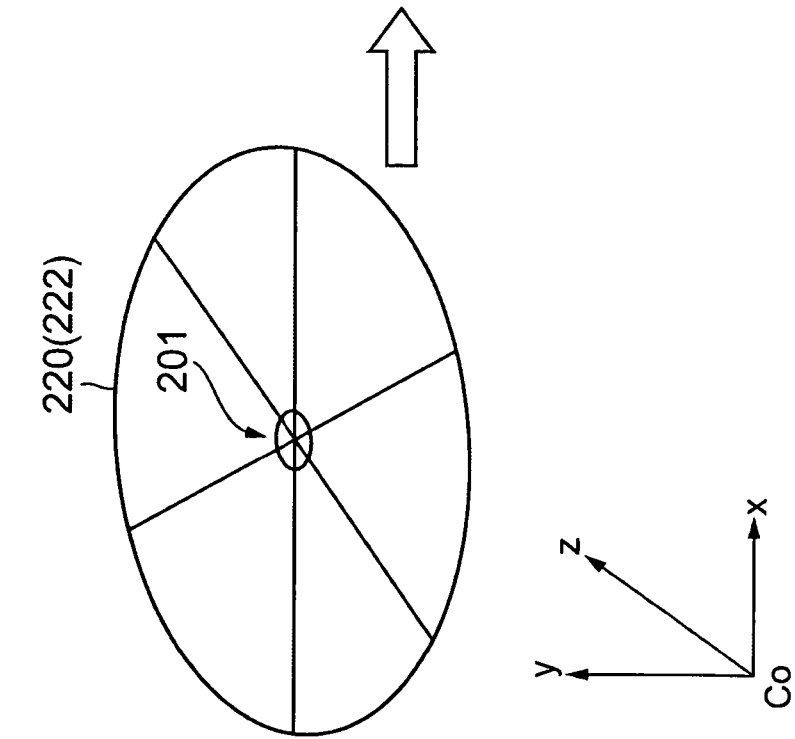

Thereafter, in step S4 of FIG. 23, the reference cell finding function 210 obtains a drawing range 224 of the detection area 222 on the image memory 20, according to the camera coordinate of the detection area 222 thus obtained (see FIG. 24B and FIG. 25B).

Then, in step S5, it is detected whether or not the identification images 561 to 566 of the versus-fighting cards 541 to 546, in particular, the reference cell 62 in the logo part, exist in the drawing range 224 of the detection area 222.

For example, positions respectively of the reference cells 62 of the six versus-fighting cards 541 to 546 are detected, in the case where six fighting cards 541 to 546 are placed with the field card 54F as a center as shown in FIG. 19B, in the case where six fighting cards 541 to 546 are placed on the first to the sixth squares 801 to 806 of the mat 196, as shown in FIG. 20A, in the case where six fighting cards 541 to 546 are placed on the first to the sixth squares 901 to 906 of the mat 200 as shown in FIG. 21A, and the like.

If identification images 561 to 566 of the versus-fighting cards 541 to 546 exist, the processing proceeds to step S6. Here, the identification information detecting function 212 allows the image data in the drawing range 224 to be subjected to affine transformation, and makes the image data in the drawing range 224 to be equivalent to the image data viewed from the upper surface. Then, based on thus obtained image data, the identification information detecting function 212 detects identification numbers of the six cards 541 to 546 from the identification images 561 to 566 of the six cards 541 to 546, in particular, from two-dimensional pattern (code 116) of the code part 60 in each of the identification images 561 to 566. Detection of the identification number is carried out by collating the code 116 with the 2D code database 68 as stated above.

Afterwards, in step S7, the identification information detecting function 212 obtains camera coordinates of the identification images 561 to 566 on the six cards 541 to 546, and registers the camera coordinate of the center of each log part 58 and the camera coordinate of each code part 60 in the six cards 541 to 546, in the current positional information table 117 as shown in FIG. 9. If the identification number is not detectable, floating image display program 100 is started, which will be described below.

Then, in step S8, the character image searching function 214 searches the object information table 118 for image data 120 of the character images 701 to 706 based on the respective identification numbers of the versus-fighting cards 541 to 546. For example, the character image searching function 214 searches the object information table 118 for a record associated with each of the identification number, and if the record thus searched out is "valid", each character image data 120 is read out from the storage head address of the image data registered in each record.

Next, in step S9, at the stage where the character images 701 to 706 are specified, the character image searching function 214 registers a camera coordinate of the center of each code part 60 of the cards 541 to 546, as a camera coordinate of the character image in each of the records respectively associated with the identification numbers of the cards 541 to 546.

On the other hand, in step S5, if it is determined that the identification images 561 to 566 of the versus-fighting cards 541 to 546 do not exist, the reference cell finding function 210 performs step S10 and outputs on the screen of the monitor 30 an error message prompting to place all the cards 541 to 546.

Then, in step S11, after waiting for a predetermined period of time (for example, three seconds), the processing returns to S5, and the above processing is repeated.

At the stage where all the character images 701 to 706 are determined with respect to all the cards 541 to 546 existing in the detection area 222, the processing operations as described above are completed.

Also in this case, as shown in FIG. 18C, FIG. 19B and FIG. 20B, by staring the character appearance display program 84, for example, a scene is displayed in which the character images 701 to 706 associated with the identification numbers of the cards 541 to 546 appear on the identification images 561 to 566 of the cards 541 respectively.

In the card position forecasting program 90, recognition of the six cards 541 to 546 is carried out for the detection area 222 that is set up based on the reference image 201. Therefore, it is not necessary to detect all over the image memory 20 again in order to recognize the six cards 541 to 546, thereby reducing loads in the process to recognize the six cards 541 to 546.

Next, combined action display program 92 will be explained. As shown in FIG. 3A, this combined action display program 92 is configured assuming a case that a user 74A puts three cards 541 to 543 side by side on the desk, table or the like 52, and the other user 74B puts three cards 544 to 546 side by side on the same desk, table, or the like 52. This program 92 specifies one processing procedure based on one combination of detected orientations of the three cards being placed (for example, cards 541 to 543).

For instance, out of the three cards 541 to 543, a character who performs an action is specified according to the orientation of the card 541 placed on the left, a character as a counterpart to be influenced by the action is specified according to the orientation of the card 542 placed at the center, and a specific action is determined according to the orientation of the card placed on the right.

Figure 26:
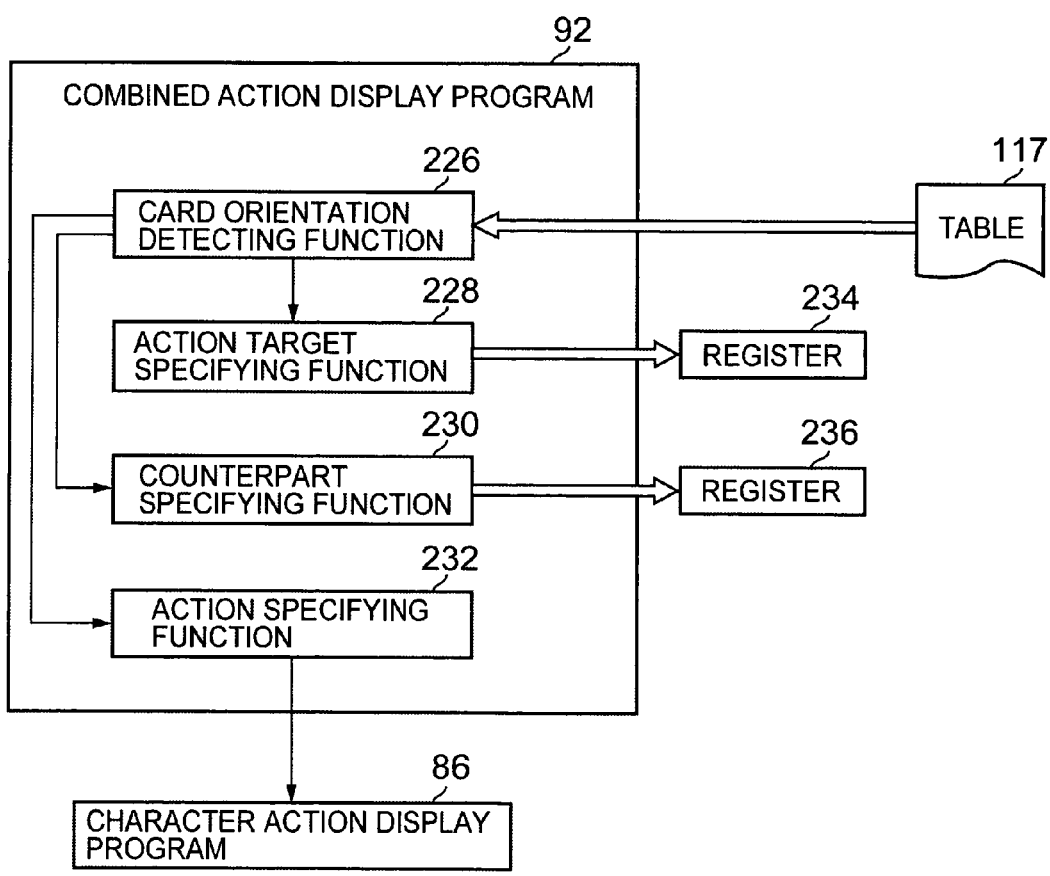
FIG. 26 is a block diagram showing functions of a combined action display program.

As shown in FIG. 26, the combined action display program 92 includes, card orientation detecting function 226, action target specifying function 228, counterpart specifying function 230, and action specifying function 232.

Here, processing in each function will be explained with reference to FIG. 3A, FIG. 3B, FIG. 26, and FIG. 27 to FIG. 29, after the camera coordinates of the identification images 561 to 566 of all the cards 541 to 546 have been detected.

Firstly, the card orientation detecting function 226 detects which orientation each of the identification images 561 to 566 of the cards 541 to 546 is facing viewed from the users 74A and 74B, respectively associated with the cards, the cards being positioned on the left, center, and right of the users 74A and 74B respectively, based on the information registered in the current positional information table 117. This information indicates camera coordinates (camera coordinate of the log part 58 and that of code part 60) of the identification images 561 to 566 of the cards 541 to 546 all being placed.

If offensive or defensive action is performed by turns, it is possible to detect only the orientations of the cards being offensive next (cars 541 to 543 or 544 to 546), which are possessed by the user 74A or 74B.

In the following descriptions, for ease of explanation, processing by the three cards 541 to 543 possessed by the user 74A will be explained.

As shown in FIG. 26, the card orientation detecting function 226 passes information regarding the orientation of the identification image 561 of the card 541 which is placed on the left by the user 74A to the action target specifying function 228, passes information regarding the orientation of the identification image 562 of the card 542 which is placed at the center to the counterpart specifying function 230, and passes information regarding the orientation of the identification image 563 of the card 543 which is placed on the right to the action specifying function 232.

The action target specifying function 228 selects one character or all the characters, based on the information regarding the orientation of the card 541, supplied from the card orientation detecting function 226, out of the three character images 701 to 703 which are displayed in such a manner as respectively superimposed on the identification images 561 to 563 of the three cards 541 to 543.

Figure 27:
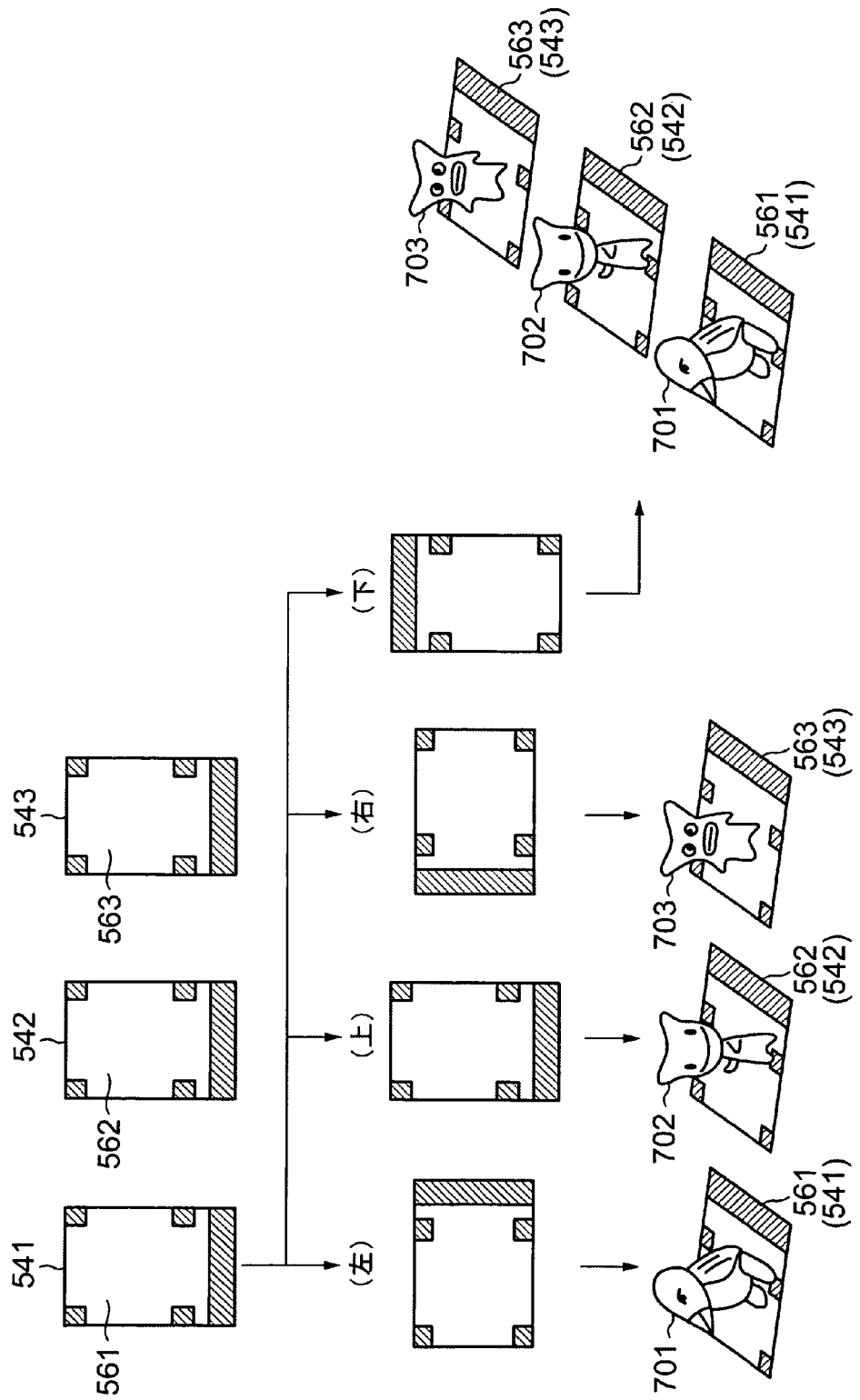
FIG. 27 is an illustration showing an example to specify an action target according to the orientation of the card placed on the left side, out of three cards.

Specifically, as shown in FIG. 27 for example, if the card 541 positioned on the left is oriented to the left, the character image 701 (actually, identification number specified by the identification image 561) of the card 541 on the left is selected. If the card 541 is oriented upwardly, the character image 702 (actually, identification number specified by the identification image 562) of the card 542 at the center is selected. If the card 541 is oriented to the right, the character image 703 (actually, identification number specified by the identification image 563) of the card 543 on the right is selected. If the card 541 is oriented downwardly, the character images 701 to 703 (actually, identification numbers specified by the identification images 561 to 563) of the three cards 541 to 543 on the left, at the center, and on the right are selected. The identification numbers thus selected are registered in the first register 234.

The counterpart specifying function 230 selects one character or all the characters as a counterpart, based on the orientation of the card 542 supplied from the card orientation detecting function 226, out of the three character images 704 to 706 displayed in such a manner as being superimposed respectively on the identification images 564 to 566 of the three cards 544 to 546 regarding the opposing counterpart (user 74B).

Figure 28:
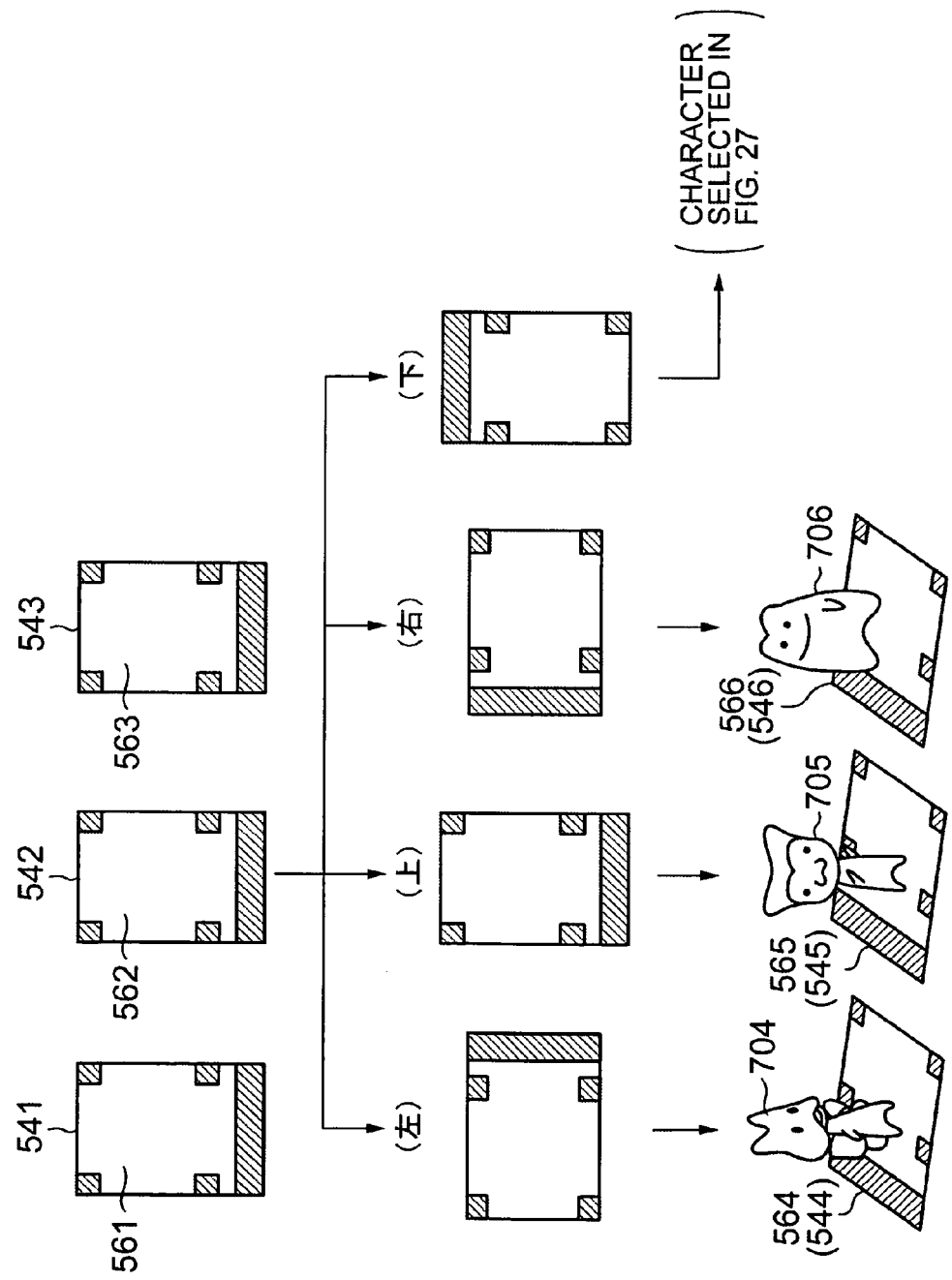
FIG. 28 is an illustration showing an example to specify a counterpart according to the orientation of the card placed at the center, out of three cards.

Specifically as shown in FIG. 28 for example, if the card 542 positioned at the center is oriented to the left, the character image 704 (actually, identification number specified by the identification image 564) of the card 544 on the left viewed from the user 74B is selected. If the card 542 is oriented upwardly, the character image 705 (actually, identification number specified by the identification image 565) of the card 545 at the center viewed from the user 74B is selected. If the card 542 is oriented to the right, the character image 706 (actually, identification number specified by the identification image 566) of the card 546 on the right viewed from the user 74B is selected. If the card 542 is oriented downwardly, the identification number selected in the action target specifying function 228 is selected. The identification numbers thus selected are registered in the second register 236.

The action specifying function 232 selects an action of the character corresponding to the identification number being selected in the action target specifying function 228 (identification number registered in the first register 234), based on the orientation of the card 543 supplied from the card orientation detecting function 226.

Figure 29:
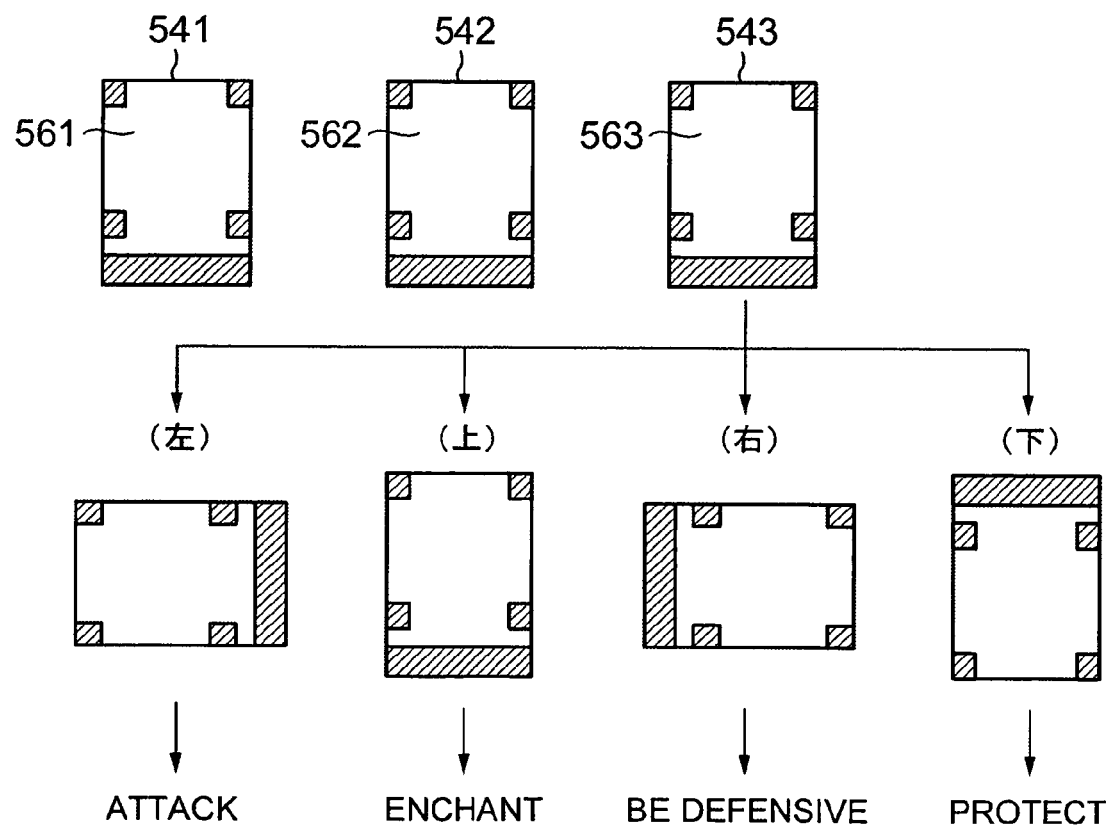
FIG. 29 is an illustration showing an example to specify an action according to the orientation of the card placed on the right side, out of three cards.

As shown in FIG. 29 for example, if the card 543 is oriented to the left, an action "to attack" is selected. If the card 543 is oriented upwardly, an action "to enchant" is selected. If the card 543 is oriented to the right, an action "being defensive" is selected, and if it is oriented to downwardly, an action "to protect" is selected.

At the stage where a specific action is selected, the action specifying function 232 starts the character action display program 86 and displays a scene corresponding to the action thus selected.

With the combined action display program 92, it is possible to give a command regarding various processing according to a combination of orientations of the three cards 541 to 543, without using an operation device (a device to input a command via key operations).

Figure 30:
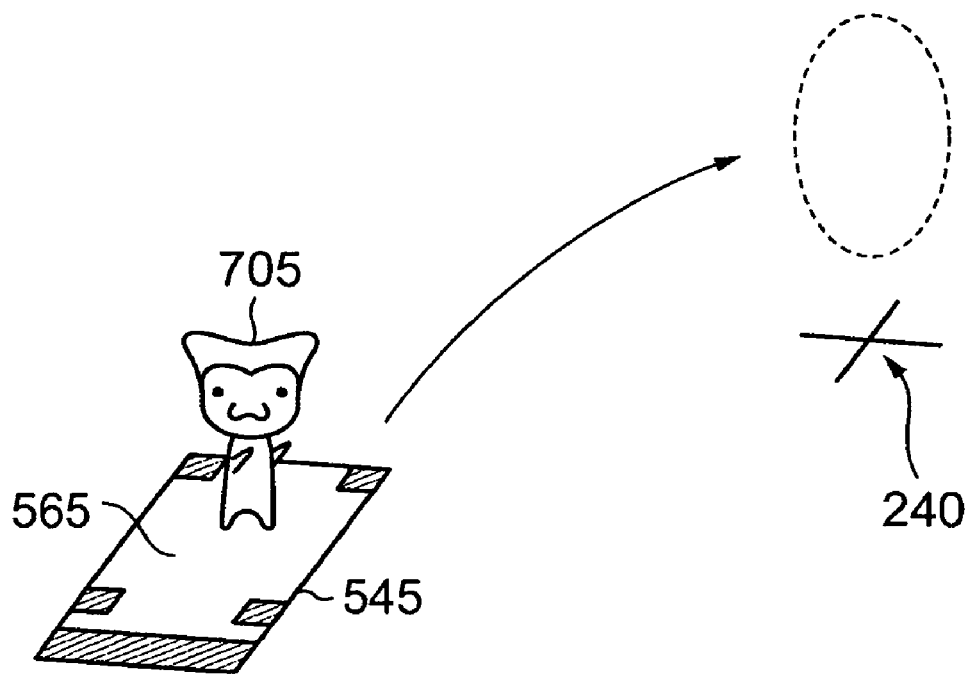
FIG. 30 is an illustration showing an example of a scene in which a character image displayed on the identification image of the card moves to a target position.

Next, the first character movement display program 94 will be explained. As shown in FIG. 30, for example, the program 94 displays that the character image 705 displayed in such a manner as being superimposed on the identification image 565 of the card 545 moves up to a target position 240 on the pickup image. Example of the target position 240 may include a position of the reference image 201, a position determined by the orientations of the multiple cards 541 to 546, and a position of the character image as a counterpart selected in the aforementioned combined action display program 92, and the like.

Figure 31:
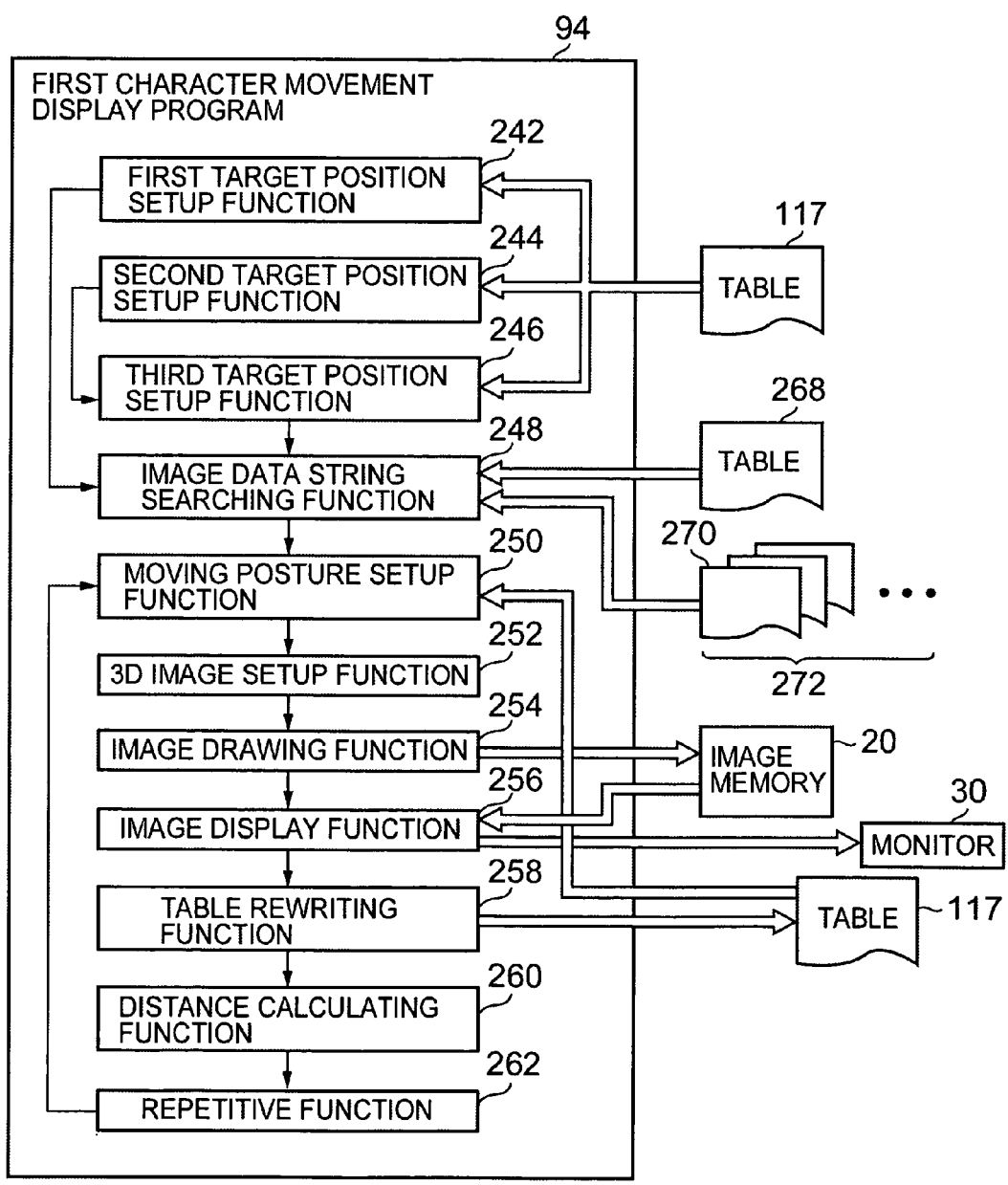
FIG. 31 is a block diagram showing functions of the first character movement display program.

As shown in FIG. 31, a first character movement display program 94 includes a first target position setup function 242, a second target position setup function 244, a third target position setup function 246, an action data string searching function 248, a movement posture setup function 250, 3D image setup function 252, an image drawing function 254, an image display function 256, table rewriting function 258, distance calculating function 260, and repetitive function 262. Processing according to the first to the third target position setup functions 242, 244, and 246 are selectively performed according to a status of scenario in the video game.

The first target position setup function 242 sets as a target position, the position of the reference image 201. Specifically, in the card position forecasting program 90, the camera coordinate of the reference image 201 registered in the register 216 (see FIG. 22) is read out, and this camera coordinate is set to a camera coordinate of the target position.

The second target position setup function 244 sets as a target position, a position determined based on the orientations of all the cards 541 to 546 placed on the desk, table, and the like 52.

Figure 32:
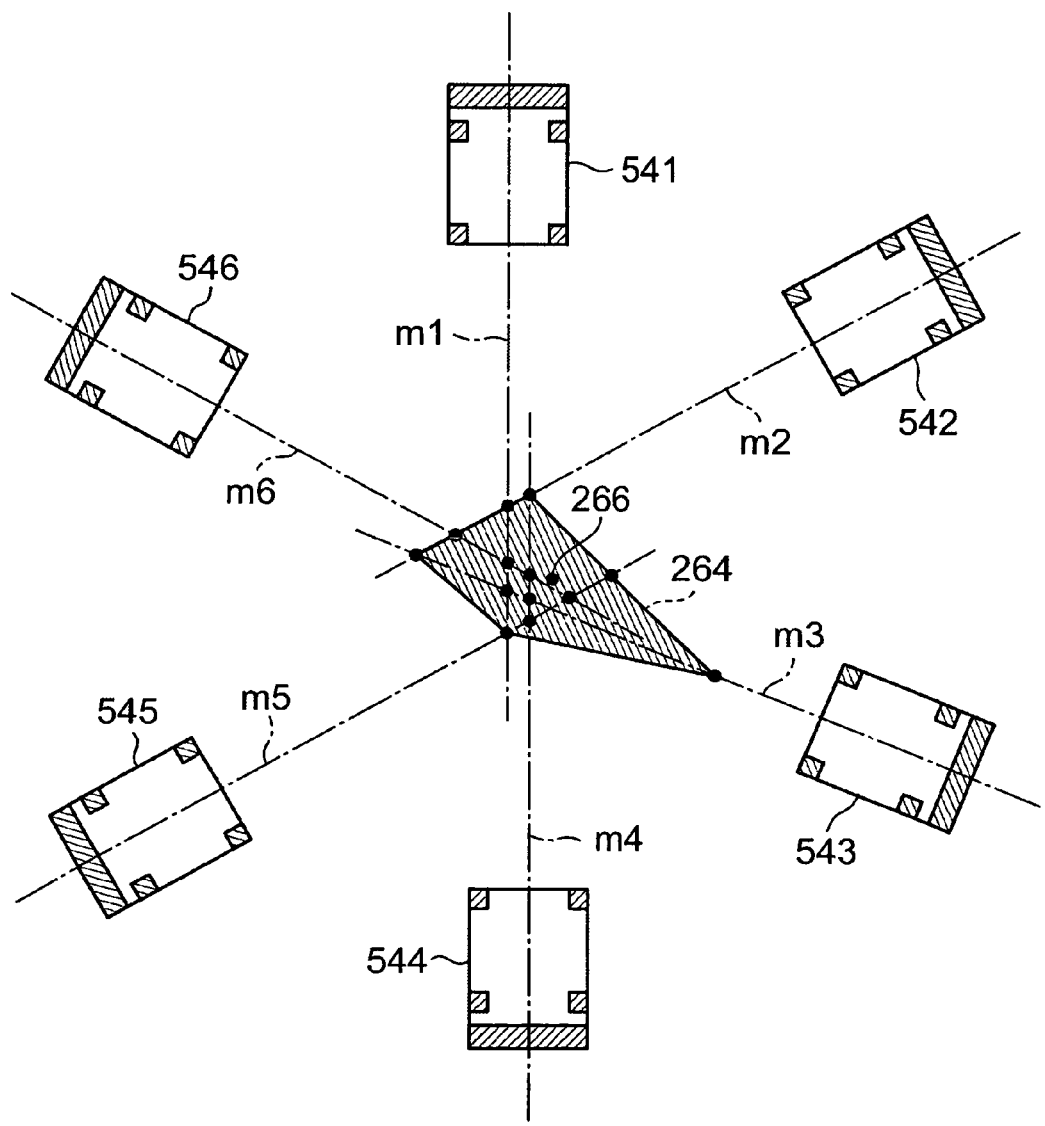
FIG. 32 is an illustration showing an example to decide a target position according to the orientations of six cards placed in a circle.

For example, as shown in FIG. 32, when six cards 541 to 546 are placed in a circle, the inner center or barycentric position 266, for instance, of a polygon 264 formed on multiple points which are intersections of center lines m1 to m6 of the cards 541 to 546, respectively, is assumed as a target position. This configuration can be applied to a case where three or more cards are placed in a circle.

A specific processing is as the following; based on the information registered in the current positional information table 117, that is, based on the camera coordinates (camera coordinate of the logo part 58 and camera coordinate of the cord part 60) of the identification images 561 to 566 of the all the cards 541 to 546 being placed, vectors of the center lines m1 to m6 of all of the cards 541 to 546 are obtained. Then, camera coordinates of multiple points as intersections of the center lines m1 to m6 thus obtained are extracted, and a camera coordinate of the inner center or barycentric position 266 of the polygon 264 configured by the multiple points thus extracted is set as a camera coordinate of the target position.

The third target position setup function 246 sets as a target position, a position of character image, as a counterpart selected in the combined action display program 92. Specifically, in the combined action display program 92, an identification number registered in the second register 236 (see FIG. 26) is read out, and a camera coordinate (for example, camera coordinate of the character image) associated with the identification number thus read out is set as a camera coordinate of the target position.

As shown in FIG. 30 for example, the action data string searching function 248 searches the first movement action information table 268 for an action data string to display a scene where the character image 705 moves from above the identification image 565 of the card 545 to the target position 240.

Specifically, at first, the action data string searching function 248 searches the first movement action information table 268 recorded in the hard disk 44, optical disk 32, or the like, for instance, for a record associated with the identification number of the card 545. Then, out of the data file 272 which is recorded in the hard disk 44, optical disk 32, or the like and in which a large number of action data strings 270 are registered, for example, the action data string searching function 248 reads out from the storage head address registered in the record thus searched, an action data string 270 indicating an action in which the character image 705 moves to the target position 240.

The moving posture setup function 250 reads out from the current positional information table 117, a camera coordinate of the character image 705 from the record associated with the identification number, and sets on the camera coordinate, one posture in a process where the character image 705 moves to the target position 240. For example, one posture is set up by allowing the vertex data of the character image 705 to move on the camera coordinate, based on the action data of i-th frame (i=1, 2, 3 . . . ) of thus read out action data string 270.

The 3D image setup function 252 sets up a 3D image of one posture in a process where the character image 705 moves from above the identification image 565 of the card 545 to the target position 240 based on the camera coordinate system of the pickup image, being detected by the card recognition program 82, or the like, for example.

The image drawing function 254 allows the 3D image of one posture in a process where the character image 705 moves to the target position 240 to be subjected to perspective transformation to an image on the screen coordinate system, and draws thus transformed image into the image memory 20 (including hidden surface processing).

The image display function 256 outputs the image drawn in the image memory 20 in a unit of frame to the monitor 30 via the I/O port 22, and displays the image on the screen of the monitor 30.

The table rewriting function 258 rewrites the camera coordinate of the character image 705 of the record associated with the identification number in the current positional information table 117, with the camera coordinate of the character image 705 after the character image moved for one frame.

The distance calculating function 260 calculates the shortest distance (direct distance) between the position of the character image 705 and the target position 240, based on the camera coordinate of the character image after the character image moved for one frame, and the camera coordinate of the target position 240.

The repetitive function 262 sequentially repeats the processing of the moving posture setup function 250, the processing of the 3D image setup function 252, the processing of the image drawing function 254, the processing of the image display function 256, the processing of the table rewriting function 258, and the processing of the distance calculating function 260, until the time when the distance calculated in the distance calculating function 260 falls within a predetermined range (for example, 0 mm to 10 mm when converted in the real space).

Accordingly, as shown in FIG. 30, the scene is displayed, in which the character image 705 associated with the identification number of the card 545 moves from above the identification image 565 of the card 545 to the target position 240.

According to this first character movement display program 94, when it is applied to a video game for example, as shown in FIG. 30, it is possible to display that the character image 705 appears from the card 545 moves to the target position and initiates battle or the like. Therefore, it is suitable for a versus-fighting game and the like.

Figure 33:
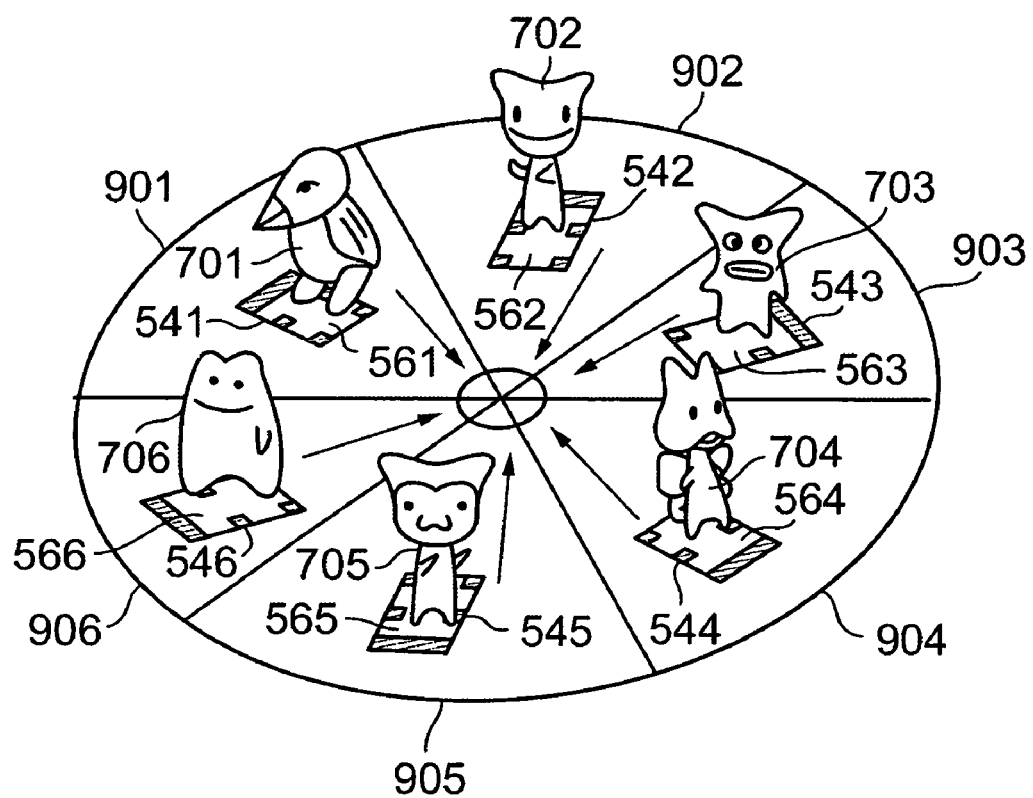
FIG. 33 is an illustration showing an example of a scene in which each of the six character images move towards the center of the circle from the identification images of the cards respectively associating with the images, and a battle is unfolded in the center of the circle.

For example, in the case of six-person fighting as shown in FIG. 33, it is possible to display a scene where each of the six character images move towards the center of the circle from above the identification images 561 to 566 of the cards 541 to 546 respectively associating with the images, and a battle is unfolded in the center of the circle.

Figure 34:
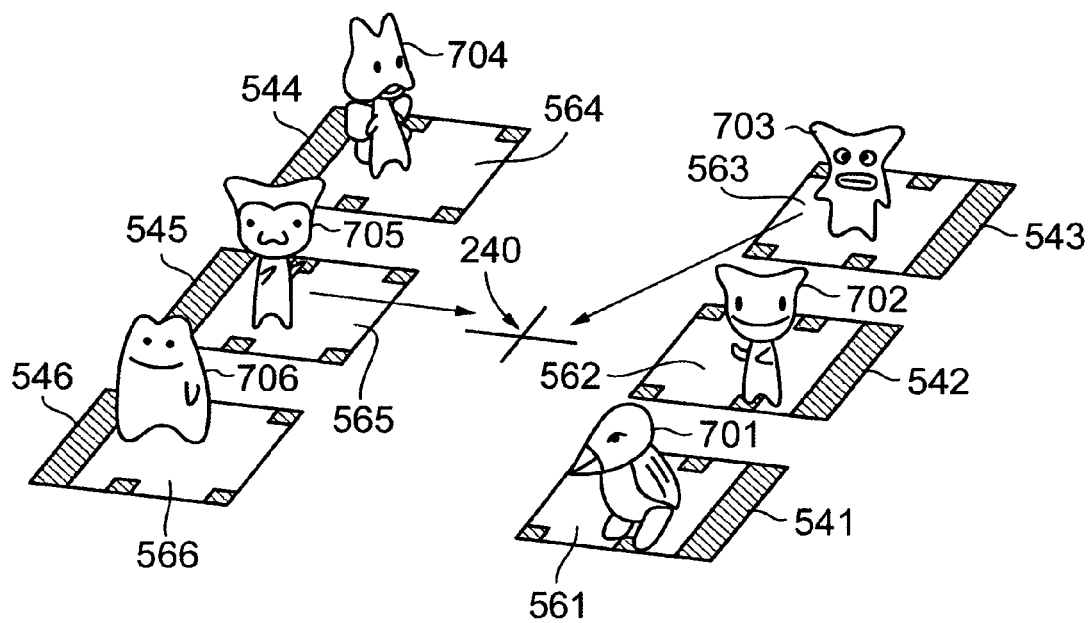
FIG. 34 is an illustration showing an example of a scene where two character images move towards a target position (for example, the center position) in the fighting area from the identification images of the cards respectively associating with the images, and a battle is initiated.
Figure 35:
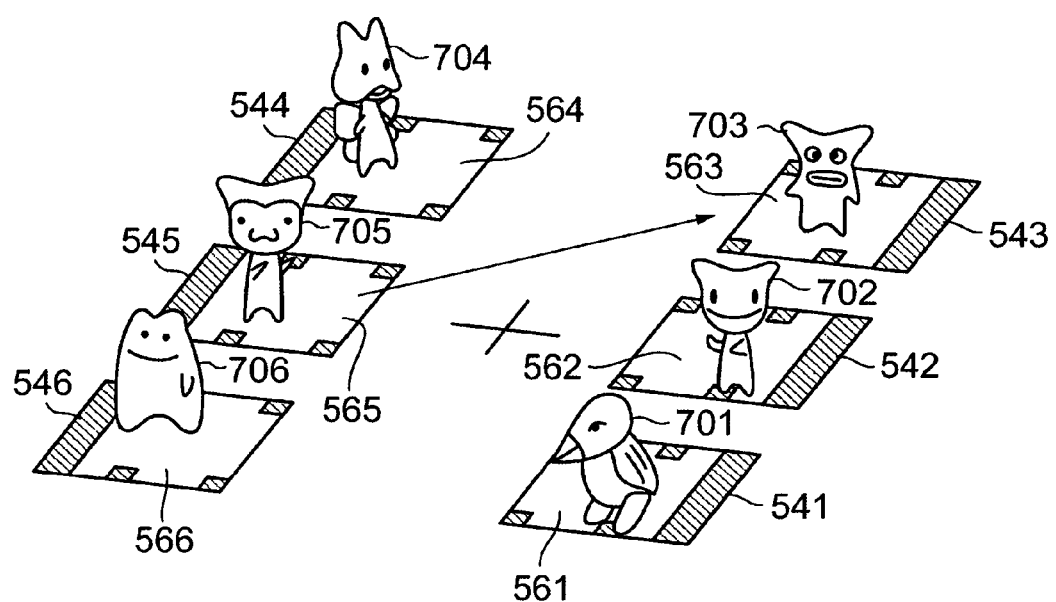
FIG. 35 is an illustration showing an example of a scene in which an offensive character image moves from the identification image of the card associated with the character image, up to the position of the character image which is a target of attack, and a battle is initiated.

For example, in the case of two-person fighting as shown in FIG. 34, it is possible to display a scene where the two character images 703 and 705, for example, move to the target position (for example central position) 240 from above the identification images 563 and 565 of the cards 543 and 545 respectively associating these character images, and initiate battle. It is further possible as shown in FIG. 35 to display a scene where the character image 705 at offensive side moves to the position of the character image 703 as a attacking target from above the identification image 565 of the card 545 which is associated with the character image 705, and initiates battle.

Figure 36:
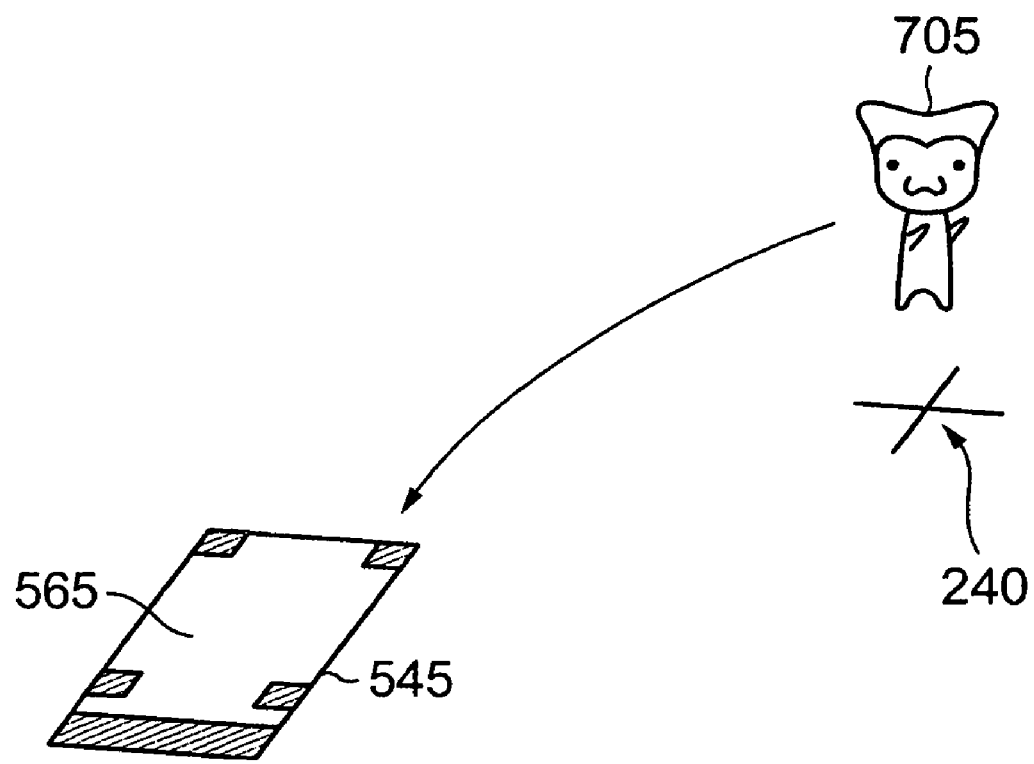
FIG. 36 is an illustration showing an example of a scene in which the character image having moved to a target position from the identification image of the card, moves to the position on the identification image of the card originally positioned.

Next, the second character movement display program 96 will be explained. This program 96 displays that, as shown in FIG. 36, the character image 705 having moved to the target position 240 from above the identification image 565 of the card 545 for example, according to the first character movement display program 94 as described above, moves back to above the identification image 564 of the card 545 originally positioned. The current positional information table 117 as described above registers the information to which position the character image 705 has moved.

Figure 37:
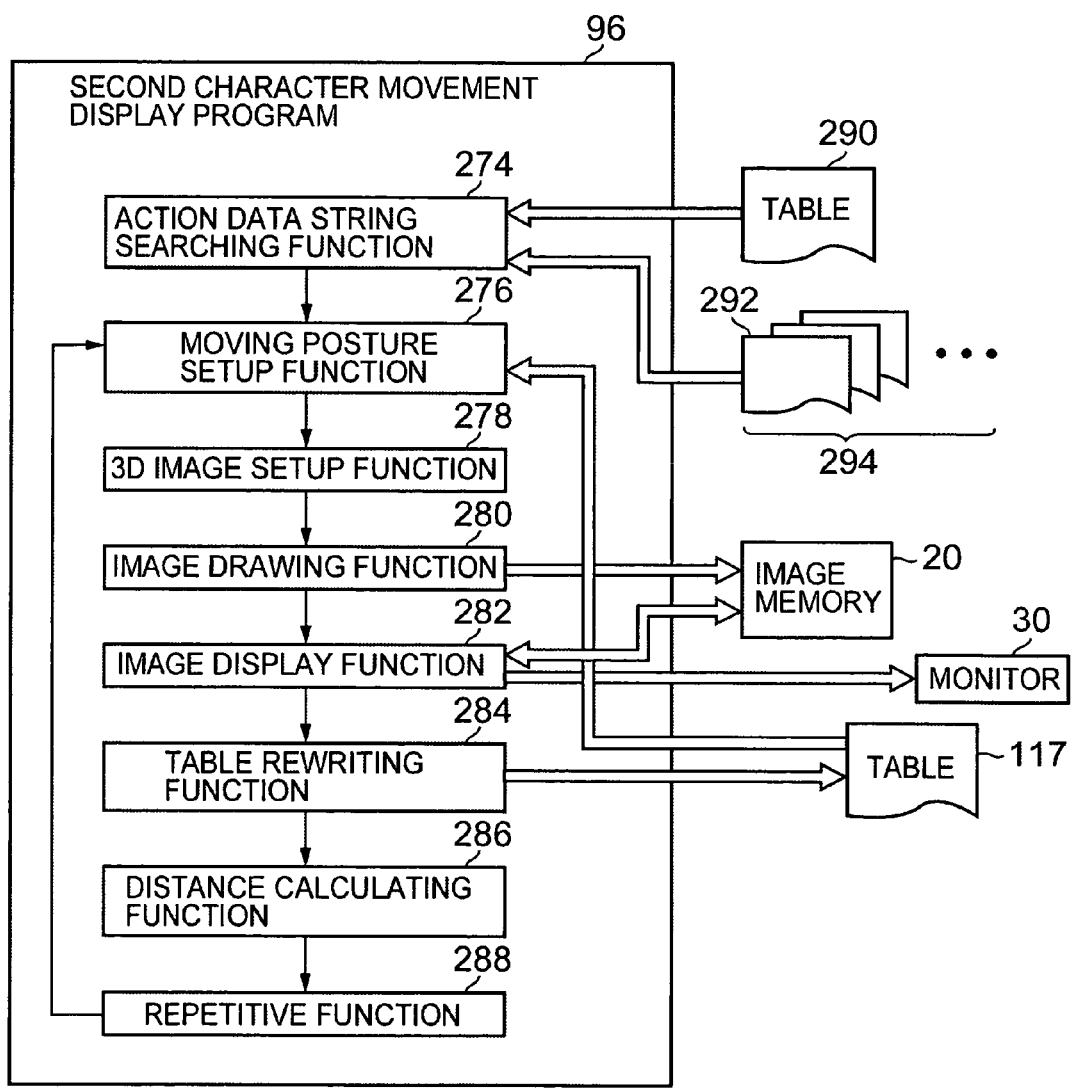
FIG. 37 is a block diagram showing functions of the second character movement display program.

As shown in FIG. 37, the second character movement display program 96 includes, action data string searching function 274, moving posture setup function 276, 3D image setup function 278, image drawing function 280, image display function 282, table rewriting function 284, distance calculating function 286, and repetitive function 288.

The action data string searching function 274 searches the moving action information table 290 for an action data string to display a scene where the character image 705 as shown in FIG. 36, for example, moves (returns) from the current position (for example the aforementioned target position 240) to above the image 705 of the card 545 being associated.

Specifically, at first, the action data string searching function 274 searches the second moving action information table 290 which is recorded for example in the hard disk 44, optical disk 32, or the like, for a record associated with the identification number. Then, out of the data file 294 which is recorded in the hard disk 44, optical disk 32, or the like for example, and in which a large number of action data strings 292 are registered, the action data string searching function 274 reads out from the storage head address registered in the record thus searched, an action data string 292 indicating an action in which the character image 705 moves up to above the identification image 565 of the card 545.

The moving posture setup function 276 reads out a camera coordinate of the character image 705 from the record associated with the identification number from the current positional information table 117, and sets up one posture in a process where the character image 705 moves up to above the identification image 565 of the card 545 associated with the character image 705.

For example, the moving posture setup function 276 moves the vertex data of the character image 705 on the camera coordinate, based on the action data of the i-th frame (i=1, 2, 3, . . . ) of the action data string 292 thus read out, so as to set up one posture.

The 3D image setup function 278 sets a 3D image of one posture in a process where the character image 705 moves from the current position to above identification image 565 of the card 545 being associated with the character image, based on the camera coordinate of the pickup image detected, for example, by the card recognition program 82, or the like.

The image drawing function 280 allows the 3D image of one posture in a process where the character image 705 moves to above the identification image 565 of the card 545 associated with the character image, to be subjected to perspective transformation to an image on the screen coordinate system, and draws thus transformed image into the image memory 20 (including hidden surface processing).

The image display function 282 outputs the image drawn in the image memory 20 in a unit of frame to the monitor 30 via the I/O port 22, and displays the image on the screen of the monitor 30.

The table rewriting function 284 rewrites the camera coordinate of the character image 705 of the record associated with the identification number in the current positional information table 117, with the camera coordinate of the character image 705 after the character image moved for one frame.

The distance calculating function 286 calculates a distance between the camera coordinate of the identification image 565 of the card 545 associated with the identification number, and the current position (camera coordinate) of the character associated with the identification number stored in the current positional information table 117.

The repetitive function 288 sequentially repeats the processing of the moving posture setup function 276, the processing of the 3D image setup function 278, the processing of the image drawing function 280, the processing of the image display function 282, the processing of the table rewriting function 284, and the processing of the distance calculating function 286, until the time when the distance calculated in the distance calculating function 286 becomes zero. Accordingly, as shown in FIG. 36, for example, it is possible display a scene where the character image 705 moves to above the identification image 565 of the card 545 associated with the character image.

According to the second character movement display program 96, when it is applied to a video game for example, it is possible to display that the character image 705 appeared from the card 545 moves to the target position 240 and initiates a battle, and when the character wins the battle, it returns to the card 545 originally positioned. Therefore, it is suitable for a versus-fighting game.

Figure 38:
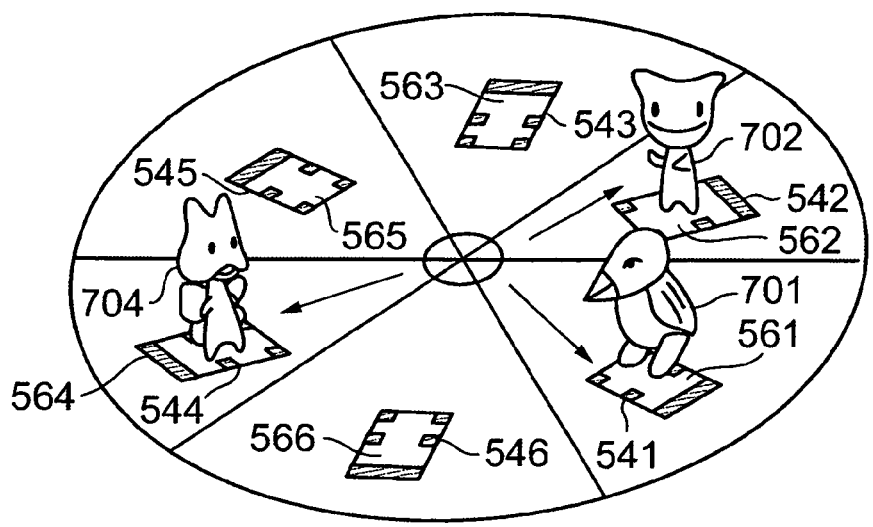
FIG. 38 is an illustration showing an example of the scene in which each of the character images who won the battle returns to the position on the identification images of the cards respectively associated with the character images.

For instance, in the case of six-person fighting as shown in FIG. 33, it is possible to display that after six character images 701 to 706 unfold a battle at the center of the circle, the character images 701, 702 and 704 who won the battle return to above the identification images 561, 562, and 564 of the cards 541, 542, 544, respectively associated with those character images, as shown in FIG. 38.

Figure 39:
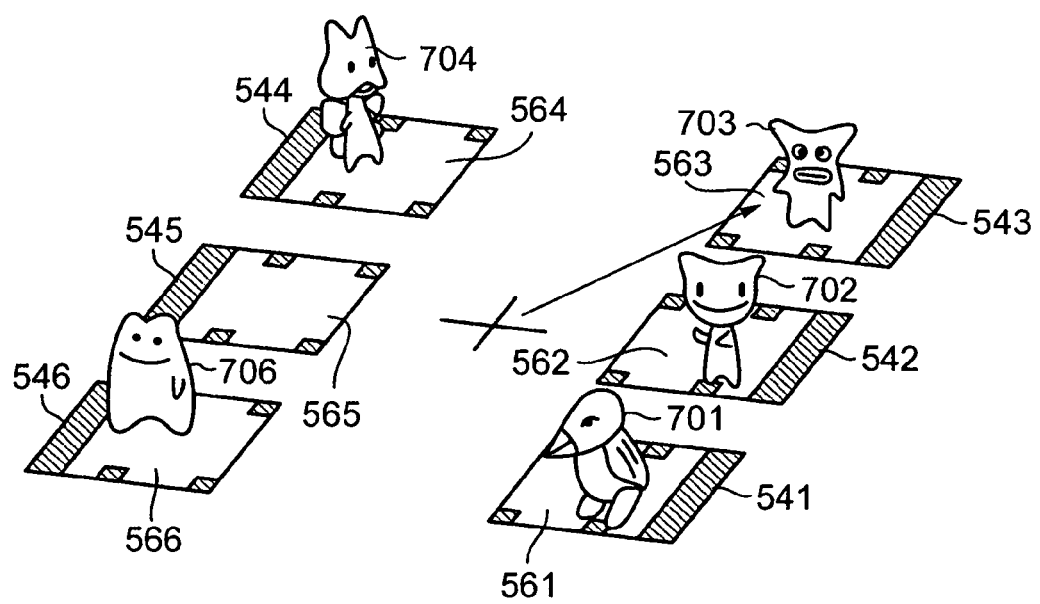
FIG. 39 is an illustration showing an example of the scene in which only the character image who won the battle out of the two characters that made an attack, returns to the position on the identification image of the card originally positioned.

In the case of two-person fighting as shown in FIG. 34, it is possible to display a scene as shown in FIG. 39, that out of the two character images 703 and 705 both being offensive, only the character image 703 who won the battle returns to the identification image 563 of the card 543 originally positioned.

Next, a character nullification program 98 will be explained. This program 98 displays a scene that when a character loses the battle, the character image disappears gradually while performing a certain action, and also nullifies the appearance of the character.

Figure 40:
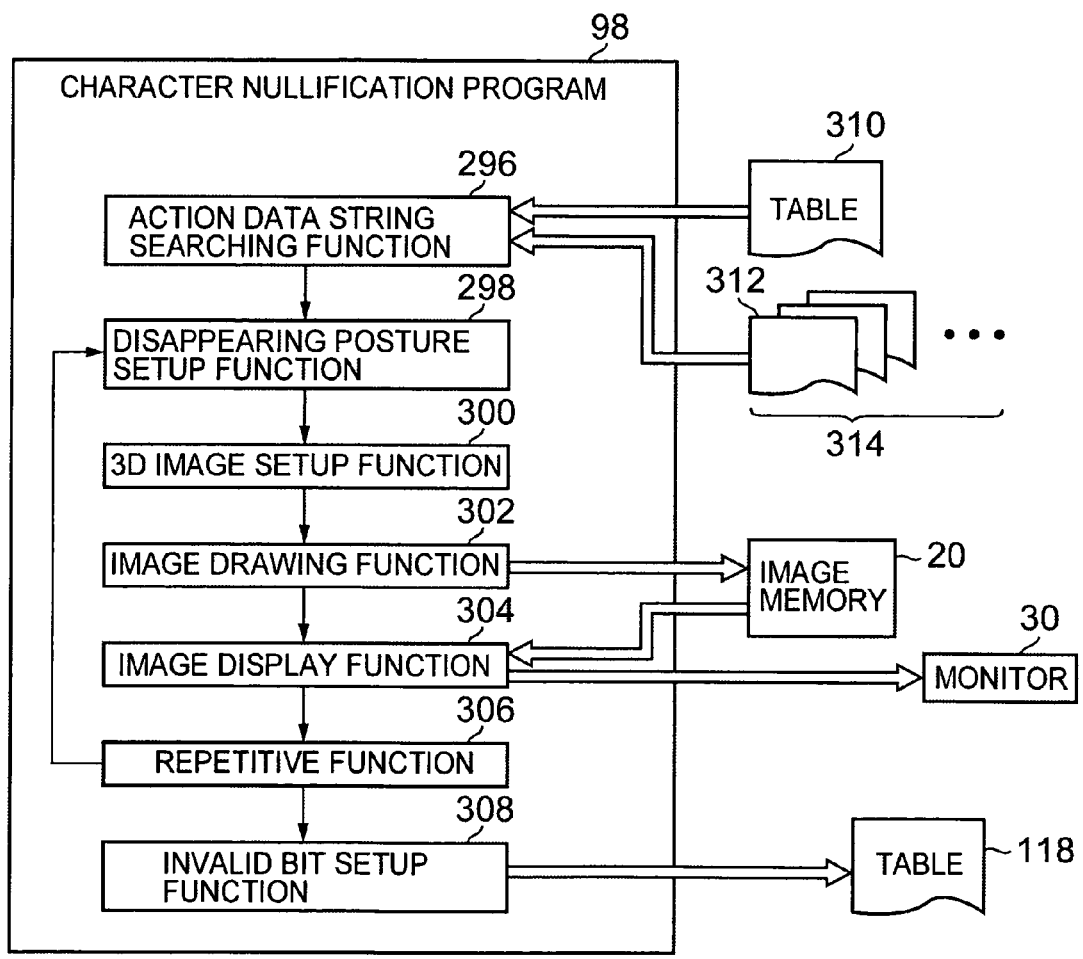
FIG. 40 is a block diagram showing functions of a character nullification program.

As shown in FIG. 40, the character nullification program 98 includes, action data string searching function 296, disappearing posture setup function 298, 3D image setup function 300, image drawing function 302, image display function 304, repetitive function 306, and invalid bit setup function 308.

The action data string searching function 296 searches the disappearing display information table 310, for an action data string to display a scene where the character image gradually disappears while it performs a certain action.

Specifically, at first, the action data string searching function 296 searches the disappearing display information table 310 recorded in the hard disk 44 or optical disk 32 or the like, for a record associated with the identification number. Then, out of the data file 314 which is recorded in the hard disk 44, optical disk 32, or the like for example, and in which a large number of action data strings 312 are registered, the action data string searching function 296 reads out from the storage head address registered in the record thus searched, an action data string 312 indicating an action in which the character image gradually disappears.

The disappearing posture setup function 298 sets up one posture in a process where the character image is disappearing. For instance, the disappearing posture setup function 298 sets up one posture by moving the vertex data of the character image on the camera coordinate, based on the action data of i-th frame (i=1, 2, 3 . . . ) of the action data string 312 thus read out.

The 3D image setup function 300 sets up a 3D image of one posture in a process where a character image is disappearing on the identification image of the card, or on the target position 240, or the like, based on the camera coordinate system of the pickup image detected by the card recognition program 82, or the like, for example.

The image drawing function 302 allows the 3D image of one posture in a process where the character image is disappearing, to be subjected to perspective transformation to an image on the screen coordinate system, and draws thus transformed image into the image memory 20 (including hidden surface processing).

The image display function 304 outputs the image drawn in the image memory 20 in a unit of frame to the monitor 30 via the I/O port 22, and displays the image on the screen of the monitor 30.

The repetitive function 306 sequentially repeats the processing of the disappearing posture setup function 298, the processing of the 3D image setup function 300, the processing of the image drawing function 302, and the processing of the image display function 304. Accordingly, it is possible to display a scene that the character image gradually disappears while performing a certain action on the identification image of the card associated with the character image, on the target position 240, or the like.

The invalid bit setup function 308 sets a valid/invalid (1/0) bit as "invalid", regarding the record associated with the character image (that is, a record associated with the identification number) in the object information table 118.

According to this character nullification program 98, if it is applied to a video game for example, it is possible to display that a character appeared from the card moves to a predetermined position to initiate battle, and in the case of decease due to a loss in the battle, it is possible to display that the character gradually disappears. Therefore, this program is suitable for a versus-fighting game and the like.

In the meantime, according to a progress of the video game, the card put on the desk, table, or the like 52 may be moved by a hand of user. For example, this happens when at least one of the cards are displaced, the cards are switched in position, replaced by a new card, or the like. If there is a movement in a card as thus described, it is necessary to recognize again the card thus moved.

In order to solve the problem above, the card recognition program 82 or the card position forecasting program 90 may be started every unit of some frames, or a few dozen of frames. It is a matter of course that when a new card is recognized, the character appearance display program 84 is started and a character image associated with the identification number or the like of the new card may appear on the identification image of the new card. Furthermore, in just a simple case such that a card is displaced from the position or the card positions are switched, the character action display program 86 is started, and an action of "waiting" is displayed, for example.

However, there is a possibility that this re-recognition of the card may fail. For example, the re-recognition of the card may be disabled in the following cases; once the card is placed allowing an associated character to appear, and thereafter, the card is drawn back and left as it is, the card surface is covered by another object (such as user's hand), the pickup surface of the CCD camera is displaced and an image of the card surface cannot be picked up, and the like. An application program which performs processing for dealing with such cases as described above will be explained.

Figure 41:
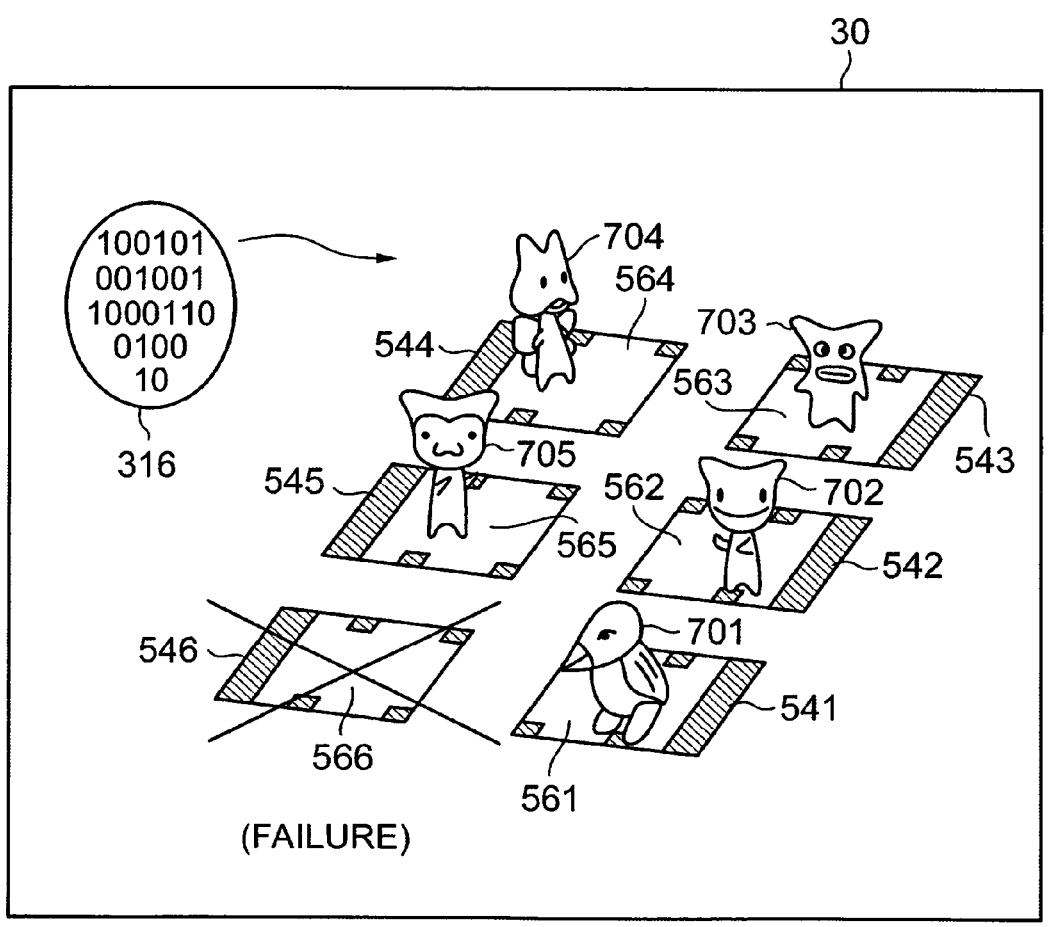
FIG. 41 is an illustration showing an example of the scene which allows a floating image to float for a predetermined period of time.

Firstly, floating image display program 100 will be explained. When the re-recognition of the card fails, as shown in FIG. 41 for example, the program 100 displays an image in which data strings including arbitrary combination of "1" and "0" are described in a shape of an ellipse (floating image 316), being floating for a predetermined period of time. FIG. 41 shows an example of failing in recognition of the card 546 (it is denoted as "x" for ease of understanding).

Figure 42:
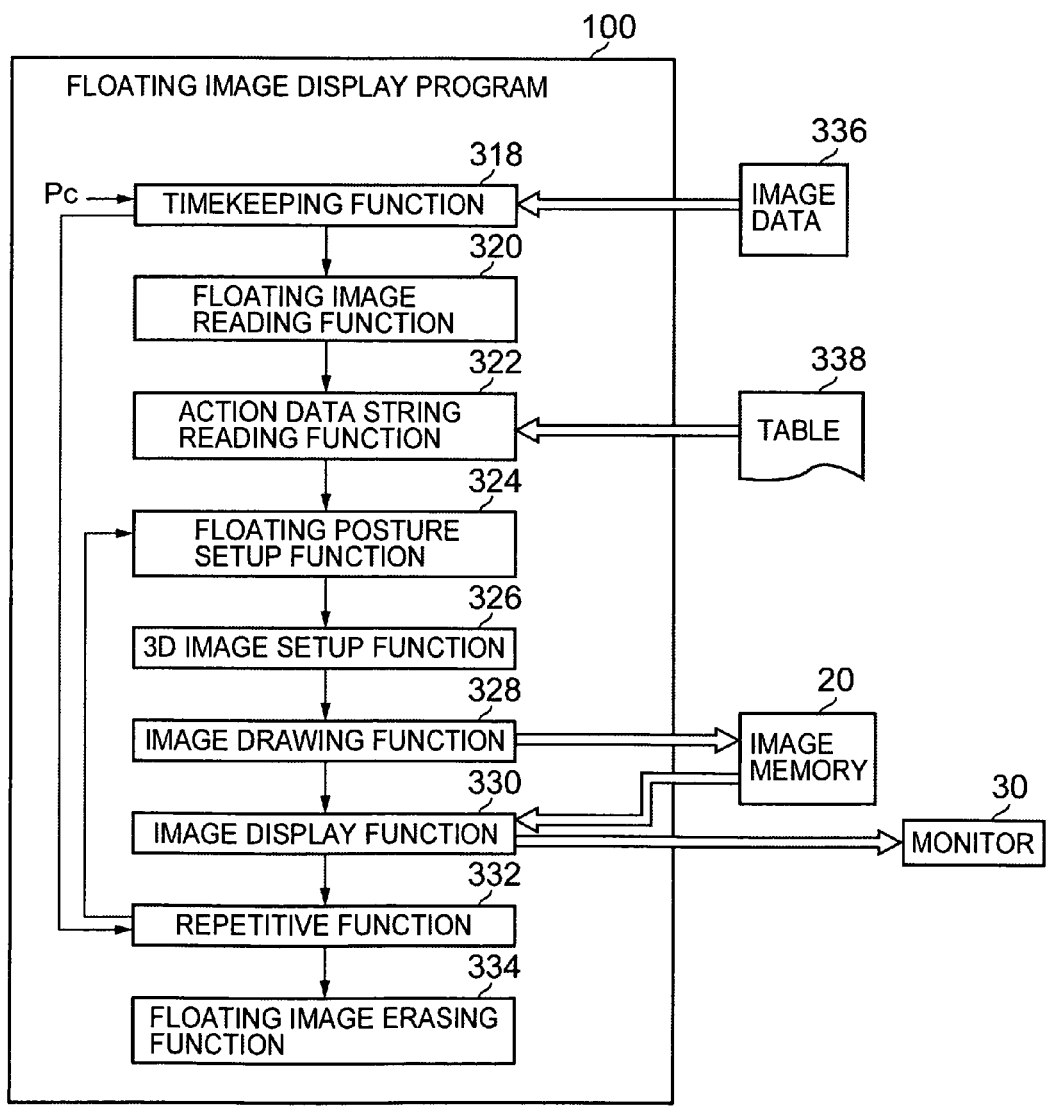
FIG. 42 is a block diagram showing functions of a floating image display program.

This floating image display program 100 is started by any one of the card recognition program 82, the field display program 88, and the card position forecasting program 90, when detection of identification information fails. As shown in FIG. 42, the program 100 includes, timekeeping function 318, floating image reading function 320, action data string reading function 322, floating posture setup function 324, 3D image setup function 326, image drawing function 328, image display function 330, repetitive function 332, and floating image erasing function 334.

The timekeeping function 318 starts counting clock pulse Pc at the point of time when the program 100 is started, and at each point of predetermined timing (such as one minute, two minutes, three minutes or the like), a time-up signal St is outputted, and the timekeeping data is reset.

The specific image reading function 320 reads out from the hard disk 44, optical disk 32, or the like, for example, image data (floating image data) 336 of the floating image 316 as shown in FIG. 41.

The action data string reading function 322 reads out from the hard disk 44, optical disk 32, or the like, for example, an action data string 338 for displaying a scene that the floating image 316 is floating and moving.

The floating posture setup function 324 sets up one posture in a process where the floating image 316 is floating and moving. For example, the vertex data of the floating image data 336 is moved on the camera coordinate, based on the action data of the i-th frame (i=1, 2, 3 . . . ) of the action data string 338 thus read out, and one posture is set up.

The 3D image setup function 326 sets up a 3D image of one posture, in a process that the floating image 316 is floating and moving, based on the camera coordinate of the pickup image which is detected by the card recognition program 82, or the like, for example.

The image drawing function 328 allows the 3D image of one posture in a process where the floating image 316 is floating and moving, to be subjected to perspective transformation to an image on the screen coordinate system, and draws thus transformed image into the image memory 20 (including hidden surface processing).

The image display function 330 outputs the image drawn in the image memory 20 in a unit of frame to the monitor 30 via the I/O port 22, and displays the image on the screen of the monitor 30.

The repetitive function 332 sequentially repeats the processing of the floating posture setup function 324, the processing of the 3D image setup function 326, the processing of the image drawing function 328, and the processing of the image display function 330, until the time when the timekeeping function 318 outputs the time-up signal St. Accordingly, as shown in FIG. 41, a scene where the floating image 316 moves while floating is displayed on the screen of the monitor 30.

The floating image display program 100 displays the floating image 316, and thus it is possible to indicate for the user that currently, some cards (in the example of FIG. 41, card 546) cannot be recognized, or there is no card which can be recognized.

Figure 43:
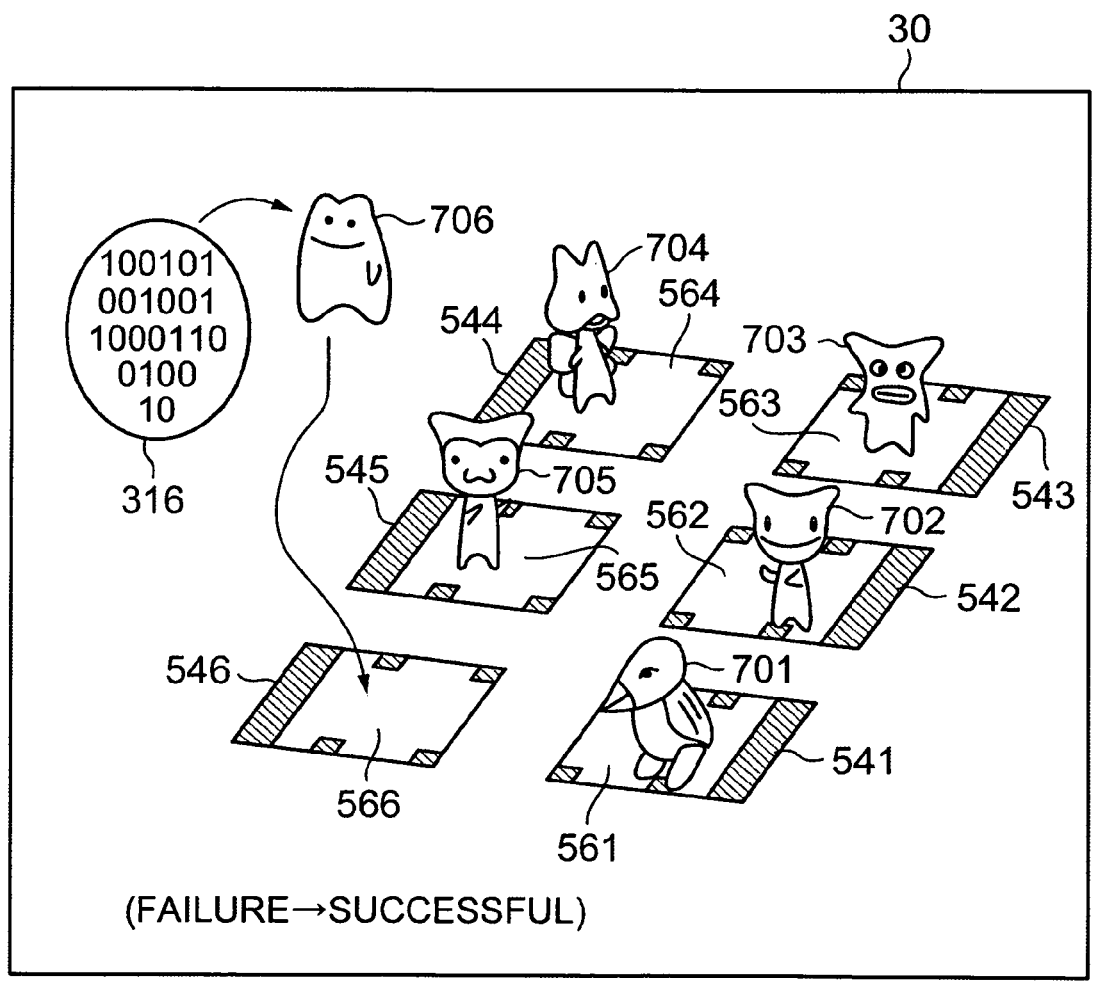
FIG. 43 is an illustration showing an example of a scene in which after displaying the floating image, if a re-recognition of the card is successful, the character image associated with the identification number of the card is allowed to land on the identification image of the card.

Next, landing display program 102 will be explained. As shown in FIG. 43, after the floating image 316 is displayed being floating and the re-recognition of the card 546 is successful, this program 102 displays that the character image 706 associated with the identification number of the card 546 lands on the identification image 566 of the card 546.

Figure 44:
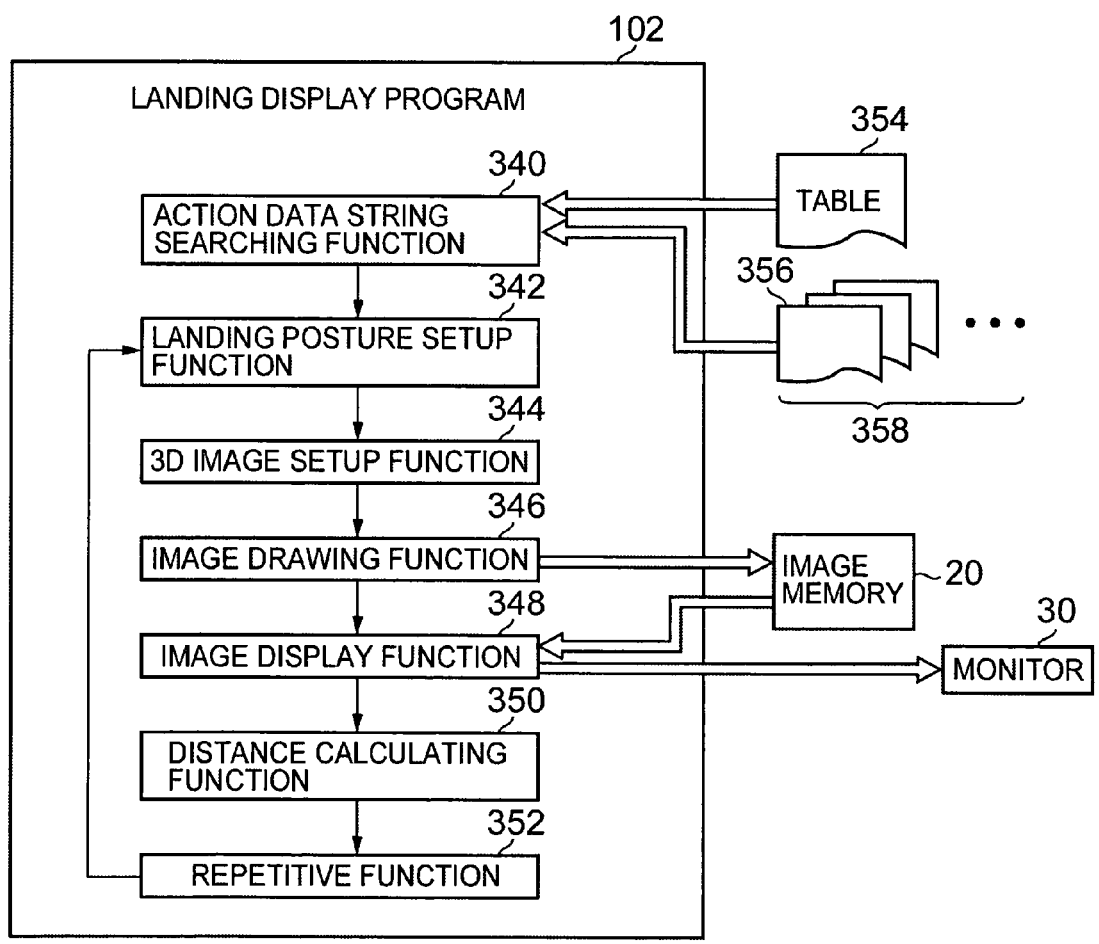
FIG. 44 is a block diagram showing functions of landing display program.

After the floating image 316 is displayed being floating, if the identification information of the card is properly detected, the landing display program 102 is started from the card recognition program 82, the field display program 88, or the card position forecasting program 90. As shown in FIG. 44, the landing display program 102 includes, action data string searching function 340, landing posture setup function 342, 3D image setup function 344, image drawing function 346, image displaying function 348, distance calculating function 350, and repetitive function 352. The aforementioned card recognition program 82, the filed display program 88, or card position forecasting program 90 supplies the identification number of the card which is successful in the re-recognition and the camera coordinate of the identification image of the card being associated.

As shown in FIG. 43, for example, the action data string searching function 340 searches the landing action information table 354 for an action data string to display a scene where a character image 706 jumps out from the position of the floating image 316 and lands on the identification image 566 of the card 546 being associated with the character image.

Specifically, at first, the action data string searching function searches the landing action information table 354 being recorded in the hard disk 44, optical disk 32, and the like, for a record associated with the identification number. Then, out of the data file 358 which is recorded in the hard disk 44, optical disk 32, or the like, and in which a large number of action data strings 356 are registered, the action data string searching function 354 reads out from the storage head address which is registered in the record thus searched, the action data string 356 indicating an action in which the character image 706 lands on the identification image 566 of the card 546 being associated with the character image.

The landing posture setup function 342 sets up one posture in a process where the character image 706 lands on the identification image 566 of the card 546 being associated with the character image. For example, the vertex data of the character image 706 is moved on the camera coordinate, based on the action data of the i-th frame (i=1, 2, 3 . . . ) of the action data string 356 thus read out, and one posture is set up.

The 3D image setup function 344 sets up a 3D image of one posture in a process that the character image 706 lands on the identification image 566 of the card 546 being associated with the character image, from the position of the floating image 316, based on the camera coordinate of the pickup image detected by the card recognition program 82, or the like, for example.

The image drawing function 346 allows the 3D image of one posture in a process where the character image 706 lands on the identification image 566 of the card 546 being associated with the character image, to be subjected to perspective transformation to an image on the screen coordinate system, and draws thus transformed image into the image memory 20 (including hidden surface processing).

The image display function 348 outputs the image drawn in the image memory 20 in a unit of frame to the monitor 30 via the I/O port 22, and displays the image on the screen of the monitor 30.

The distance calculating function 350 calculates a distance between the camera coordinate of the identification image 706 which has moved for one frame, and the camera coordinate of the identification image 566 of the card 546 being associated with the identification number.

The repetitive function 352 sequentially repeats the processing of the landing posture setup function 342, the processing of the 3D image setup function 344, the processing of the image drawing function 346, the processing of the image display function 348, and the processing of the distance calculating function 350, until the distance calculated in the distance calculating function 350 becomes zero. Accordingly, as shown in FIG. 43, for example, it is possible to display a scene where the character image 706 lands on the identification image 566 of the card 546 being associated with the character image.

With this landing display program 102, it is possible to display that the character image 706, for example, jumps out of the floating image 316 and lands on the identification image 566 of the card 546 being associated. Therefore, an atmosphere is created such that the character of the card 546 returns from an unknown world to the virtual space of this video game and lands thereon, thereby giving an amusement to the video game.

In the above description, two-person fighting and six-person fighting are taken as an example. It is further possible to easily apply the present invention to three-person, four-person, five-person, and also seven-or-more person fighting.

It should be understood that the image display system, the image processing system, and the video game system relating to the present invention are not limited to the disclosed embodiments, but are susceptible of changes and modifications without departing from the scope of the invention.

What is claimed is:

1. An image display system comprising,
    a computer,
    an image pickup means which is connected to said computer and picks up an image of a card to which an identification image is attached, and
    a display device which is connected to said computer, wherein,
    said system further comprising process instructions embodied in a non-transitory computer-readable medium, said process instructions causing the computer to function as,
    a pickup image display control means which outputs to said display device, image data of a pickup image including said identification image of said card from said image pickup means, and allows said display device to display said pickup image,
    a finding means which finds image data of said identification image attached to said card, out of said image data of said pickup image,
    an identification information detecting means which detects identification information of said card, periodically or at random times, from said image data of said identification image which is found out by said finding means,
    an object display control means which controls so that an object image associated with said identification information of said card is displayed on said identification image of said card being displayed on said display device, in such a manner as being superimposed on said identification image, and
    a floating object display control means which controls so that a floating image is displayed in correspondence with said card being displayed on said display device instead of said object image, when said identification information of said card is not detected by said identification information detecting means only after displaying said object image by said object display control means.

2. The image display system according to claim 1, wherein said process instructions cause the computer to further function as,
    a second object display control means which controls to display said object image associated with said identification information of said card as landing on said identification image of said card, when said identification information of said card is detected by said identification information detecting means after said floating image is displayed under the control of said floating image display control means.

3. The image display system according to claim 2, wherein, said floating image display control means controls so that said floating image is erased after a lapse of a predetermined period of time.

* * * * *